US011067170B2

(12) United States Patent
Afshari

(10) Patent No.: US 11,067,170 B2
(45) Date of Patent: *Jul. 20, 2021

(54) HYDROSTATIC TRANSMISSION ASSEMBLY AND SYSTEM

(71) Applicant: Project Phoenix, LLC, Mesa, AZ (US)

(72) Inventor: Thomas Afshari, Mesa, AZ (US)

(73) Assignee: Project Phoenix, LLC, Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,540

(22) Filed: Dec. 13, 2019

(65) Prior Publication Data

US 2020/0224765 A1 Jul. 16, 2020

Related U.S. Application Data

(63) Continuation of application No. 15/315,560, filed as application No. PCT/US2015/033764 on Jun. 2, 2015, now Pat. No. 10,544,861.

(Continued)

(51) Int. Cl.
*F16H 61/47* (2010.01)
*F16H 61/4035* (2010.01)
(Continued)

(52) U.S. Cl.
CPC ............ *F16H 61/47* (2013.01); *F16H 39/06* (2013.01); *F16H 39/36* (2013.01);
(Continued)

(58) Field of Classification Search
CPC ............ F16H 61/4008; F16H 61/4035; F15B 2211/7058; F15B 2211/20515; F15B 2211/20561; F04C 2240/402
See application file for complete search history.

(56) References Cited

U.S. PATENT DOCUMENTS

| 337,551 | A | 3/1886 | Berrenberg et al. |
|---|---|---|---|
| 688,616 | A | 12/1901 | Ferguson |

(Continued)

FOREIGN PATENT DOCUMENTS

| CA | 2 236 535 A1 | 11/1999 |
|---|---|---|
| CA | 2 878 316 A1 | 3/2014 |

(Continued)

OTHER PUBLICATIONS

U.S. Appl. No. 14/637,064, filed Mar. 3, 2015, U.S. Pat. No. 9,228,586, Jan. 5, 2016, Pump Integrated With Two Independently Driven Primer Movers.

(Continued)

*Primary Examiner* — Thomas E Lazo
(74) *Attorney, Agent, or Firm* — Perkins Coie LLP

(57) ABSTRACT

A hydrostatic transmission system includes a fluid-driven motor and an integrated pump assembly connected to the fluid-driven motor to provide fluid to operate the fluid-driven motor. The integrated pump assembly includes a pump with at least one fluid driver comprising a prime mover and a fluid displacement assembly to be driven by the prime mover such that fluid is transferred from a first port of the pump to a second port of the pump. The pump assembly also includes two valve assembles to isolate the pump from the system. The hydrostatic transmission system also includes a controller that establishes at least one of a speed and a torque of the at least one prime mover to exclusively adjust at least one of a flow and a pressure in the hydrostatic transmission system to an operational set point.

18 Claims, 25 Drawing Sheets

Related U.S. Application Data

(60) Provisional application No. 62/066,247, filed on Oct. 20, 2014, provisional application No. 62/066,238, filed on Oct. 20, 2014, provisional application No. 62/066,255, filed on Oct. 20, 2014, provisional application No. 62/060,441, filed on Oct. 6, 2014, provisional application No. 62/054,176, filed on Sep. 23, 2014, provisional application No. 62/031,560, filed on Jul. 31, 2014, provisional application No. 62/031,353, filed on Jul. 31, 2014, provisional application No. 62/031,597, filed on Jul. 31, 2014, provisional application No. 62/017,362, filed on Jun. 26, 2014, provisional application No. 62/017,382, filed on Jun. 26, 2014, provisional application No. 62/006,760, filed on Jun. 2, 2014.

(51) Int. Cl.
    *F16H 61/4061* (2010.01)
    *F16H 39/06* (2006.01)
    *F16H 61/465* (2010.01)
    *F16H 39/36* (2006.01)
    *F16H 61/4008* (2010.01)
    *F16H 61/468* (2010.01)

(52) U.S. Cl.
    CPC ..... *F16H 61/4008* (2013.01); *F16H 61/4035* (2013.01); *F16H 61/4061* (2013.01); *F16H 61/465* (2013.01); *F16H 61/468* (2013.01)

(56) References Cited

U.S. PATENT DOCUMENTS

| | | | |
|---|---|---|---|
| 1,341,846 A | 6/1920 | Gollings | |
| 1,361,423 A | 12/1920 | Waterous | |
| 1,407,496 A | 2/1922 | Storey | |
| 1,418,741 A | 6/1922 | Stallman | |
| 1,665,120 A | 4/1928 | Wendell | |
| 1,681,796 A | 8/1928 | Wendell | |
| 1,712,157 A | 5/1929 | Morita | |
| 2,439,427 A | 4/1948 | Guibert et al. | |
| 2,572,334 A | 10/1951 | Guibert | |
| 2,601,397 A | 6/1952 | Hill et al. | |
| 2,621,603 A | 12/1952 | Thomas | |
| 2,918,209 A | 12/1959 | Schueller | |
| 2,927,429 A | 3/1960 | Carlson | |
| 2,928,295 A * | 3/1960 | Boulanger | F16H 61/46 475/72 |
| 2,937,807 A | 5/1960 | Lorenz | |
| 2,940,661 A | 6/1960 | Lorenz | |
| 3,136,224 A | 6/1964 | Escobosa | |
| 3,264,502 A | 8/1966 | Lytle et al. | |
| 3,585,973 A | 6/1971 | Klover | |
| 3,694,105 A | 9/1972 | Martin | |
| 3,763,746 A | 10/1973 | Walters | |
| 3,922,855 A | 12/1975 | Bridwell et al. | |
| 3,932,993 A * | 1/1976 | Riedhammer | F16H 61/433 60/431 |
| 3,979,910 A | 9/1976 | Leuenberger et al. | |
| 4,016,719 A | 4/1977 | Yavnai | |
| 4,030,403 A | 6/1977 | Elser | |
| 4,345,436 A | 8/1982 | Johnson | |
| 4,369,625 A | 1/1983 | Izumi et al. | |
| 4,418,610 A | 12/1983 | Holtrop | |
| 4,529,362 A | 7/1985 | Ichiryu et al. | |
| 4,627,237 A * | 12/1986 | Hutson | F16H 39/04 60/487 |
| 4,630,441 A | 12/1986 | Chamberlain | |
| 4,682,939 A * | 7/1987 | Petro | F04C 2/084 418/178 |
| 4,696,163 A | 9/1987 | Glomeau | |
| 4,850,812 A | 7/1989 | Voight | |
| 5,026,248 A | 6/1991 | Hamilton | |
| 5,048,294 A * | 9/1991 | Oshina | F16H 61/439 60/468 |
| 5,161,957 A | 11/1992 | Ribaudo | |
| 5,197,861 A | 3/1993 | Maruyama et al. | |
| 5,271,719 A | 12/1993 | Abe et al. | |
| 5,295,798 A | 3/1994 | Maruyama et al. | |
| 5,329,216 A | 7/1994 | Hasegawa | |
| 5,708,311 A | 1/1998 | Claar et al. | |
| 5,709,537 A | 1/1998 | Maruyama et al. | |
| 5,767,635 A | 6/1998 | Steffens et al. | |
| 5,767,638 A | 6/1998 | Wu et al. | |
| 5,778,671 A | 7/1998 | Bloomquist et al. | |
| 5,836,746 A | 11/1998 | Maruyama et al. | |
| 6,002,186 A | 12/1999 | Coutu et al. | |
| 6,004,119 A | 12/1999 | Yoshiaki et al. | |
| 6,042,095 A | 3/2000 | Kuchta | |
| 6,048,235 A | 4/2000 | Kai | |
| 6,053,717 A | 4/2000 | Dixon | |
| 6,155,790 A | 12/2000 | Pyötsiä et al. | |
| 6,247,906 B1 | 6/2001 | Pijanowski | |
| 6,447,256 B2 * | 9/2002 | Bussard | F04C 15/008 318/34 |
| 6,447,266 B2 | 9/2002 | Antaki et al. | |
| 6,543,223 B2 | 4/2003 | Muschong et al. | |
| 6,652,249 B2 | 11/2003 | Kenney et al. | |
| 6,796,120 B2 | 9/2004 | Franchet et al. | |
| 6,971,463 B2 * | 12/2005 | Shore | B60K 6/12 180/165 |
| 6,979,185 B2 * | 12/2005 | Kaempe | F04C 14/04 418/131 |
| 7,000,386 B1 * | 2/2006 | Morgan | F15B 13/022 60/419 |
| 7,051,526 B2 | 5/2006 | Geiger | |
| 7,155,910 B2 | 1/2007 | Last | |
| 7,191,593 B1 | 3/2007 | Ho | |
| 7,232,292 B2 | 6/2007 | Lopatinsky et al. | |
| 7,240,893 B2 | 6/2007 | Komaba et al. | |
| 7,281,372 B2 | 10/2007 | Sakai et al. | |
| 7,434,395 B2 | 10/2008 | He | |
| 7,537,441 B2 | 5/2009 | Iwasaki | |
| 7,870,727 B2 * | 1/2011 | Mueller | F16H 61/4096 60/414 |
| 7,927,079 B2 | 4/2011 | Suzuki et al. | |
| 8,157,539 B2 | 4/2012 | Hidaka et al. | |
| 8,167,589 B2 | 5/2012 | Hidaka et al. | |
| 8,206,134 B2 | 6/2012 | Moldovan et al. | |
| 8,448,432 B2 | 5/2013 | Bresie | |
| 8,869,924 B2 * | 10/2014 | Kim | E02F 9/2271 180/65.265 |
| 8,959,905 B2 * | 2/2015 | Baltes | B60K 6/12 60/414 |
| 9,228,586 B2 | 1/2016 | Afshari | |
| 9,234,532 B2 | 1/2016 | Vanderlaan et al. | |
| 9,670,943 B2 | 6/2017 | Gomm et al. | |
| 10,544,810 B2 * | 1/2020 | Afshari | E02F 3/425 |
| 10,677,352 B2 * | 6/2020 | Afshari | F04C 2/08 |
| 2002/0009368 A1 | 1/2002 | Bussard | |
| 2003/0077183 A1 | 4/2003 | Franchet et al. | |
| 2003/0091448 A1 | 5/2003 | Prampolini | |
| 2003/0126981 A1 | 7/2003 | Bridger et al. | |
| 2003/0151315 A1 | 8/2003 | Choi et al. | |
| 2004/0060430 A1 | 4/2004 | Brinkman | |
| 2004/0213680 A1 | 10/2004 | Suzuki et al. | |
| 2005/0022523 A1 | 2/2005 | Nagai et al. | |
| 2005/0089414 A1 | 4/2005 | Ohman | |
| 2005/0112012 A1 | 5/2005 | Marheineie | |
| 2005/0144939 A1 | 7/2005 | Mentink et al. | |
| 2005/0238505 A1 | 10/2005 | Iwasaki | |
| 2005/0254970 A1 | 11/2005 | Mayer et al. | |
| 2006/0001202 A1 | 1/2006 | Bauman | |
| 2006/0039804 A1* | 2/2006 | Jordan | F04C 2/082 417/320 |
| 2006/0156713 A1 | 7/2006 | Kadlicko | |
| 2007/0074511 A1 | 4/2007 | Verkuilen | |
| 2007/0098576 A1* | 5/2007 | Horng | F04C 15/0069 417/420 |
| 2007/0101711 A1* | 5/2007 | Debus | B30B 15/166 60/476 |

(56) References Cited

U.S. PATENT DOCUMENTS

| | | | |
|---|---|---|---|
| 2007/0157612 A1 | 7/2007 | He | |
| 2007/0166168 A1 | 7/2007 | Vigholm | |
| 2008/0010984 A1 | 1/2008 | Arbel et al. | |
| 2008/0190104 A1 | 8/2008 | Bresie | |
| 2009/0210120 A1 | 8/2009 | Stein | |
| 2009/0266934 A1 | 10/2009 | Makino | |
| 2009/0297370 A1 | 12/2009 | Moldovan et al. | |
| 2010/0226806 A1 | 9/2010 | Mellet et al. | |
| 2010/0247362 A1* | 9/2010 | Koizumi | F04C 14/02 418/140 |
| 2010/0264885 A1 | 10/2010 | Olsen et al. | |
| 2010/0322805 A1* | 12/2010 | Aregger | F04C 2/18 418/2 |
| 2011/0000203 A1 | 1/2011 | Riedel et al. | |
| 2011/0017310 A1 | 1/2011 | Eriksson | |
| 2011/0030364 A1* | 2/2011 | Persson | E02F 9/2242 60/428 |
| 2011/0030505 A1 | 2/2011 | Hoyle et al. | |
| 2011/0135516 A1 | 6/2011 | Oishi et al. | |
| 2011/0209471 A1 | 9/2011 | Vanderlaan et al. | |
| 2011/0250082 A1 | 10/2011 | Han et al. | |
| 2012/0141315 A1 | 6/2012 | Seto et al. | |
| 2012/0173027 A1 | 7/2012 | Cheng et al. | |
| 2012/0233997 A1 | 9/2012 | Andruch, III et al. | |
| 2012/0305603 A1* | 12/2012 | Kwok | F04C 2/18 222/251 |
| 2013/0074487 A1 | 3/2013 | Herold et al. | |
| 2013/0091833 A1 | 4/2013 | Zhan et al. | |
| 2013/0098015 A1 | 4/2013 | Opdenbosh | |
| 2013/0098017 A1* | 4/2013 | Knussman | F15B 7/006 60/327 |
| 2013/0098464 A1 | 4/2013 | Knussman | |
| 2013/0239558 A1 | 9/2013 | Shirao | |
| 2013/0298542 A1 | 11/2013 | Lowman et al. | |
| 2014/0105714 A1 | 4/2014 | Kim | |
| 2014/0130487 A1 | 5/2014 | Akiyama et al. | |
| 2014/0174549 A1 | 6/2014 | Dybing | |
| 2014/0260233 A1 | 9/2014 | Giovanardi | |
| 2014/0308106 A1 | 10/2014 | Beschorner | |
| 2014/0366519 A1 | 12/2014 | Sadamori | |
| 2015/0121860 A1 | 5/2015 | Hyon | |
| 2015/0275927 A1 | 10/2015 | Gomm et al. | |
| 2015/0308463 A1 | 10/2015 | Gomm et al. | |
| 2015/0361743 A1 | 12/2015 | Mikkulainen | |
| 2016/0102685 A1 | 4/2016 | Chester | |

FOREIGN PATENT DOCUMENTS

| | | |
|---|---|---|
| CH | 625 600 A5 | 9/1981 |
| CN | 101655087 A | 2/2018 |
| DE | 1 258 617 | 1/1968 |
| DE | 1 528 965 | 10/1969 |
| DE | 3 230 550 A1 | 1/1984 |
| DE | 3 247 004 A1 | 6/1984 |
| DE | 3 821 321 A1 | 12/1989 |
| DE | 10 2008 018407 A1 | 10/2009 |
| DE | 10 2009 027282 A1 | 12/2010 |
| DE | 10 2009 028095 A1 | 2/2011 |
| DE | 10 2009 045028 A1 | 3/2011 |
| DE | 10 2011 005831 A1 | 9/2012 |
| DE | 10 2012 102156 A1 | 10/2012 |
| EP | 0 558 921 A1 | 9/1993 |
| EP | 0 942 173 A1 | 9/1999 |
| EP | 1 249 608 A1 | 10/2002 |
| EP | 1 531 269 | 5/2005 |
| EP | 1 967 745 A1 | 9/2008 |
| EP | 2 113 666 A2 | 11/2009 |
| EP | 2 816 237 A1 | 12/2014 |
| FR | 2 119 294 | 8/1972 |
| FR | 2 428 771 | 1/1980 |
| GB | 270 000 | 5/1927 |
| GB | 1 081 711 A | 8/1967 |
| GB | 1 284 551 | 8/1972 |
| GB | 1 284 552 | 8/1972 |
| GB | 1 284 553 | 8/1972 |
| GB | 1 450 436 | 9/1976 |
| GB | 2 123 089 A | 1/1984 |
| GB | 2 259 333 | 3/1993 |
| JP | S59-20590 A | 2/1984 |
| JP | Hei 11-336671 A | 12/1999 |
| JP | 2001-011899 A | 1/2001 |
| JP | 2001-153066 A | 6/2001 |
| JP | 2002-147370 A | 6/2002 |
| JP | 2003-088084 A | 3/2003 |
| JP | 2006-316662 A | 11/2006 |
| JP | 3 154 210 U | 10/2009 |
| JP | 2014-009655 A | 1/2014 |
| JP | 2014-512495 A | 5/2014 |
| RU | 2284424 C1 | 9/2006 |
| RU | 2009 149 035 A | 8/2011 |
| SU | 857 550 A | 8/1981 |
| SU | 1 087 705 A | 4/1984 |
| WO | WO 1991/13256 A1 | 9/1991 |
| WO | WO 01/073295 A1 | 10/2001 |
| WO | WO 03/069160 A1 | 8/2003 |
| WO | WO 2004/071845 A1 | 8/2004 |
| WO | WO 2008/060681 A2 | 5/2008 |
| WO | WO 2010/083991 A2 | 7/2010 |
| WO | WO 2010/097596 A1 | 9/2010 |
| WO | WO 2011/035971 A2 | 3/2011 |
| WO | WO 2011/048261 A1 | 4/2011 |
| WO | WO 2011/072502 A1 | 6/2011 |
| WO | WO 2012-122159 A2 | 9/2012 |
| WO | WO 2013/06902 A1 | 1/2013 |
| WO | WO 2013/027620 A1 | 2/2013 |
| WO | WO 2014/060760 A2 | 4/2014 |
| WO | WO 2014/135284 A1 | 9/2014 |
| WO | WO 2014/176256 A1 | 10/2014 |

OTHER PUBLICATIONS

U.S. Appl. No. 14/862,608, filed Sep. 23, 2015, U.S. Pat. No. 10,072,676, Sep. 11, 2018, System to Pump Fluid and Control Thereof.

U.S. Appl. No. 14/944,368, filed Nov. 18, 2015, U.S. Pat. No. 9,920,755, Mar. 20, 2018, Pump Integrated With Two Independently Driven Prime Movers.

U.S. Appl. No. 15/128,269, filed Sep. 22, 2016, U.S. Pat. No. 10,465,721, Nov. 5, 2019, System to Pump Fluid and Control Thereof.

U.S. Appl. No. 15/305,579, filed Apr. 22, 2015, U.S. Pat. No. 10,294,936, May 21, 2019, Fluid Delivery System With a Shaft Having a Through-Passage.

U.S. Appl. No. 15/315,560, filed Jun. 2, 2015, U.S. Pat. No. 10,544,861, Jan. 28, 2020, Hydrostatic Transmission Assembly and System.

U.S. Appl. No. 15/315,575, filed Jun. 2, 2015, U.S. Pat. No. 10,544,810, Jan. 28, 2020, Linear Actuator Assembly and System.

U.S. Appl. No. 15/315,592, filed Jun. 2, 2015, Linear Actuator Assembly and System.

U.S. Appl. No. 15/327,748, filed Jul. 22, 2015, U.S. Pat. No. 10,598,176, Mar. 24, 2020, External Gear Pump Integrated With Two Independently Driven Prime Movers.

U.S. Appl. No. 15/517,356, filed Oct. 2, 2015, U.S. Pat. No. 10,539,134, Jan. 21, 2020, Linear Actuator Assembly and System.

U.S. Appl. No. 15/520,386, filed Oct. 6, 2015, Hydrostatic Transmission Assembly and System.

U.S. Appl. No. 15/756,928, filed Mar. 1, 2018, System to Pump Fluid and Control Thereof.

U.S. Appl. No. 15/756,942, filed Sep. 1, 2016, System to Pump Fluid and Control Thereof.

U.S. Appl. No. 15/887,856, filed Feb. 2, 2018, Pump Integrated With Two Independently Drive Prime Movers.

U.S. Appl. No. 16/118,167, filed Aug. 30, 2018, System to Pump Fluid and Control Thereof.

U.S. Appl. No. 16/374,456, filed Apr. 3, 2019, Fluid Delivery System With a Shaft Having a Through-Passage.

U.S. Appl. No. 16/698,566, filed Nov. 27, 2019, Hydrostatic Transmission Assembly and System.

(56) References Cited

OTHER PUBLICATIONS

U.S. Appl. No. 16/698,631, filed Nov. 27, 2019, Linear Actuator Assembly and System.
U.S. Appl. No. 16/714,504, filed Dec. 13, 2019, Linear Actuator Assembly and System.
U.S. Appl. No. 16/787,876, filed Feb. 11, 2020, External Gear Pump Integrated With Two Independently Driven Prime Movers.
U.S. Appl. No. 16/936,366, filed Jul. 22, 2020, Linear Actuator Assembly and System.
U.S. Appl. No. 17/022,059, filed Sep. 15, 2020, System to Pump Fluid and Control Thereof.
U.S. Appl. No. 17/092,159, filed Nov. 6, 2020, System to Pump Fluid and Control Thereof.
Esposito, Fluid Power with Applicators, 7th Ed., Chapter 5, pp. 154-162 (2009).
International Search Report and Written Opinion, International Application No. PCT/US2015/018342 (published as WO 2015/131196), 19 pages (dated Jul. 20, 2015).
International Search Report and Written Opinion, International Application No. PCT/US2015/022484, (published as WO 2015/148662), 9 pages (dated Jun. 9, 2015).
International Search Report and Written Opinion, International Application No. PCT/US2015/027003 (published as WO 2015/164453), 18 pages (dated Nov. 4, 2015).
International Search Report and Written Opinion, International Application No. PCT/US2015/033752 (published as WO 2015/187673), 15 pages (dated Sep. 29, 2015).
International Search Report and Written Opinion, International Application No. PCT/US2015/033764 (published as WO 2015/187681), 7 pages (dated Aug. 19, 2015).
International Search Report and Written Opinion, International Application No. PCT/US2015/033776 (published as WO 2015/187688), 31 pages (dated Oct. 28, 2015).
International Search Report and Written Opinion, International Application No. PCT/US2015/041612 (published as WO 2016/014715), 8 pages (dated Sep. 28, 2015).
International Search Report and Written Opinion, International Application No. PCT/US2015/053670 (published as WO 2015/057321), 10 pages (dated Dec. 16, 2015).
International Search Report and Written Opinion, International Application No. PCT/US2015/054145 (published as WO 2016/064569), 9 pages (dated Feb. 2, 2016).
International Search Report and Written Opinion, International Application No. PCT/US2015/050589 (published as WO 2016/048773), 10 pages (dated Dec. 7, 2015).
International Search Report and Written Opinion, International Application No. PCT/US2016/049959 (published as WO 2017/040825), 10 pages (dated Dec. 9, 2016).
International Search Report and Written Opinion, International Application No. PCT/US2016/049918 (published as WO 2017/040792), 10 pages (dated Nov. 23, 2016).
Marks' Standard Handbook for Mechanical Engineers, Eighth Ed., Section 14, pp. 14-1-14-31 (1978).
Supplementary European Search Report, EP Application No. 15802457.0, 24 pages (dated Mar. 14, 2018).
Supplementary European Search Report, EP Application No. 15803186.4, 9 pages (dated Dec. 19, 2017).
Supplementary European Search Report, EP Application No. 15803994.1, 7 pages (dated Jan. 22, 2018).
Supplemental European Search Report, European Application No. EP 18 20 7568.9 (not yet published), 7 pages (dated Feb. 4, 2019).
Yusof et al., "Slip flow coefficient analysis in water hydraulics gear pump for environmental friendly application," *IOP Conf. Series: Materials Science and Engineering*, 50:012016 (2013).
Supplementary European Search Report, EP Application No. 20166746.6, 7 pages (dated May 6, 2020).
Extended European Search Report, European Application No. 20197360.9, 8 pages (dated Nov. 10, 2020).
Supplementary European Search Report, EP Application No. 20168937.9, 8 pages (dated May 14, 2020).
Supplementary European Search Report, EP Application No. 20179980.6, 8 pages (dated Jul. 30, 2020).

\* cited by examiner

HYDROSTATIC TRANSMISSION ASSEMBLY AND SYSTEM

PRIORITY

The present application claims priority to U.S. patent application Ser. No. 15/315,560 filed on Dec. 1, 2016, which is a 371 application of International Patent Application No. PCT/US2015/033764 filed on Jun. 2, 2015, which claims the benefit of U.S. Provisional Patent Application Nos. 62/006,760 filed on Jun. 2, 2014; 62/017,362 and 62/017,382 filed on Jun. 26, 2014; 62/031,560, 62/031,353, and 62/031,597 filed on Jul. 31, 2014; 62/054,176 filed on Sep. 23, 2014; 62/060,441 filed on Oct. 6, 2014; and 62/066,238, 62/066,247, and 62/066,255 filed on Oct. 20, 2014; which applications are incorporated herein by reference in their entirety.

TECHNICAL FIELD

The present invention relates generally to hydrostatic transmissions and power generating and transmitting methodologies thereof. More particularly, the present invention relates to hydrostatic transmissions and control methodologies thereof in a fluid pumping or delivery system, including adjusting at least one of a flow and a pressure in the system using the at least one pump assembly and without the aid of another flow control device.

BACKGROUND OF THE INVENTION

Hydrostatic transmissions are widely used in a variety of applications such as earth moving machines, agricultural machines, and other industrial or domestic machines. Hydrostatic transmissions use a fluid such as hydraulic fluid to transmit power from a power source, e.g. an engine or an electric motor, to a driven mechanism, e.g. a wheel of a tractor, excavator or some other driven load. A typical hydrostatic transmission system includes a pump driven by a prime mover and a fluid-driven motor driven by the pump. In addition, such a system includes a reservoir that stores and provides fluid when required, e.g., charged oil to a hydraulic pump. Often, the prime mover, the fluid pump, fluid-driven motor, and reservoir are spaced from one another. To interconnect these parts, various additional components like connecting shafts, hoses, pipes, and/or fittings are used in a complicated manner. Moreover, these components are susceptible to damage or degradation, particularly in a harsh working environment, and thereby can cause increased machine downtime and reduce reliability of the machine.

To control the flow in the system, the fluid pump can be a variable-displacement pump, e.g., a variable-displacement hydraulic pump, and/or a directional flow control valve (or another type of flow control device) can be included in the system. For example, in conventional hydraulic systems, an electric motor that drives the operation of a hydraulic pump is often run at constant speed and a directional flow control valve, for example, can provide the appropriate porting to the hydrostatic transmission to control the speed and direction of the fluid-driven motor in the hydrostatic transmission. Typically, the electric motor and hydraulic pump are run at a high speed, which builds up temperature in the hydraulic fluid. Thus, the reservoir also acts to keep the average fluid temperature down by increasing the fluid volume in the system. However, these hydraulic systems can be relatively large and complex. In addition, the various components are often located spaced apart from one another. To interconnect these parts, various additional components like connecting shafts, hoses, pipes, and/or fittings are used in a complicated manner. Moreover, these components are susceptible to damage or degradation in harsh working environments, thereby causing increased machine downtime and reduced reliability of the machine.

Further limitation and disadvantages of conventional, traditional, and proposed approaches will become apparent to one skilled in the art, through comparison of such approaches with embodiments of the present invention as set forth in the remainder of the present disclosure with reference to the drawings.

SUMMARY OF THE INVENTION

Preferred embodiments of hydrostatic transmissions and power generating and transmitting methodologies provide for a compact and reliable design of a hydrostatic transmission. The preferred hydrostatic transmissions include a transmission casing, a hydraulic motor, a storage device, valves (e.g., isolation or lock valves) and a hydraulic pump. The hydraulic motor, the storage device, valves, and the hydraulic pump are disposed in the transmission casing and form a closed-loop hydraulic system. The hydraulic motor is driven by pressurized fluid transferred by the hydraulic pump. The hydraulic motor includes a motor casing that is conjoined with the transmission casing. The motor casing has a motor inlet and a motor outlet. Pressurized fluid enters the hydraulic motor through one of the ports, and exits the hydraulic motor through the other port during operation of the hydraulic motor. The storage device stores or releases pressurized fluid into the system as required. The hydraulic pump includes a pump casing that has two ports for the pump inlet and outlet depending on the direction of the pump, and a pair of fluid drivers. Each of the pair of drivers is supported on a respective shaft in an internal volume defined by the pump casing. Each of the pair of drivers is rotatably driven independently of the other and in an opposite direction with respect to the other. The ports of the pump are in fluid communication with respective ports on the hydraulic motor. In some embodiments, the storage device is in fluid communication with a port of pump via a through-passage through one of the shafts of the pump. One end of the through-passage defines an aperture for fluid communication with one of the inlet and the outlet of the casing, and the other end of the through-passage defines a port for fluid communication with the storage device. Of course, the transmission casing need not be a separate element and the motor casing and pump casing can be combined to form all or part of the transmission casing.

Exemplary embodiments are directed to hydrostatic transmission assembly and system and control methodologies that provides for precise control of the fluid flow and/or pressure in the system by using a variable-speed and/or a variable-torque pump. The hydrostatic transmission assembly and system and method of control thereof discussed below are particularly advantageous in a closed-loop type system since system and method of control provides for a more compact configuration without increasing the risk of pump cavitation or high fluid temperatures as in conventional systems. In an exemplary embodiment, a hydraulic system includes an integrated hydrostatic transmission assembly that controls a load. The integrated hydrostatic transmission assembly includes a hydraulic pump assembly having a hydraulic pump and two valve assemblies to provide hydraulic fluid to a hydraulic motor to operate the load, e.g., tractor wheel, excavator or some other rotatably driven device. The hydraulic system further includes a means for adjusting at least one of a flow and a pressure in the system to an operational set point. The adjustment means exclusively uses the hydraulic pump to adjust the flow and/or the pressure in the system, i.e., without the aid of another flow control device, to control the flow and/or pressure in the system to the operational set point.

In another exemplary embodiment, a fluid system includes a pump assembly having at least one variable-speed and/or a variable-torque pump, a fluid-driven motor that is operated by the fluid to control a load, and a controller that establishes a speed and/or torque of the at least one pump. As used herein, "fluid" means a liquid or a mixture of liquid and gas containing mostly liquid with respect to volume. The at least one pump provides fluid to the fluid-driven motor to a drive load such as a rotating mechanism on an industrial machine, e.g. a wheel of a tractor, excavator or some other rotating device. Each pump includes a prime mover and a fluid displacement assembly. The fluid displacement assembly can be driven by the prime mover such that fluid is transferred from the inlet port to the outlet port of the pump. The controller controls a speed and/or a torque of the prime mover so as to exclusively adjust a flow and/or a pressure in the fluid system. "Exclusively adjust" means that the flow and/or the pressure in the system is adjusted by the prime mover (or prime movers depending on the pump configuration and number of pump assemblies) and without the aid of another flow control device, e.g., flow control valves, variable flow piston pumps, and directional flows valves to name just a few. That is, unlike a conventional fluid system, the pump is not run at a constant speed and/or use a separate flow control device (e.g., directional flow control valve) to control the flow and/or pressure in the system.

In some embodiments, the preferred hydrostatic transmission assemblies include a fluid-driven motor, e.g., hydraulic motor, and a pump assembly, which form a closed-loop system. The pump assembly can include at least one storage device, valve assemblies that include lock valves, and at least one fluid pump.

Exemplary embodiments of the fluid pump have at least one fluid driver. The fluid driver includes a prime mover and a fluid displacement assembly. The prime mover drives the fluid displacement assembly and the prime mover can be, e.g., an electric motor, a hydraulic motor or other fluid-driven motor, an internal-combustion, gas or other type of engine, or other similar device that can drive a fluid displacement member. In some embodiments, the fluid pump includes at least two fluid drivers and each fluid displacement assembly includes a fluid displacement member. The prime movers independently drive the respective fluid displacement members such that the fluid displacement members transfer fluid (drive-drive configuration). The fluid displacement member can be, e.g., an internal or external gear with gear teeth, a hub (e.g. a disk, cylinder, or other similar component) with projections (e.g. bumps, extensions, bulges, protrusions, other similar structures or combinations thereof), a hub (e.g. a disk, cylinder, or other similar component) with indents (e.g., cavities, depressions, voids or similar structures), a gear body with lobes, or other similar structures that can displace fluid when driven.

In some embodiments, the pump includes one fluid driver and the fluid displacement assembly has at least two fluid displacement members. The prime mover drives a first displacement member, which then drives the other fluid displacement members in the pump (a driver-driven configuration). In both the drive-drive and driver-driven type of configurations, the fluid displacement member can work in combination with a fixed element, e.g., pump wall, crescent, or other similar component, and/or a moving element such as, e.g., another fluid displacement member when transferring the fluid. The configuration of the fluid displacement members in the pump need not be identical. For example, one fluid displacement member can be configured as an external gear-type fluid driver and another fluid driver can be configured as an internal gear-type fluid driver.

In some exemplary embodiments, at least one shaft of a fluid driver, e.g., a shaft of the prime mover and/or a shaft of the fluid displacement member and/or a common shaft of the prime mover/fluid displacement member (depending on the configuration of the pump), is of a flow-through configuration and has a through-passage that allows fluid communication between at least one port of the pump and at least one fluid storage device. In some embodiments, the fluid storage device or fluid storage devices are attached to the pump body such that they form one integrated device and the flow-through shaft(s) can be in direct fluid communication with the fluid reservoir(s) in the storage device(s). One end of the through-passage of the flow-through shaft is configured for fluid communication with either the inlet port or the outlet port of the pump. In some embodiments, the connection from the end of the through-passage to the port of the pump can be through a intervening device or structure. For example, the through-passage of the flow-through shaft can connect to a channel within the pump casing or connect to a hose, pipe or other similar device, which is then connected to a port of the pump. The other end of the through-passage can have a port for fluid communication with a fluid storage device, which can be a pressure vessel, an accumulator, or another device that is fluid communication with the fluid system and can store and release fluid. The configuration of the flow-through shaft and intervening device/structure assembly can also include valves that can be operated based on whether the through-passage function is desired and/or to select a desired pump port and/or a storage device.

The summary of the invention is provided as a general introduction to some embodiments of the invention, and is not intended to be limiting to any particular drive-drive configuration or drive-drive-type system, or to any particular through-passage configuration. It is to be understood that various features and configurations of features described in the Summary can be combined in any suitable way to form any number of embodiments of the invention. Some additional example embodiments including variations and alternative configurations are provided herein.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the exemplary embodiments of the invention.

DETAILED DESCRIPTION OF THE PREFERRED EMBODIMENTS

Figure 1:
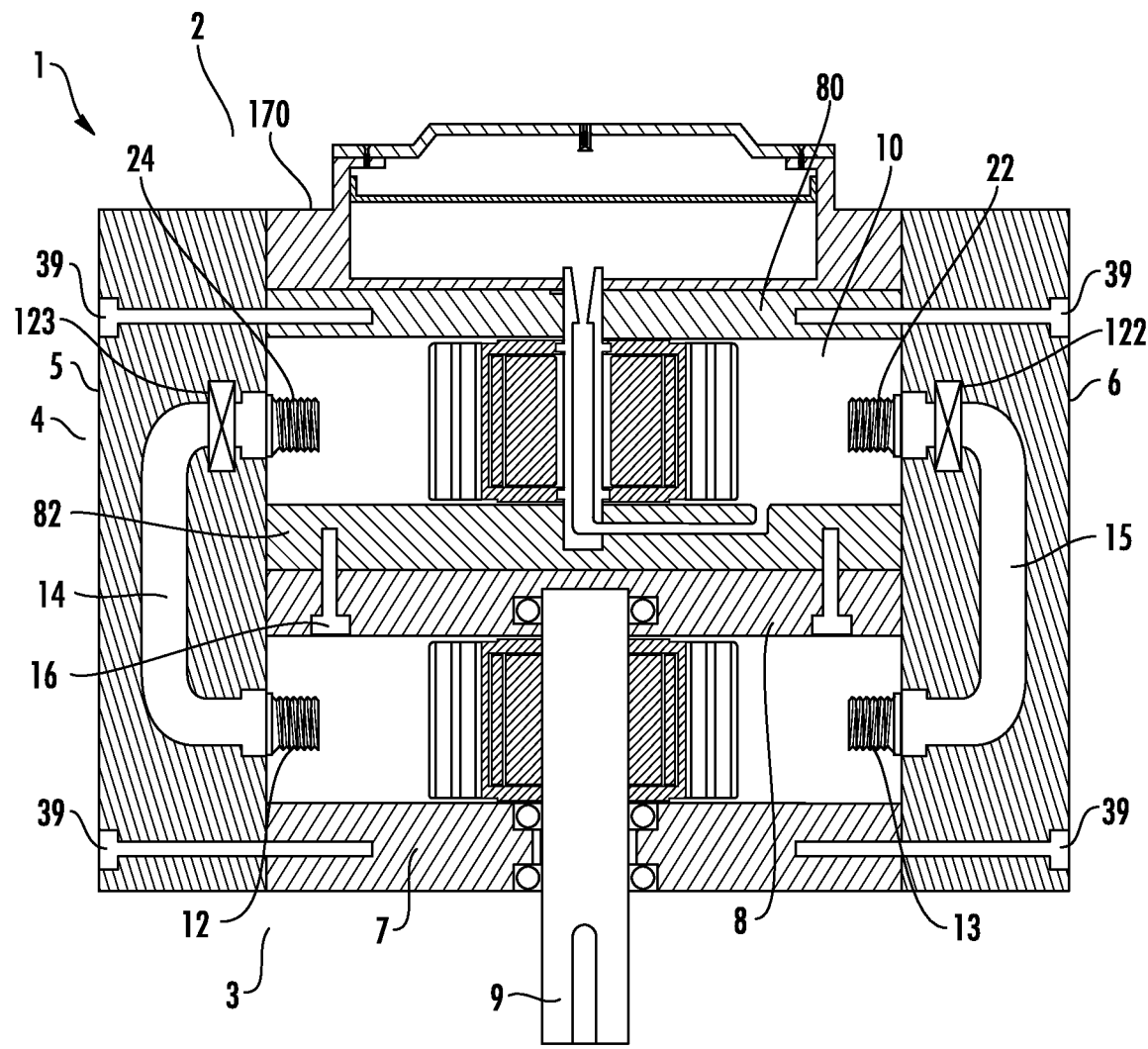
FIG. 1 is a side view of a preferred embodiment of a hydrostatic transmission assembly.

Exemplary embodiments of the present invention are directed to a hydrostatic transmission assembly and system with a fluid-driven motor and an integrated pump assembly conjoined with the fluid-driven motor to provide fluid to operate the fluid-driven motor. "Conjoined with" means that the devices are fixedly connected or attached so as to form one integrated unit or module. The integrated pump assembly includes a pump with at least one fluid driver comprising a prime mover and a fluid displacement assembly to be driven by the prime mover such that fluid is transferred from a first port of the pump to a second port of the pump. The pump assembly also includes two valve assembles to isolate the pump from the fluid system. In some embodiments the valve assemblies may be disposed separately from the pump assembly, e.g., as part of the fluid-driven motor. The fluid system also includes a controller that establishes at least one of a speed and a torque of the at least one prime mover to exclusively adjust at least one of a flow and a pressure in the fluid system to an operational set point. The fluid system can include sensor assemblies to measure system parameters such as pressure, temperature and/or flow.

In some embodiments, the pump includes at least one prime mover that is disposed internal to the fluid displacement member. In other exemplary embodiments, at least one prime mover is disposed external to the fluid displacement member but still inside the pump casing, and in still further exemplary embodiments, the at least one prime mover is disposed outside the pump casing. In some exemplary embodiments of the hydrostatic transmission assembly, the pump includes at least two fluid drivers with each fluid driver including a prime mover and a fluid displacement member. In other exemplary embodiments, the pump includes one fluid driver with the fluid driver including a prime mover and at least two fluid displacement members. In some exemplary embodiments, at least one shaft of a fluid driver, e.g., a shaft of the prime mover and/or a shaft of the fluid displacement member and/or a common shaft of the prime mover/fluid displacement member (depending on the configuration of the pump), is a flow-through shaft that includes a through-passage configuration which allows fluid communication between at least one port of the pump and at least one fluid storage device. In some exemplary embodiments, the at least one fluid storage device is an integral part of the pump assembly to provide for a more compact linear actuator assembly.

The exemplary embodiments of the fluid system and hydrostatic transmission assembly will be described using embodiments in which the pump in the pump assembly is an external gear pump with either one or two fluid drivers, the prime mover is an electric motor, and the fluid displacement member is an external spur gear with gear teeth. However, those skilled in the art will readily recognize that the concepts, functions, and features described below with respect to the electric-motor driven external gear pump can be readily adapted to external gear pumps with other gear configurations (helical gears, herringbone gears, or other gear teeth configurations that can be adapted to drive fluid), internal gear pumps with various gear configurations, to pumps with more than two fluid drivers, to prime movers other than electric motors, e.g., hydraulic motors or other fluid-driven motors, internal-combustion, gas or other type of engines or other similar devices that can drive a fluid displacement member, to pumps with more than two fluid displacement members, and to fluid displacement members other than an external gear with gear teeth, e.g., internal gear with gear teeth, a hub (e.g. a disk, cylinder, or other similar component) with projections (e.g. bumps, extensions, bulges, protrusions, other similar structures, or combinations thereof), a hub (e.g. a disk, cylinder, or other similar component) with indents (e.g., cavities, depressions, voids or similar structures), a gear body with lobes, or other similar structures that can displace fluid when driven.

For clarity, description of the exemplary embodiments are given with respect to a hydraulic system. However, the inventive features of the present disclosure are applicable to other types of fluid systems. FIG. 1 shows a side cross-sectional view of a preferred embodiment of a hydrostatic transmission assembly 1. The hydrostatic transmission assembly 1 includes a hydraulic pump assembly 2 conjoined with a hydraulic motor 3. The pump assembly 2 can include valve assemblies 122 and 123 and storage device 170. The pump assembly 2 and the hydraulic motor 3 can be attach to a transmission casing 4. The transmission casing 4 has an upper casing 5 and a lower casing 6. The pump assembly 2 and the hydraulic motor 3 are disposed in the transmission casing 4. The hydraulic motor 3 is driven by a hydraulic pump 10, which will be described in detail later. The hydraulic motor 3 has a motor casing 11 (shown in FIG. 1A) that includes a top plate 7 and a bottom plate 8. The motor casing 11 has a port 12 and a port 13. Internal surfaces of the top and bottom plates 7, 8 define an interior volume of the hydraulic motor 3. The top plate 7 is conjoined with the transmission casing 4. Specifically, in the embodiment shown in FIG. 1, the top plate 7 is conjoined with the upper and lower casings 5, 6 through a plurality of bolts 39. The hydraulic motor 3 includes an output shaft 9 extending through the top plate 7. The output shaft 9 may be coupled to an external load, e.g. an excavator, to which power generated by the hydrostatic transmission assembly 1 is to be transmitted.

On the opposite side, i.e. on the right side in FIG. 1, of the hydraulic motor 3 is disposed the pump assembly 2. The pump assembly 2 includes an external gear pump 10, valve assemblies 122 and 123 and a storage device 170. In some embodiments, the valve assemblies may be disposed separately from the pump assembly, e.g., as part of hydraulic motor 3 or hydraulic motor 3 can have an additional set of valve assemblies. The pump assembly 2, along with valve assemblies 122 and 123, is conjoined with the transmission casing 4. Specifically, in the embodiment shown in FIG. 1, the end plate 80 is conjoined with the upper and lower casings 5, 6 through a plurality of bolts 39. The lower plate 82 is conjoined with the bottom plate 8 of the motor casing 11 through a plurality of bolts 16. The pump casing 20 has a port 22 and a port 24. The transmission casing 4 includes conduits therein, through which fluid can be communicated between the hydraulic pump 10 and the hydraulic motor 3. The pump outlet 24 is in fluid communication with the port 12 of the hydraulic motor 3 via the valve assembly 123 through a first u-shaped conduit 14 in the upper casing 5. The port 22 is in fluid communication with the port 13 of the hydraulic motor 3 via the valve assembly 122 through a second u-shaped conduit 15 in the lower casing 6. In the illustrated embodiment, the pump 10 is an external gear pump. However, as discussed below the present disclosure is not limited to an external gear pump. The fluid passages between hydraulic motor 3, pump assembly 2, and valve assemblies 122 and 123 can be either internal or external depending on the configuration of the hydrostatic transmission assembly 1.

Figure 1A:
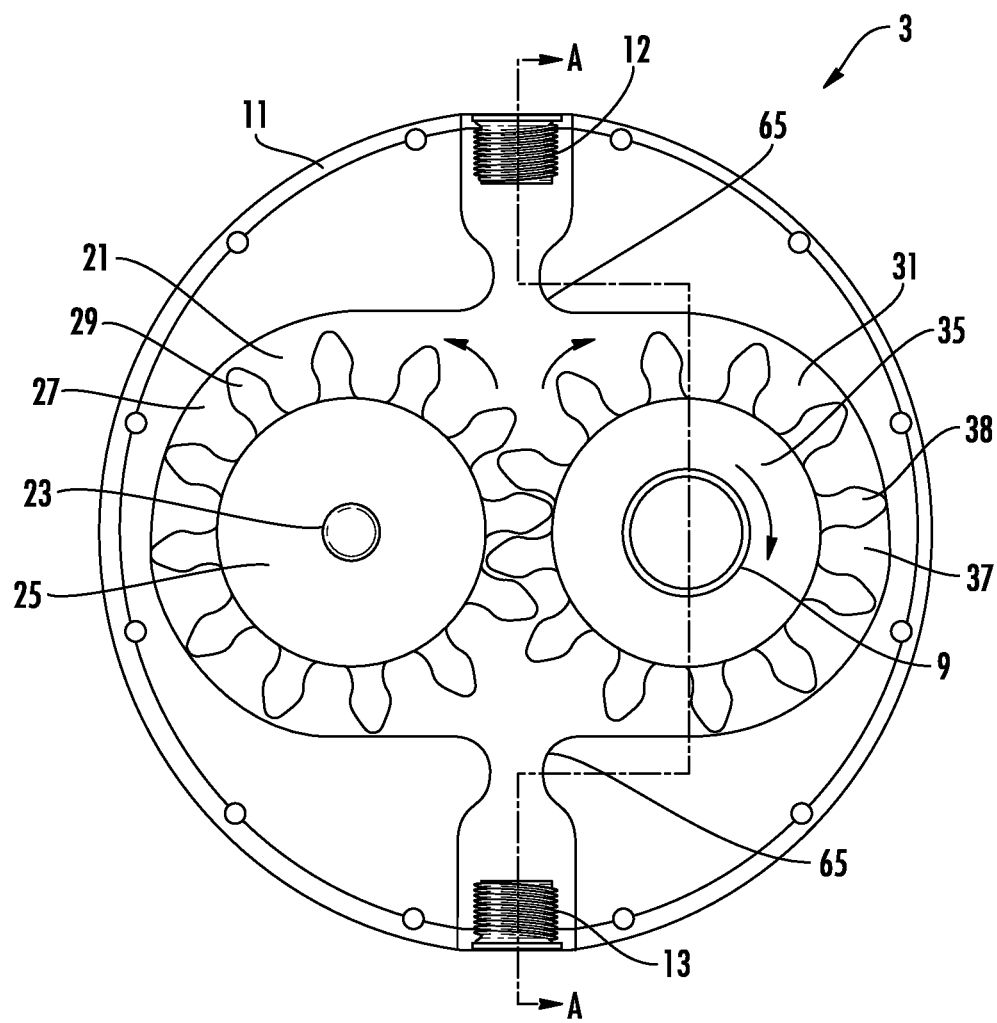
FIG. 1A shows a top cross-sectional view of a preferred embodiment of a hydraulic motor of the hydrostatic transmission assembly of FIG. 1.
Figure 1B:
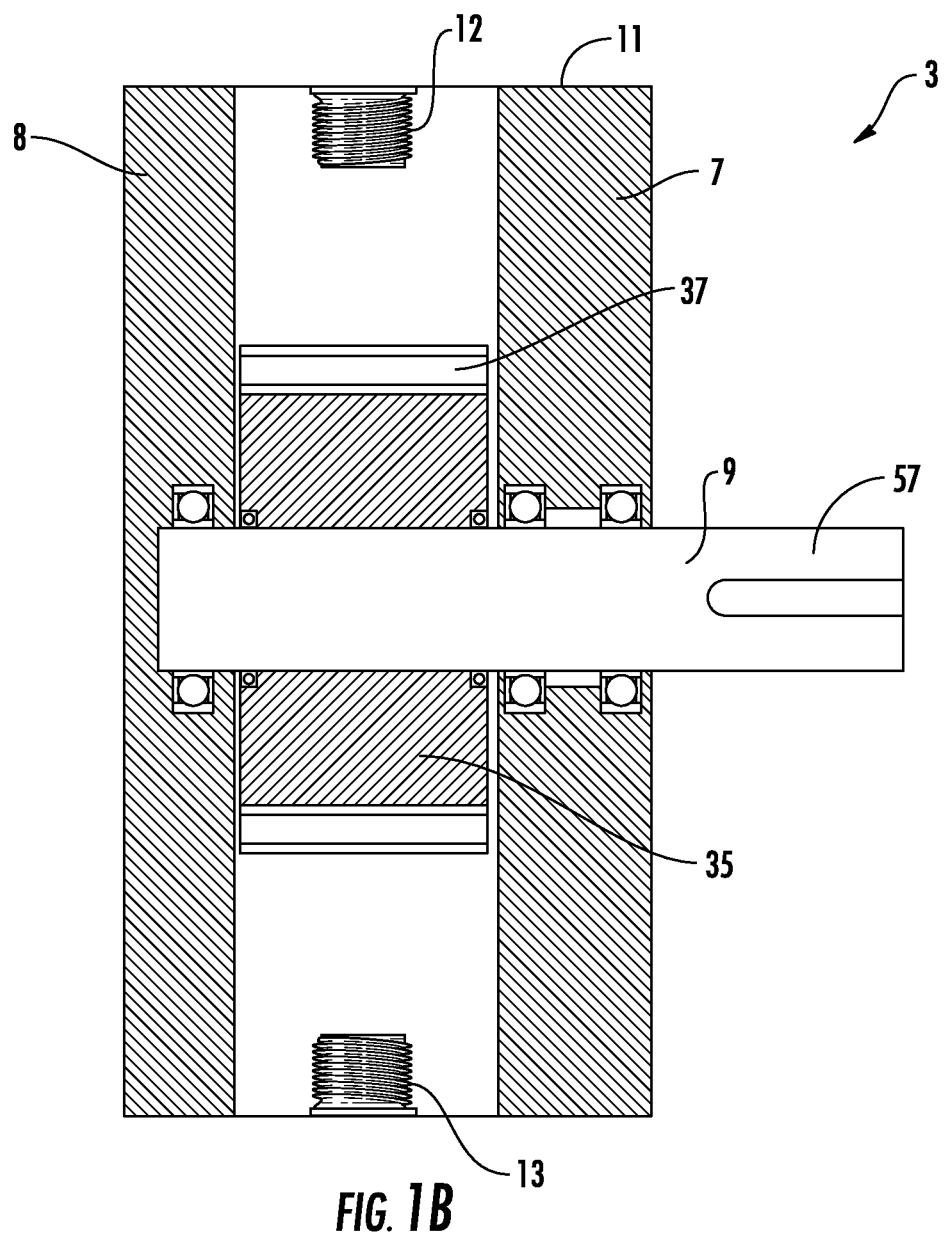
FIG. 1B shows a side cross-sectional view taken along a line A-A in FIG. 1A of a preferred embodiment of the hydraulic motor.

FIGS. 1A and 1B respectively show top and side cross-sectional views of the hydraulic motor 3. In the exemplary embodiment of FIG. 1A, the hydraulic motor 3 is an external gear hydraulic motor. However, the type of hydraulic motor is not limiting and other types of fluid-driven motor configurations can be used. The hydraulic motor 3 includes gear assembly 21 and gear assembly 31. The gear assembly 21 includes a shaft 23, a gear body 25, and a gear 27 having a plurality of gear teeth 29. The shaft 23 is fixedly connected to the gear body 25 such that the gear body 25 is rotatably movable with shaft 23. The gear assembly 31 includes a shaft (or output shaft) 9, a gear body 35, and a gear 37 having a plurality of gear teeth 38. The shaft 9 is fixedly connected to the gear body 25 such that the gear body 35 is rotatably movable with shaft 9. The shaft 9 extends through the plate 7 such that the other end 57 of the shaft 9 is disposed outside the motor casing 11. The end 57 may be coupled to an external device (or an external load), e.g., an excavator, to which power generated by the hydrostatic transmission assembly 1 is to be transmitted. The motor casing 11 may include a neck portion 65 near the ports 12, 13. The neck portion 65 reduces turbulence in the fluid entering and exiting the central area where the gear assemblies 21, 31 are located. Thus, more stabilized fluid enters and exits the central area of the hydraulic motor 3, thereby improving efficiency of the hydraulic system. Depending on desired direction of rotation, high pressure fluid is delivered to the hydraulic motor 3 through either port 12 or 13 by operation of the pump assembly 2, which will be described in detail later. Operation of the hydraulic motor 3 is known to those skilled in the art and thus, for brevity, will not be further discussed.

Figure 2:
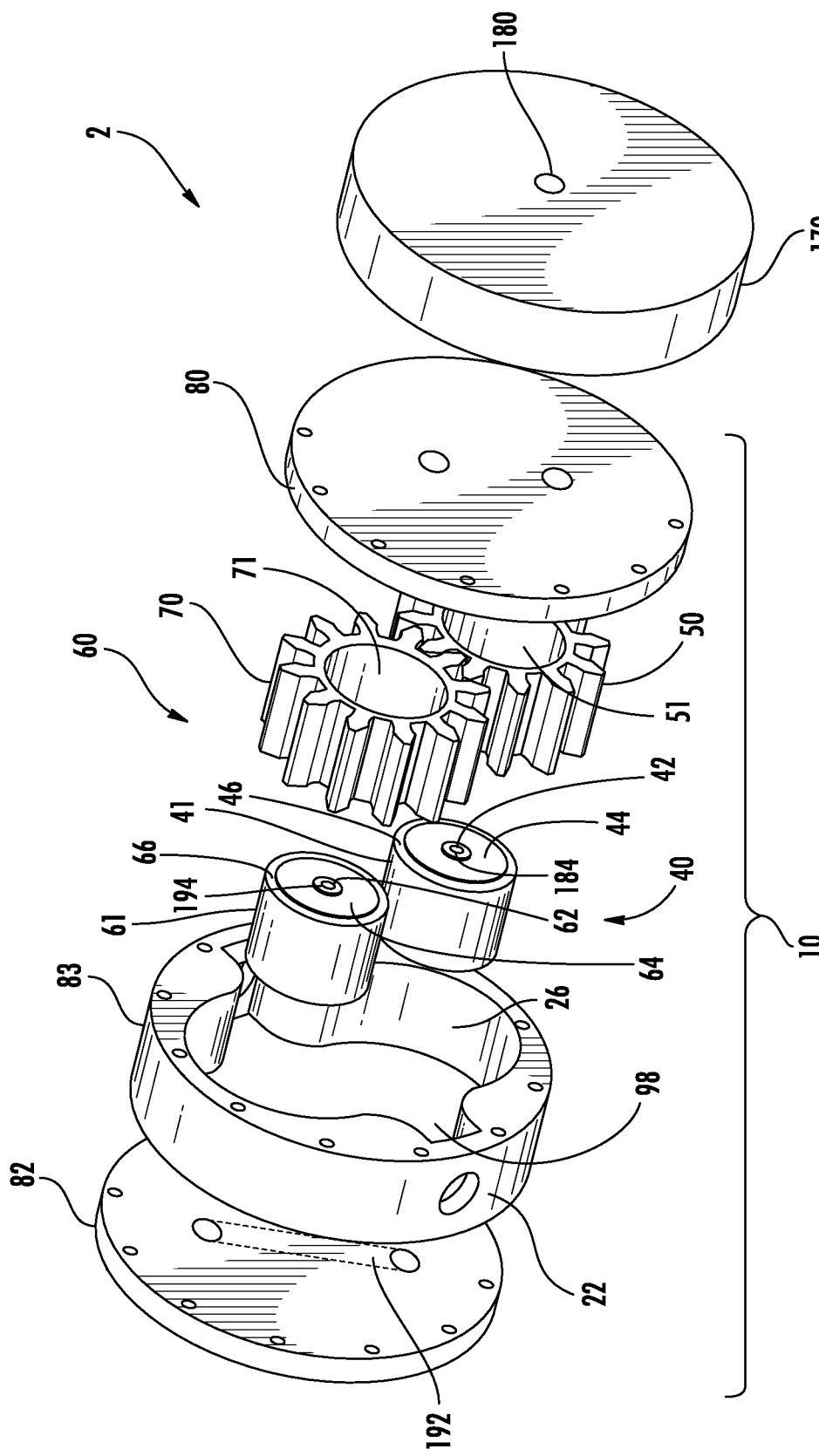
FIG. 2 shows an exploded view of an exemplary embodiment of a pump assembly having an external gear pump and storage device.

FIG. 2 shows an exploded view of an exemplary embodiment of a pump assembly, e.g., pump assembly 2 having the pump 10 and the storage device 170. For clarity, the valve assemblies are not shown. The pump 10 includes two fluid drivers 40, 60 that respectively include prime movers and fluid displacement members. In the illustrated exemplary embodiment of FIG. 2, the prime movers are electric motors 41, 61 and the fluid displacement members are spur gears 50, 70. In this embodiment, both pump motors 41, 61 are disposed inside the gears 50, 70. As seen in FIG. 2, the pump 10 represents a positive-displacement (or fixed displacement) gear pump. The pump 10 has a casing 20 that includes end plates 80, 82 and a pump body 83. These two plates 80, 82 and the pump body 83 can be connected by a plurality of through bolts and nuts (not shown) and the inner surface 26 defines an inner volume 98. To prevent leakage, O-rings or other similar devices can be disposed between the end plates 80, 82 and the pump body 83. The casing 20 has a port 22 and a port 24 (see also FIG. 3), which are in fluid communication with the inner volume 98. During operation and based on the direction of flow, one of the ports 22, 24 is the pump inlet port and the other is the pump outlet port. In an exemplary embodiment, the ports 22, 24 of the casing 20 are round through-holes on opposing side walls of the casing 20. However, the shape is not limiting and the through-holes can have other shapes. In addition, one or both of the ports 22, 44 can be located on either the top or bottom of the casing. Of course, the ports 22, 24 must be located such that one port is on the inlet side of the pump and one port is on the outlet side of the pump.

As seen in FIG. 2, the pair of gears 50, 70 are disposed in the internal volume 98. Each of the gears 50, 70 has a plurality of gear teeth 52, 72 extending radially outward from the respective gear bodies. The gear teeth 52, 72, when rotated by, e.g., electric motors 41, 61, transfer fluid from the inlet to the outlet. In some embodiments, the pump 10 is bi-directional. Thus, either port 22, 24 can be the inlet port, depending on the direction of rotation of gears 50, 70, and the other port will be the outlet port. The gears 50, 70 have cylindrical openings 51, 71 along an axial centerline of the respective gear bodies. The cylindrical openings 51, 71 can extend either partially through or the entire length of the gear bodies. The cylindrical openings are sized to accept the pair of motors 41, 61. Each motor 41, 61 respectively includes a shaft 42, 62, a stator 44, 64, and a rotor 46, 66.

Figure 3:
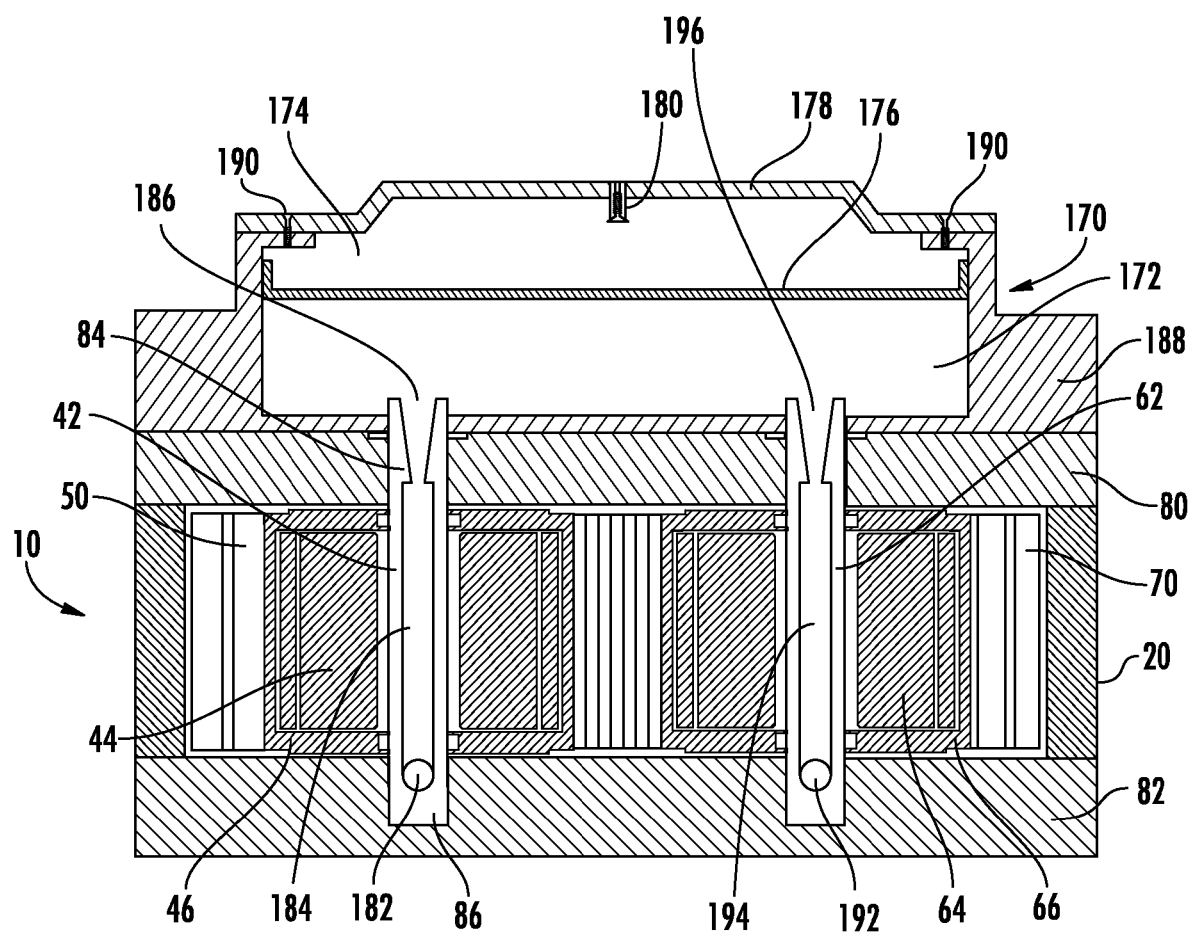
FIG. 3 shows a side cross-sectional view of the exemplary embodiment of FIG. 2.
Figure 3A:
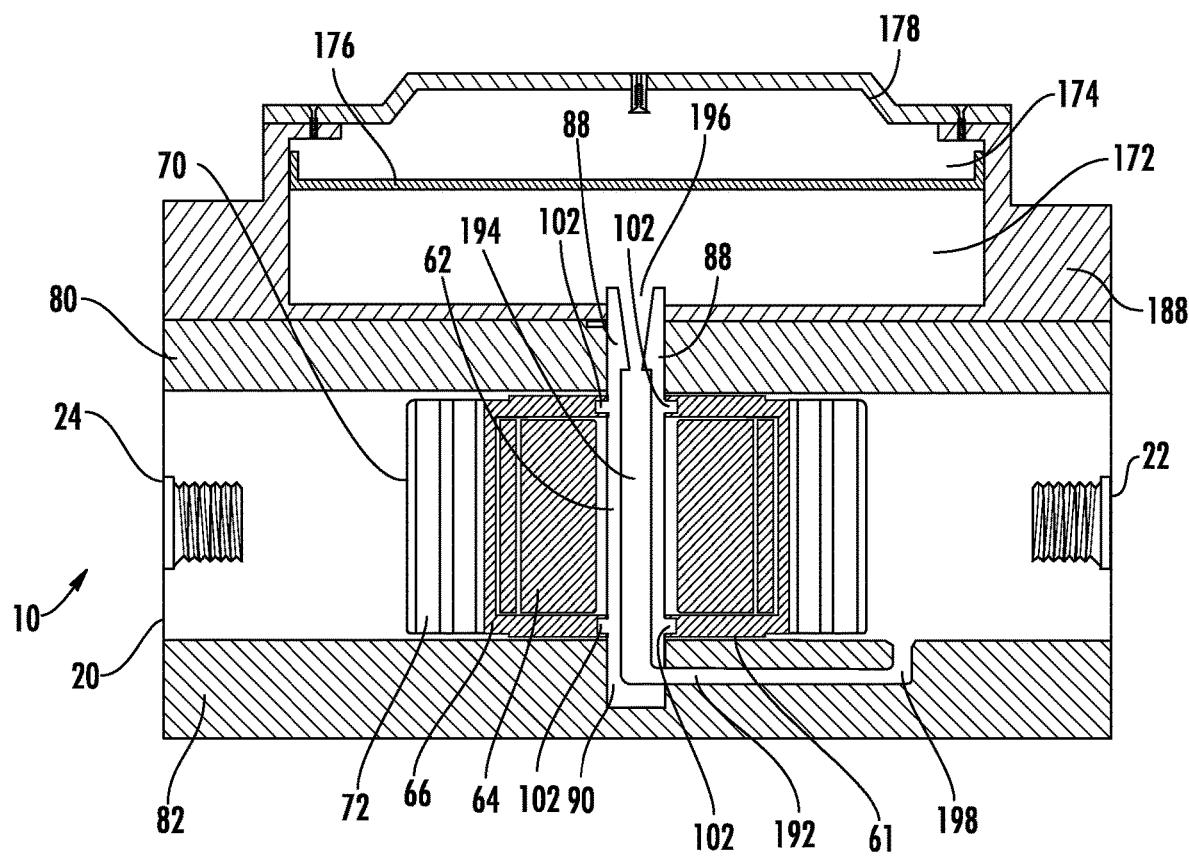
FIG. 3A shows another side cross-sectional view of the exemplary embodiment of FIG. 2.
Figure 5:
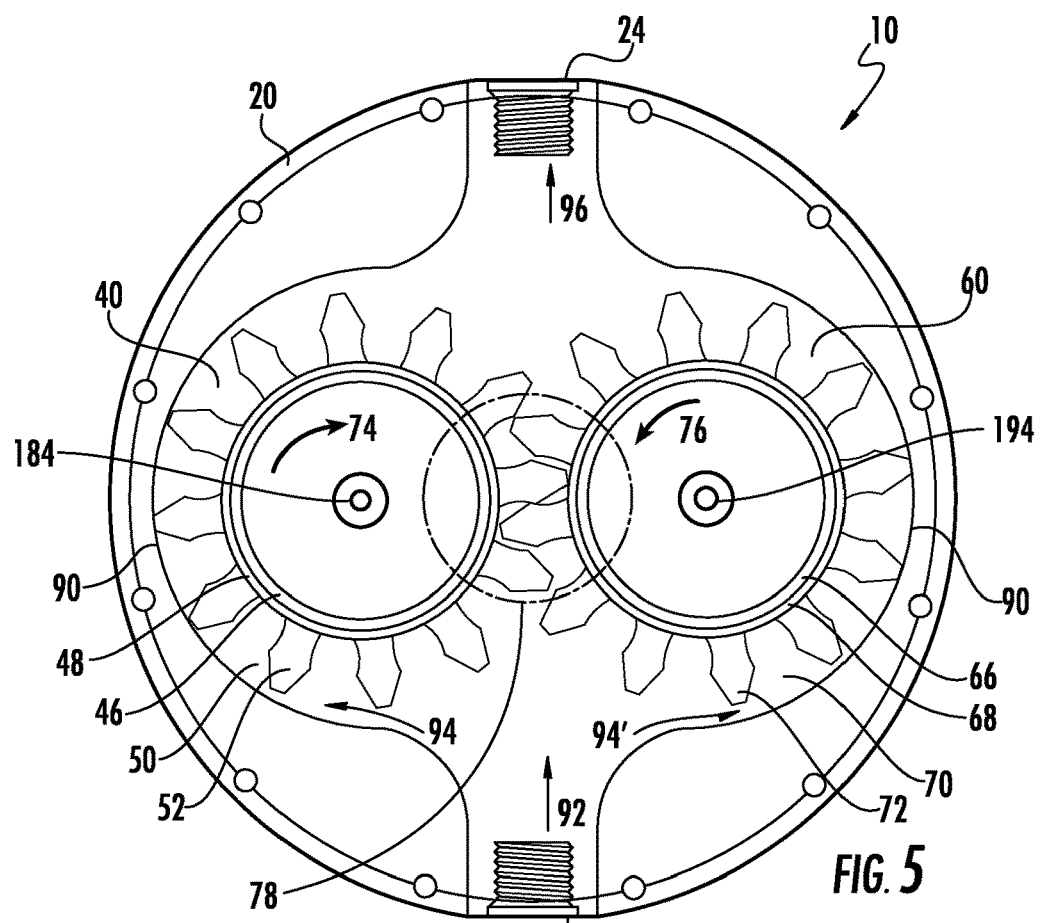
FIG. 5 illustrates an exemplary flow path of the external gear pump of FIG. 2.

FIG. 3 shows a side cross-sectional view of the external gear pump 10 of FIG. 2 but also includes the corresponding cross-sectional view of the storage device 170. FIG. 3A shows another side cross-sectional view of the external gear pump 10 but also includes the corresponding cross-sectional view of the storage device 170. FIG. 5 shows a top cross-sectional view of the external gear pump 10 of FIG. 2. As seen in FIGS. 3, 3A and 5, fluid drivers 40, 60 are disposed in the casing 20. The shafts 42, 62 of the fluid drivers 40, 60 are disposed between the port 22 and the port 24 of the casing 20 and are supported by the plate 80 at one end 84 and the plate 82 at the other end 86. However, the means to support the shafts 42, 62 and thus the fluid drivers 40, 60 are not limited to this arrangement and other configurations to support the shaft can be used. For example, one or both of the shafts 42, 62 can be supported by blocks that are attached to the casing 20 rather than directly by casing 20. The shaft 42 of the fluid driver 40 is disposed in parallel with the shaft 62 of the fluid driver 60 and the two shafts are separated by an appropriate distance so that the gear teeth 52, 72 of the respective gears 50, 70 contact each other when rotated. In the embodiment of FIG. 2, each of the shafts are flow-through type shafts with each shaft having a through-passage that runs axially through the body of the shafts 42, 62. One end of each shaft connects with an opening in the end plate 82 of a channel that connects to one of the ports 22, 24. For example, FIG. 2 illustrates a channel 192 (dotted line) that extends through the end plate 82. One opening of channel 192 accepts one end of the flow-through shaft 62 while the other end of channel 192 opens to port 22 of the pump 10. The other end of each flow-through shaft 42, 62 extends into the fluid chamber 172 (see FIG. 3) via openings in end plate 80. The configuration and function of the flow-through shafts are discussed further below.

As seen in FIGS. 3, 3A and 5, the stators 44, 64 of motors 41, 61 are disposed radially between the respective flow-through shafts 42, 62 and the rotors 46, 66. The stators 44, 64 are fixedly connected to the respective flow-through shafts 42, 62, which are fixedly connected to the openings in the casing 20. For example, the flow-through shafts 42, 62 can be attached to openings of the channels (e.g., channel 192) in the end plate 80 and the openings in end plate 82 for connection to the storage device 170. The flow-through shafts can be attached by threaded fittings, press fit, interference fit, soldering, welding, any appropriate combination thereof or by other known means. The rotors 46, 66 are disposed radially outward of the stators 44, 64 and surround the respective stators 44, 64. Thus, the motors 41, 61 in this embodiment are of an outer-rotor motor arrangement (or an external-rotor motor arrangement), which means that that the outside of the motor rotates and the center of the motor is stationary. In contrast, in an internal-rotor motor arrangement, the rotor is attached to a central shaft that rotates. In an exemplary embodiment, the electric motors 41, 61 are multi directional motors. That is, either motor can operate to create rotary motion either clockwise or counter-clockwise depending on operational needs. Further, in an exemplary embodiment, the motors 41, 61 are variable speed motors in which the speed of the rotor and thus the attached gear can be varied to create various volume flows and pump pressures.

As discussed above, the gear bodies can include cylindrical openings 51, 71 which receive motors 41, 61. In an exemplary embodiment, the fluid drivers 40, 60 can respectively include outer support members 48, 68 (see FIG. 5) which aid in coupling the motors 41,61 to the gears 50, 60 and in supporting the gears 50, 60 on motors 41,61. Each of the support members 48, 68 can be, for example, a sleeve that is initially attached to either an outer casing of the motors 41,61 or an inner surface of the cylindrical openings 51, 71. The sleeves can be attached by using an interference fit, a press fit, an adhesive, screws, bolts, a welding or soldering method, or other means that can attach the support members to the cylindrical openings. Similarly, the final coupling between the motors 41, 61 and the gears 50, 60 using the support members 48, 68 can be by using an interference fit, a press fit, screws, bolts, adhesive, a welding or soldering method, or other means to attach the motors to the support members. The sleeves can be of different thicknesses to, e.g., facilitate the attachment of motors 41, 61 with different physical sizes to the gears 50, 70 or vice versa. In addition, if the motor casings and the gears are made of materials that are not compatible, e.g., chemically or otherwise, the sleeves can be made of materials that are compatible with both the gear composition and motor casing composition. In some embodiments, the support members 48, 68 can be configured as a sacrificial piece. That is, support members 48, 68 are configured to be the first to fail, e.g., due to excessive stresses, temperatures, or other causes of failure, in comparison to the gears 50, 70 and motors 41, 61. This allows for a more economic repair of the pump 10 in the event of failure. In some embodiments, the outer support member 48, 68 is not a separate piece but an integral part of the casing for the motors 41, 61 or part of the inner surface of the cylindrical openings 51, 71 of the gears 50, 70. In other embodiments, the motors 41, 61 can support the gears 50, 60 (and the plurality of first gear teeth 52, 62) on their outer surfaces without the need for the outer support members 48, 68. For example, the motor casings can be directly coupled to the inner surface of the cylindrical opening 51, 71 of the gears 50, 70 by using an interference fit, a press fit, screws, bolts, an adhesive, a welding or soldering method, or other means to attach the motor casing to the cylindrical opening. In some embodiments, the outer casings of the motors 41, 61 can be, e.g., machined, cast, or other means to shape the outer casing to form a shape of the gear teeth 52, 72. In still other embodiments, the plurality of gear teeth 52, 72 can be integrated with the respective rotors 46, 66 such that each gear/rotor combination forms one rotary body.

As shown in FIG. 2, the storage device 170 can be mounted to the pump 10, e.g., on the end plate 80 to form one integrated unit. The storage device 170 can store fluid to be pumped by the pump 10 and supply fluid needed to perform a commanded operation. In some embodiments, the storage device 170 in the pump 10 is a pressurized vessel that stores the fluid for the system. In such embodiments, the storage device 170 is pressurized to a specified pressure that is appropriate for the system. As shown in FIG. 3A, the storage device 170 includes a vessel housing 188, a fluid chamber 172, a gas chamber 174, a separating element (or piston) 176, and a cover 178. The gas chamber 174 is separated from the fluid chamber 172 by the separating element 176. One or more sealing elements (not shown) may be provided along with the separating element 176 to prevent a leak between the two chambers 172, 174. At the center of the cover 178, a charging port 180 is provided such that the storage device 170 can be pressurized with a gas by way of charging the gas, nitrogen for example, through the charging port 180. Of course, the charging port 180 may be located at any appropriate location on the storage device 170. The cover 178 may be attached to the vessel housing 188 via a plurality of bolts 190 or other suitable means. One or more seals (not shown) may be provided between the cover 178 and the vessel housing 188 to prevent leakage of the gas.

In an exemplary embodiment, as shown in FIG. 3, the flow-through shaft 42 of fluid driver 40 penetrates through an opening in the end plate 80 and into the fluid chamber 172 of the pressurized vessel. The flow-through shaft 42 includes through-passage 184 that extends through the interior of shaft 42. The through-passage 184 has a port 186 at an end of the flow-through shaft 42 that leads to the fluid chamber 172 such that the through-passage 184 is in fluid communication with the fluid chamber 172. At the other end of flow-through shaft 42, the through-passage 184 connects to a fluid passage (not shown) that extends through the end plate 82 and connects to either port 22 or 24 such that the through-passage 184 is in fluid communication with either the port 22 or the port 24. In this way, the fluid chamber 172 is in fluid communication with a port of pump 10.

In some embodiments, a second shaft can also include a through-passage that provides fluid communication between a port of the pump and a fluid storage device. For example, as shown in FIGS. 2, 3 and 3A, the flow-through shaft 62 also penetrates through an opening in the end plate 80 and into the fluid chamber 172 of the storage device 170. The flow-through shaft 62 includes a through-passage 194 that extends through the interior of shaft 62. The through-passage 194 has a port 196 at an end of flow-through shaft 62 that leads to the fluid chamber 172 such that the through-passage 194 is in fluid communication with the fluid chamber 172. At the other end of flow-through shaft 62, the through-passage 194 connects to a fluid channel 192 that extends through the end plate 82 and connects to either port 22 or 24 (e.g., FIGS. 2 and 3A illustrate a connection to port 22) such that the through-passage 194 is in fluid communication with a port of the pump 10. In this way, the fluid chamber 172 is in fluid communication with a port of the pump 10.

In the exemplary embodiment shown in FIG. 3, the through-passage 184 and the through-passage 194 share a common storage device 170. That is, fluid is provided to or withdrawn from the common storage device 170 via the through-passages 184, 194. In some embodiments, the through-passages 184 and 194 connect to the same port of the pump, e.g., either to port 22 or port 24. In these embodiments, the storage device 170 is configured to maintain a desired pressure at the appropriate port of the pump 10 in, for example, closed-loop fluid systems. In other embodiments, the passages 184 and 194 connect to opposite ports of the pump 10. This arrangement can be advantageous in systems where the pump 10 is bi-directional. Appropriate valves (not shown) can be installed in either type of arrangement to prevent adverse operations of the pump 10. For example, the valves (not shown) can be appropriately operated to prevent a short-circuit between the inlet and outlet of the pump 10 via the storage device 170 in configurations where the through-passages 184 and 194 go to different ports of the pump 10.

In an exemplary embodiment, the storage device 170 may be pre-charged to a commanded pressure with a gas, e.g., nitrogen or some other suitable gas, in the gas chamber 174 via the charging port 180. For example, the storage device 170 may be pre-charged to at least 75% of the minimum required pressure of the fluid system and, in some embodiments, to at least 85% of the minimum required pressure of the fluid system. However, in other embodiments, the pressure of the storage device 170 can be varied based on operational requirements of the fluid system. The amount of fluid stored in the storage device 170 can vary depending on the requirements of the fluid system in which the pump 10 operates. The amount of fluid stored can depend on changes in fluid volume due to changes in temperature of the fluid during operation and due to the environment in which the hydraulic transmission assembly and system will operate.

As the storage device 170 is pressurized, via, e.g., the charging port 180 on the cover 178, the pressure exerted on the separating element 176 compresses any liquid in the fluid chamber 172. As a result, the pressurized fluid is pushed through the through-passages 184 and 194 and then through the channels in the end plate 82 (e.g., channel 192 for through-passage 194—see FIGS. 2 and 3A) into a port of the pump 10 (or ports—depending on the arrangement) until the pressure in the storage device 170 is in equilibrium with the pressure at the port (ports) of the pump 10. During operation, if the pressure at the relevant port drops below the pressure in the fluid chamber 172, the pressurized fluid from the storage device 170 is pushed to the appropriate port until the pressures equalize. Conversely, if the pressure at the relevant port goes higher than the pressure of fluid chamber 172, the fluid from the port is pushed to the fluid chamber 172 via through-passages 184 and 194.

Figure 4:
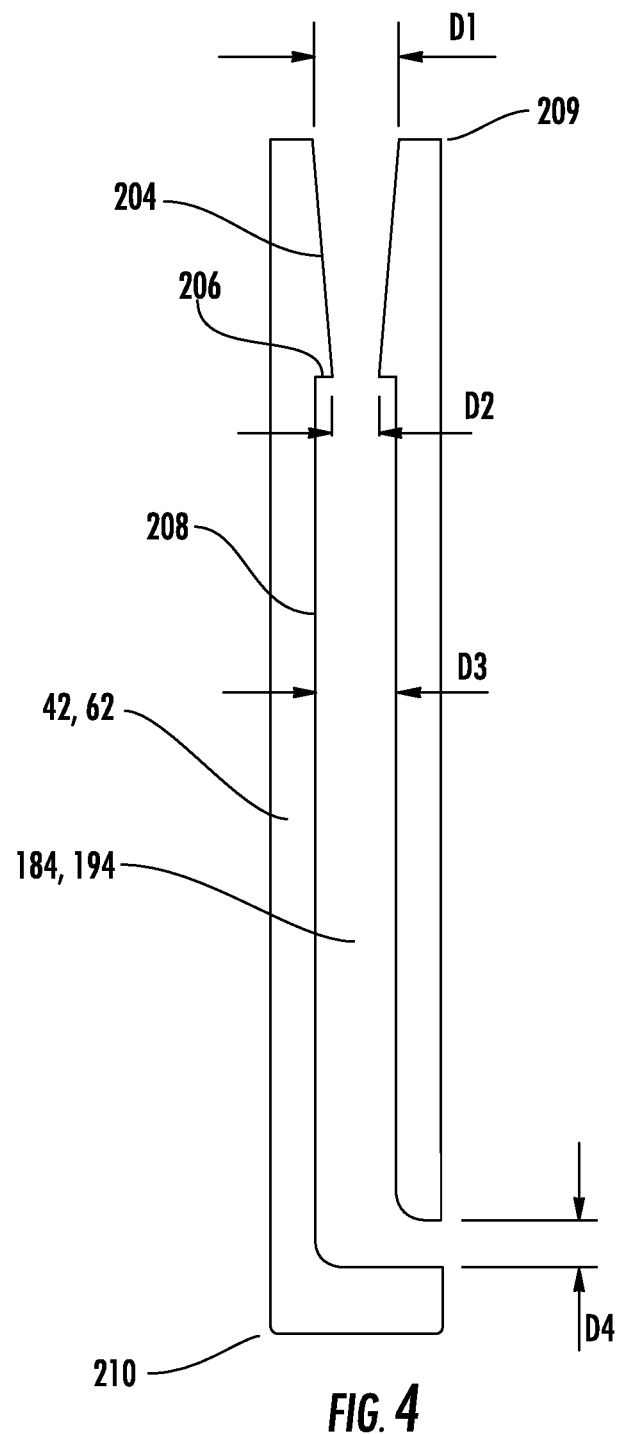
FIG. 4 shows an enlarged view of a preferred embodiment of a flow-through shaft with a through-passage.

FIG. 4 shows an enlarged view of an exemplary embodiment of the flow-through shaft 42, 62. The through-passage 184, 194 extend through the flow-through shaft 42, 62 from end 209 to end 210 and includes a tapered portion (or converging portion) 204 at the end 209 (or near the end 209) of the shaft 42, 62. The end 209 is in fluid communication with the storage device 170. The tapered portion 204 starts at the end 209 (or near the end 209) of the flow-through shaft 42, 62, and extends part-way into the through-passage 184, 194 of the flow-through shaft 42, 62 to point 206. In some embodiments, the tapered portion can extend 5% to 50% the length of the through-passage 184, 194. Within the tapered portion 204, the diameter of the through-passage 184, 194, as measured on the inside of the shaft 42, 62, is reduced as the tapered portion extends to end 206 of the flow-through shaft 42, 62. As shown in FIG. 4, the tapered portion 204 has, at end 209, a diameter D1 that is reduced to a smaller diameter D2 at point 206 and the reduction in diameter is such that flow characteristics of the fluid are measurably affected. In some embodiments, the reduction in the diameter is linear. However, the reduction in the diameter of the through-passage 184, 194 need not be a linear profile and can follow a curved profile, a stepped profile, or some other desired profile. Thus, in the case where the pressurized fluid flows from the storage device 170 and to the port of the pump via the through-passage 184, 194, the fluid encounters a reduction in diameter (D1→D2), which provides a resistance to the fluid flow and slows down discharge of the pressurized fluid from the storage device 170 to the pump port. By slowing the discharge of the fluid from the storage device 170, the storage device 170 behaves isothermally or substantially isothermally. It is known in the art that near-isothermal expansion/compression of a pressurized vessel, i.e. limited variation in temperature of the fluid in the pressurized vessel, tends to improve the thermal stability and efficiency of the pressurized vessel in a fluid system. Thus, in this exemplary embodiment, as compared to some other exemplary embodiments, the tapered portion 204 facilitates a reduction in discharge speed of the pressurized fluid from the storage device 170, which provides for thermal stability and efficiency of the storage device 170.

As the pressurized fluid flows from the storage device 170 to a port of the pump 10, the fluid exits the tapered portion 204 at point 206 and enters an expansion portion (or throat portion) 208 where the diameter of the through-passage 184, 194 expands from the diameter D2 to a diameter D3, which is larger than D2, as measured to manufacturing tolerances. In the embodiment of FIG. 4, there is step-wise expansion from D2 to D3. However, the expansion profile does not have to be performed as a step and other profiles are possible so long as the expansion is done relatively quickly. However, in some embodiments, depending on factors such the fluid being pumped and the length of the through-passage 184, 194, the diameter of the expansion portion 208 at point 206 can initially be equal to diameter D2, as measured to manufacturing tolerances, and then gradually expand to diameter D3. The expansion portion 208 of the through-passage 184, 194 serves to stabilize the flow of the fluid from the storage device 170. Flow stabilization may be needed because the reduction in diameter in the tapered portion 204 can induce an increase in speed of the fluid due to nozzle effect (or Venturi effect), which can generate a disturbance in the fluid. However, in the exemplary embodiments of the present disclosure, as soon as the fluid leaves the tapered portion 204, the turbulence in the fluid due to the nozzle effect is mitigated by the expansion portion 208. In some embodiments, the third diameter D3 is equal to the first diameter D1, as measured to manufacturing tolerances. In the exemplary embodiments of the present disclosure, the entire length of the flow-through shafts 42, 62 can be used to incorporate the configuration of through-passages 184, 194 to stabilize the fluid flow.

The stabilized flow exits the through passage 184, 194 at end 210. The through-passage 184, 194 at end 210 can be fluidly connected to either the port 22 or port 24 of the pump 10 via, e.g., channels in the end plate 82 (e.g., channel 192 for through-passage 194—see FIGS. 2 and 3A). Of course, the flow path is not limited to channels within the pump casing and other means can be used. For example, the port 210 can be connected to external pipes and/or hoses that connect to port 22 or port 24 of pump 10. In some embodiments, the through-passage 184, 194 at end 210 has a diameter D4 that is smaller than the third diameter D3 of the expansion portion 208. For example, the diameter D4 can be equal to the diameter D2, as measured to manufacturing tolerances. In some embodiments, the diameter D1 is larger than the diameter D2 by 50 to 75% and larger than diameter D4 by 50 to 75%. In some embodiments, the diameter D3 is larger than the diameter D2 by 50 to 75% and larger than diameter D4 by 50 to 75%.

The cross-sectional shape of the fluid passage is not limiting. For example, a circular-shaped passage, a rectangular-shaped passage, or some other desired shaped passage may be used. Of course, the through-passage in not limited to a configuration having a tapered portion and an expansion portion and other configurations, including through-passages having a uniform cross-sectional area along the length of the through-passage, can be used. Thus, configuration of the through-passage of the flow-through shaft can vary without departing from the scope of the present disclosure.

In the above embodiments, the flow-through shafts 42, 62 penetrate a short distance into the fluid chamber 172. However, in other embodiments, either or both of the flow-through shafts 42, 62 can be disposed such that the ends are flush with a wall of the fluid chamber 172. In some embodiments, the end of the flow-through shaft can terminate at another location such as, e.g., in the end plate 80, and suitable means such, e.g., channels, hoses, or pipes can be used so that the shaft is in fluid communication with the fluid chamber 172. In this case, the flow-through shafts 42, 62 may be disposed completely between the upper and lower plates 80, 82 without penetrating into the fluid chamber 172.

In the above embodiments, the storage device 170 is mounted on the end plate 80 of the casing 20. However, in other embodiments, the storage device 170 can be mounted on the end plate 82 of the casing 20. In still other embodiments, the storage device 170 may be disposed spaced apart from the pump 10. In this case, the storage device 170 may be in fluid communication with the pump 10 via a connecting medium, for example hoses, tubes, pipes, or other similar devices. An exemplary operation of the pump 10 is discussed below.

FIG. 5 illustrates an exemplary fluid flow path of an exemplary embodiment of the external gear pump 10. The ports 22, 24, and a contact area 78 between the plurality of first gear teeth 52 and the plurality of second gear teeth 72 are substantially aligned along a single straight path. However, the alignment of the ports are not limited to this exemplary embodiment and other alignments are permissible. For explanatory purpose, the gear 50 is rotatably driven clockwise 74 by motor 41 and the gear 70 is rotatably driven counter-clockwise 76 by the motor 61. With this rotational configuration, port 22 is the inlet side of the gear pump 10 and port 24 is the outlet side of the gear pump 10. In some exemplary embodiments, both gears 50, 70 are respectively independently driven by the separately provided motors 41, 61.

As seen in FIG. 5, the fluid to be pumped is drawn into the casing 20 at port 22 as shown by an arrow 92 and exits the pump 10 via port 24 as shown by arrow 96. The pumping of the fluid is accomplished by the gear teeth 52, 72. As the gear teeth 52, 72 rotate, the gear teeth rotating out of the contact area 78 form expanding inter-tooth volumes between adjacent teeth on each gear. As these inter-tooth volumes expand, the spaces between adjacent teeth on each gear are filled with fluid from the inlet port, which is port 22 in this exemplary embodiment. The fluid is then forced to move with each gear along the interior wall 90 of the casing 20 as shown by arrows 94 and 94'. That is, the teeth 52 of gear 50 force the fluid to flow along the path 94 and the teeth 72 of gear 70 force the fluid to flow along the path 94'. Very small clearances between the tips of the gear teeth 52, 72 on each gear and the corresponding interior wall 90 of the casing 20 keep the fluid in the inter-tooth volumes trapped, which prevents the fluid from leaking back towards the inlet port. As the gear teeth 52, 72 rotate around and back into the contact area 78, shrinking inter-tooth volumes form between adjacent teeth on each gear because a corresponding tooth of the other gear enters the space between adjacent teeth. The shrinking inter-tooth volumes force the fluid to exit the space between the adjacent teeth and flow out of the pump 10 through port 24 as shown by arrow 96. In some embodiments, the motors 41, 61 are bi-directional and the rotation of motors 41, 61 can be reversed to reverse the direction fluid flow through the pump 10, i.e., the fluid flows from the port 24 to the port 22.

To prevent backflow, i.e., fluid leakage from the outlet side to the inlet side through the contact area 78, contact between a tooth of the first gear 50 and a tooth of the second gear 70 in the contact area 78 provides sealing against the backflow. The contact force is sufficiently large enough to provide substantial sealing but, unlike driver-driven systems, the contact force is not so large as to significantly drive the other gear. In driver-driven systems, the force applied by the driver gear turns the driven gear. That is, the driver gear meshes with (or interlocks with) the driven gear to mechanically drive the driven gear. While the force from the driver gear provides sealing at the interface point between the two teeth, this force is much higher than that necessary for sealing because this force must be sufficient enough to mechanically drive the driven gear to transfer the fluid at the desired flow and pressure.

In some exemplary embodiments, however, the gears 50, 70 of the pump 10 do not mechanically drive the other gear to any significant degree when the teeth 52, 72 form a seal in the contact area 78. Instead, the gears 50, 70 are rotatably driven independently such that the gear teeth 52, 72 do not grind against each other. That is, the gears 50, 70 are synchronously driven to provide contact but not to grind against each other. Specifically, rotation of the gears 50, 70 are synchronized at suitable rotation rates so that a tooth of the gear 50 contacts a tooth of the second gear 70 in the contact area 78 with sufficient enough force to provide substantial sealing, i.e., fluid leakage from the outlet port side to the inlet port side through the contact area 78 is substantially eliminated. However, unlike a driver-driven configuration, the contact force between the two gears is insufficient to have one gear mechanically drive the other to any significant degree. Precision control of the motors 41, 61, will ensure that the gear positons remain synchronized with respect to each other during operation.

In some embodiments, rotation of the gears 50, 70 is at least 99% synchronized, where 100% synchronized means that both gears 50, 70 are rotated at the same rpm. However, the synchronization percentage can be varied as long as substantial sealing is provided via the contact between the gear teeth of the two gears 50, 70. In exemplary embodiments, the synchronization rate can be in a range of 95.0% to 100% based on a clearance relationship between the gear teeth 52 and the gear teeth 72. In other exemplary embodiments, the synchronization rate is in a range of 99.0% to 100% based on a clearance relationship between the gear teeth 52 and the gear teeth 72, and in still other exemplary embodiments, the synchronization rate is in a range of 99.5% to 100% based on a clearance relationship between the gear teeth 52 and the gear teeth 72. Again, precision control of the motors 41, 61, will ensure that the gear positons remain synchronized with respect to each other during operation. By appropriately synchronizing the gears 50, 70, the gear teeth 52, 72 can provide substantial sealing, e.g., a backflow or leakage rate with a slip coefficient in a range of 5% or less. For example, for typical hydraulic fluid at about 120 deg. F., the slip coefficient can be can be 5% or less for pump pressures in a range of 3000 psi to 5000 psi, 3% or less for pump pressures in a range of 2000 psi to 3000 psi, 2% or less for pump pressures in a range of 1000 psi to 2000 psi, and 1% or less for pump pressures in a range up to 1000 psi. Of course, depending on the pump type, the synchronized contact can aid in pumping the fluid. For example, in certain internal-gear georotor configurations, the synchronized contact between the two fluid drivers also aids in pumping the fluid, which is trapped between teeth of opposing gears. In some exemplary embodiments, the gears 50, 70 are synchronized by appropriately synchronizing the motors 41, 61. Synchronization of multiple motors is known in the relevant art, thus detailed explanation is omitted here.

Figure 5A:
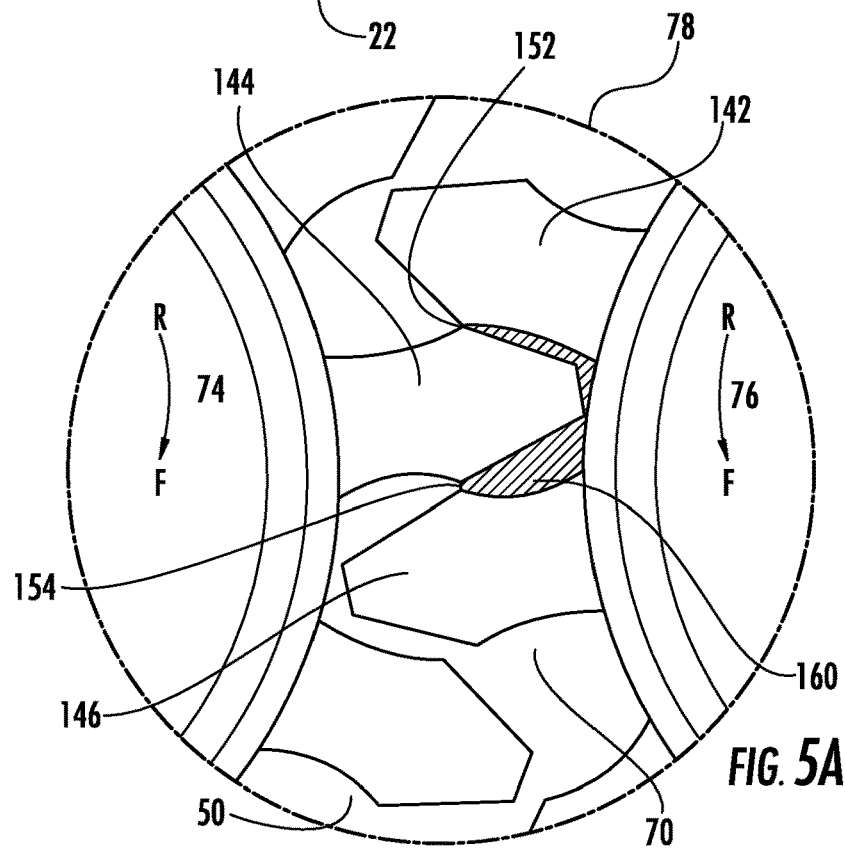
FIG. 5A shows a cross-sectional view illustrating one-sided contact between two gears in an overlapping area of FIG. 5.

In an exemplary embodiment, the synchronizing of the gears 50, 70 provides one-sided contact between a tooth of the gear 50 and a tooth of the gear 70. FIG. 5A shows a cross-sectional view illustrating this one-sided contact between the two gears 50, 70 in the contact area 78. For illustrative purposes, gear 50 is rotatably driven clockwise 74 and the gear 70 is rotatably driven counter-clockwise 76 independently of the gear 50. Further, the gear 70 is rotatably driven faster than the gear 50 by a fraction of a second, 0.01 sec/revolution, for example. This rotational speed difference between the gear 50 and gear 70 enables one-sided contact between the two gears 50, 70, which provides substantial sealing between gear teeth of the two gears 50, 70 to seal between the inlet port and the outlet port, as described above. Thus, as shown in FIG. 5A, a tooth 142 on the gear 70 contacts a tooth 144 on the gear 50 at a point of contact 152. If a face of a gear tooth that is facing forward in the rotational direction 74, 76 is defined as a front side (F), the front side (F) of the tooth 142 contacts the rear side (R) of the tooth 144 at the point of contact 152. However, the gear tooth dimensions are such that the front side (F) of the tooth 144 is not in contact with (i.e., spaced apart from) the rear side (R) of tooth 146, which is a tooth adjacent to the tooth 142 on the gear 70. Thus, the gear teeth 52, 72 are configured such that there is one-sided contact in the contact area 78 as the gears 50, 70 are driven. As the tooth 142 and the tooth 144 move away from the contact area 78 as the gears 50, 70 rotate, the one-sided contact formed between the teeth 142 and 144 phases out. As long as there is a rotational speed difference between the two gears 50, 70, this one-sided contact is formed intermittently between a tooth on the gear 50 and a tooth on the gear 70. However, because as the gears 50, 70 rotate, the next two following teeth on the respective gears form the next one-sided contact such that there is always contact and the backflow path in the contact area 78 remains substantially sealed. That is, the one-sided contact provides sealing between the ports 22 and 24 such that fluid carried from the pump inlet to the pump outlet is prevented (or substantially prevented) from flowing back to the pump inlet through the contact area 78.

In FIG. 5A, the one-sided contact between the tooth 142 and the tooth 144 is shown as being at a particular point, i.e. point of contact 152. However, a one-sided contact between gear teeth in the exemplary embodiments is not limited to contact at a particular point. For example, the one-sided contact can occur at a plurality of points or along a contact line between the tooth 142 and the tooth 144. For another example, one-sided contact can occur between surface areas of the two gear teeth. Thus, a sealing area can be formed when an area on the surface of the tooth 142 is in contact with an area on the surface of the tooth 144 during the one-sided contact. The gear teeth 52, 72 of each gear 50, 70 can be configured to have a tooth profile (or curvature) to achieve one-sided contact between the two gear teeth. In this way, one-sided contact in the present disclosure can occur at a point or points, along a line, or over surface areas. Accordingly, the point of contact 152 discussed above can be provided as part of a location (or locations) of contact, and not limited to a single point of contact.

In some exemplary embodiments, the teeth of the respective gears 50, 70 are configured so as to not trap excessive fluid pressure between the teeth in the contact area 78. As illustrated in FIG. 5A, fluid 160 can be trapped between the teeth 142, 144, 146. While the trapped fluid 160 provides a sealing effect between the pump inlet and the pump outlet, excessive pressure can accumulate as the gears 50, 70 rotate. In a preferred embodiment, the gear teeth profile is such that a small clearance (or gap) 154 is provided between the gear teeth 144, 146 to release pressurized fluid. Such a configuration retains the sealing effect while ensuring that excessive pressure is not built up. Of course, the point, line or area of contact is not limited to the side of one tooth face contacting the side of another tooth face. Depending on the type of fluid displacement member, the synchronized contact can be between any surface of at least one projection (e.g., bump, extension, bulge, protrusion, other similar structure or combinations thereof) on the first fluid displacement member and any surface of at least one projection (e.g., bump, extension, bulge, protrusion, other similar structure or combinations thereof) or an indent (e.g., cavity, depression, void or similar structure) on the second fluid displacement member. In some embodiments, at least one of the fluid displacement members can be made of or include a resilient material, e.g., rubber, an elastomeric material, or another resilient material, so that the contact force provides a more positive sealing area.

As the pump 10 operates, there can be pressure spikes at the inlet and outlet ports (e.g., ports 22 and 24, respectively, in the example) of the pump due to, e.g., operation of an actuator (e.g., a hydraulic motor or another type of fluid operated motor), the load that is being operated by the actuator, valves that are being operated in the system or for some other reason. These pressure spikes can cause damage to components in the fluid system. In some embodiments, the storage device 170 can be used to smooth out or dampen the pressure spikes. For example, the storage device 170 can be pressurized to a desire pressure and, as discussed above, connected to either the inlet port or the outlet port (or both with appropriate valves). When a pressure spike occurs at the port, the pressure spike is transmitted to the storage device 170, which then dampens the pressure spike due to the compressibility of the gas in the gas chamber 174. In addition, the fluid system in which the pump 10 operates may need to either add or remove fluid from the main fluid flow path of the fluid system due to, e.g., operation of the hydraulic motor. For example, the fluid volume in a closed-loop system may vary during operation because changes in fluid temperature necessitate the addition or removal of fluid or for some other reason. In such cases, any extra fluid in the system will need to be stored and any fluid deficiency will need to be replenished. The storage device 170 can store and release the required amount of fluid for stable operation.

For example, in situations where the fluid system needs additional fluid during the operation of the pump 10, e.g., a volume decrease due to a decrease of the fluid temperature or for some other reason, the pressure of the inlet port, which is port 22 in the embodiment of FIG. 5, will drop below the pressure of fluid chamber 172 in the storage device 170. The pressure difference will cause the pressurized fluid to flow from the storage device 170 to the port 22 via the through-passages 184, 194 and replenish the fluid in the system. Conversely, when fluid needs to be removed from the main fluid flow path, e.g., a volume increase caused by an increase of the fluid temperature or some other reason, the pressure of the fluid at the port 22 will become higher than the pressure in fluid chamber 172. Due to the pressure difference, the fluid will flow from the port 22 to the storage device 170 via through-passages 184, 194 and be stored in the fluid chamber 172 until needed by the system.

In the above discussed exemplary embodiments, both fluid drivers, including the prime movers and fluid displacement members, are integrated into a single pump casing 20. In addition, as described above, exemplary embodiments of the pump include an innovative configuration for fluid communication between at least one storage device and at least one port of the pump. Specifically, the pump can include one or more fluid paths through at least one shaft in the pump to provide fluid communication between at least one port of the pump and at least one fluid storage device that can be attached to the pump. This innovative pump assembly configuration of the pump and storage device of the present disclosure enables a compact arrangement that provides various advantages. First, the space or footprint occupied by the exemplary embodiments of the pump assembly discussed above is significantly reduced by integrating necessary components into a single pump casing and by integrating the fluid communication configuration between a storage device and a port of the pump, when compared to conventional pump systems. In addition, the total weight of the pump system is also reduced by removing unnecessary parts such as hoses or pipes used in conventional pump systems for fluid communication between a pump and a fluid storage device. In addition, this configuration can provide a cooling effect to the prime mover (e.g., motor) that gets heated during the pumping operation, especially at the center when motors are the prime movers. Further, since the pump of the present disclosure has a compact and modular arrangement, it can be easily installed, even at locations where conventional gear pumps and storage devices cannot be installed, and can be easily replaced.

Figure 6:
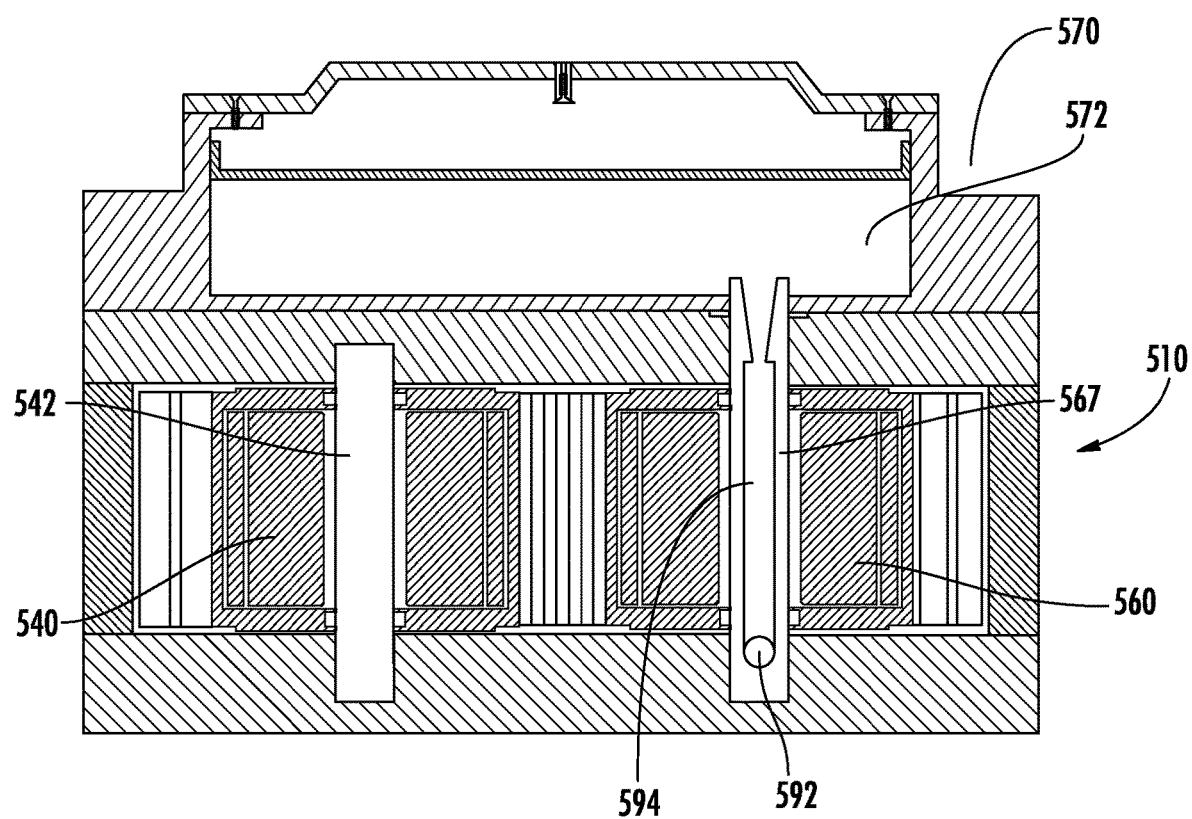
FIG. 6 shows a cross-sectional view of an exemplary embodiment of a pump assembly.

In the above exemplary embodiments, both shafts 42, 62 include a through-passage configuration. However, in some exemplary embodiments, only one of the shafts has a through-passage configuration. For example, FIG. 6 shows a side cross-sectional view of another embodiment of an external gear pump and storage device system. In this embodiment, pump 510 is substantially similar to the exemplary embodiment of the external gear pump 10 shown in FIG. 3A. That is, the operation and function of fluid driver 540 are similar to that of fluid driver 40 and the operation and function of fluid driver 560 are similar to that fluid driver 60. Further, the configuration and function of storage device 570 is similar to that of storage device 170 discussed above. Accordingly, for brevity, a detailed description of the operation of pump 510 and storage device 570 is omitted except as necessary to describe the present exemplary embodiment. As shown in FIG. 6, unlike shaft 42 of fluid driver 40 of pump 10, the shaft 542 of fluid driver 540 does not include a through-passage. Thus, only shaft 562 of fluid driver 560 includes a through-passage 594. The through-passage 594 permits fluid communication between fluid chamber 572 and a port of the pump 510 via a channel 582. Those skilled in the art will recognize that through-passage 594 and channel 592 perform similar functions as through-passage 194 and channel 192 discussed above. Accordingly, for brevity, a detailed description of through-passage 594 and channel 592 and their function within pump 510 are omitted.

Figure 6A:
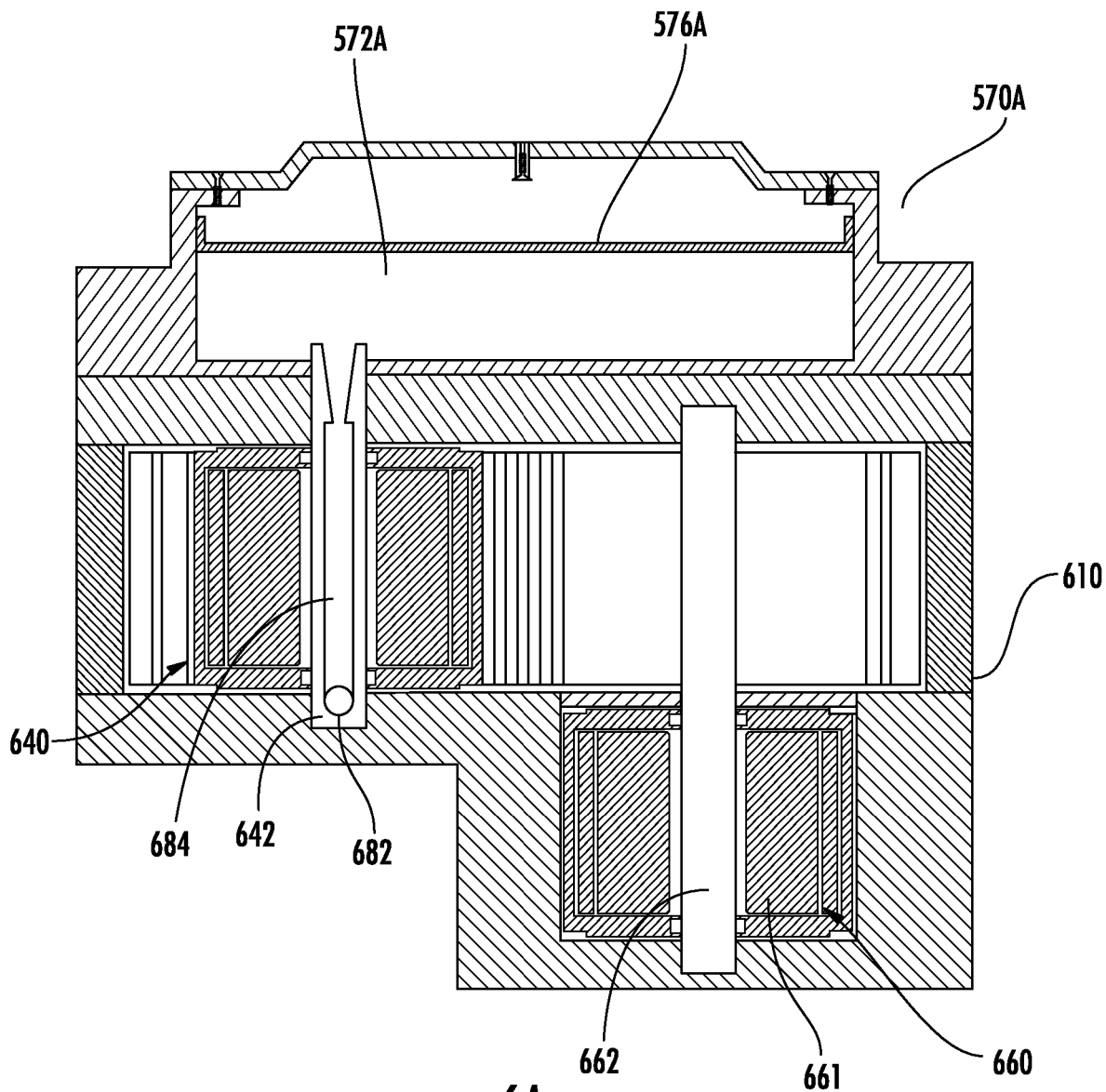
FIG. 6A shows a cross-sectional view of an exemplary embodiment of a pump assembly.

Another single, flow-through shaft pump configuration is shown in FIG. 6A, which shows a side cross-sectional view of another embodiment of an external gear pump and storage device system. In this embodiment, pump 610 is substantially similar to the exemplary embodiment of the external gear pump 10 shown in FIG. 3A, however, one of the fluid drivers is configured such that the motor is disposed adjacent to the gear rather than inside the gear body. As seen in FIG. 6A, the motor 661 of fluid driver 660 is disposed adjacent to gear 670, but the motor 641 for fluid driver 640 is disposed inside the gear 650, similar to configuration of fluid driver 40. In the embodiment of FIG. 6A, the configuration of fluid driver 660 is such that, unlike shaft 62 of fluid driver 60, the shaft 662 of fluid driver 660 rotates. That is, the motor 661 is an inner-rotor motor arrangement in which the stator is fixed to the pump casing and the rotor and shaft 662 are free to rotate. However, it is possible to use an outer-rotor arrangement for motor 661 with appropriate modifications to turn shaft 662. Although the motor 661 of fluid driver 660 is located adjacent to the gear 670 rather than inside the gear body, the operation and function of fluid drivers 640 and 660 are similar to that of fluid drivers 40 and 60. Further, the configuration and function of storage device 570A is similar to that of storage device 170 discussed above. Accordingly, for brevity, a detailed description of the operation of pump 610 and storage device 570A is omitted except as necessary to describe the present exemplary embodiment. As shown in FIG. 6A, unlike shaft 62 of fluid driver 60 of pump 10, the shaft 662 of fluid driver 660 does not include a through-passage. Thus, only shaft 642 of fluid driver 640 includes a through-passage 684. The through-passage 684 permits fluid communication between fluid chamber 572A and a port of the pump 610 via a channel 682. Those skilled in the art will recognize that through-passage 684 and channel 682 perform similar functions as through-passage 184 and channel 192 discussed above. Accordingly, for brevity, a detailed description of through-passage 684 and channel 682 and their function within pump 610 are omitted. Although the above-embodiment shows that the motor 661 is still inside the pump casing, in other embodiments, the motor 661 can be disposed outside the pump casing.

Figure 6B:
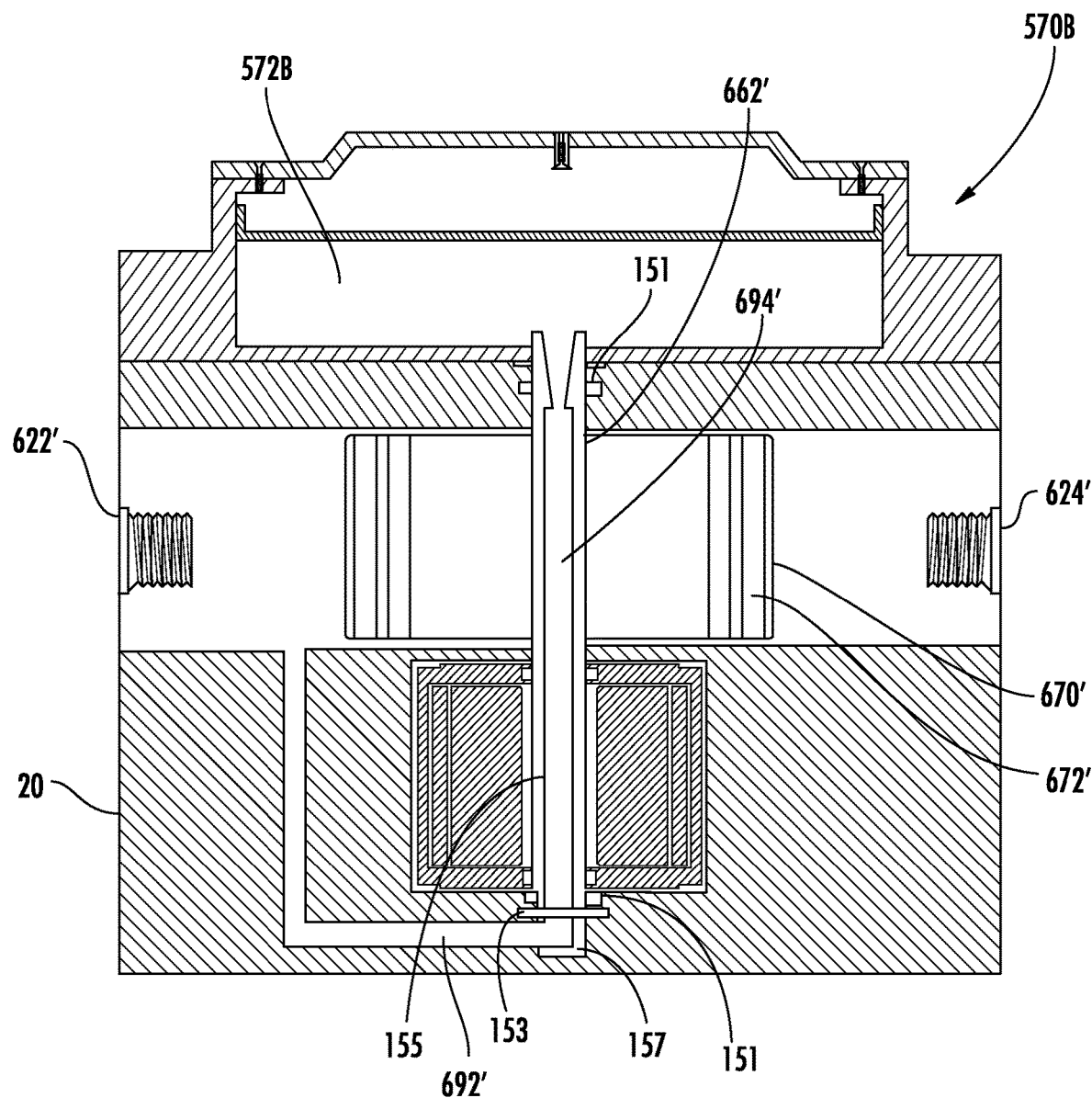
FIG. 6B shows a cross-sectional view of an exemplary embodiment of a pump assembly.

In the embodiment of FIG. 6A, the shaft 662, to which the gear 670 and the pump 610 are connected, does not include a through-passage. However, instead of or in addition to through-passage 684 of shaft 642, the shaft 662 of pump 610 can have a through-passage therein. As seen in FIG. 6B, the pump 610' includes a shaft 662' with a through-passage 694' that is in fluid communication with chamber 672 of storage device 570B and a port of the pump 610' via channel 692'. Thus, the fluid chamber 572B is in fluid communication with port 622' of pump 610' via through-passage 694' and channel 692'.

The configuration of flow-through shaft 662' is different from that of the exemplary shafts described above because, unlike the other shafts, the shaft 662' rotates. The flow-through shaft 662' can be supported by bearings 151 on both ends. In the exemplary embodiment, the flow-through shaft 662' has a rotary portion 155 that rotates with the motor rotor and a stationary portion 157 that is fixed to the motor casing. A coupling 153 can be provided between the rotary and stationary portions 155, 157 to allow fluid to travel between the rotary and stationary portions 155, 157 through the coupling 153 while the pump 610' operates. In some embodiments, the coupling 153 can include one or more seals to prevent leakage. Of course, the stationary portion 157 can be part of the pump casing rather than a part of the flow-through shaft.

While the above exemplary embodiments illustrate only one storage device, exemplary embodiments of the present disclosure are not limited to one storage device and can have more than one storage device. For example, in an exemplary embodiment shown in FIG. 7, the hydrostatic transmission assembly 1' can have hydraulic motor 3' and a pump assembly 2', The function and configuration of hydraulic motor 3' is similar to that of hydraulic motor 3 discussed above and thus, brevity, will not be further discussed. The pump assembly 2' includes pump 770 and storage devices 770 and 870. As shown in FIG. 7A, the storage device 770 can be mounted to the pump 710, e.g., on the end plate 782. For clarity the valve assemblies are not shown. The storage device 770 can store fluid to be pumped by the pump 710 and supply fluid needed to perform a commanded operation. In addition, the storage device 870 can also be mounted on the pump 710, e.g., on the end plate 780. Those skilled in the art would understand that the storage devices 770 and 870 are similar in configuration and function to storage device 170. Thus, for brevity, a detailed description of storage devices 770 and 870 is omitted, except as necessary to explain the present exemplary embodiment.

Figure 7:
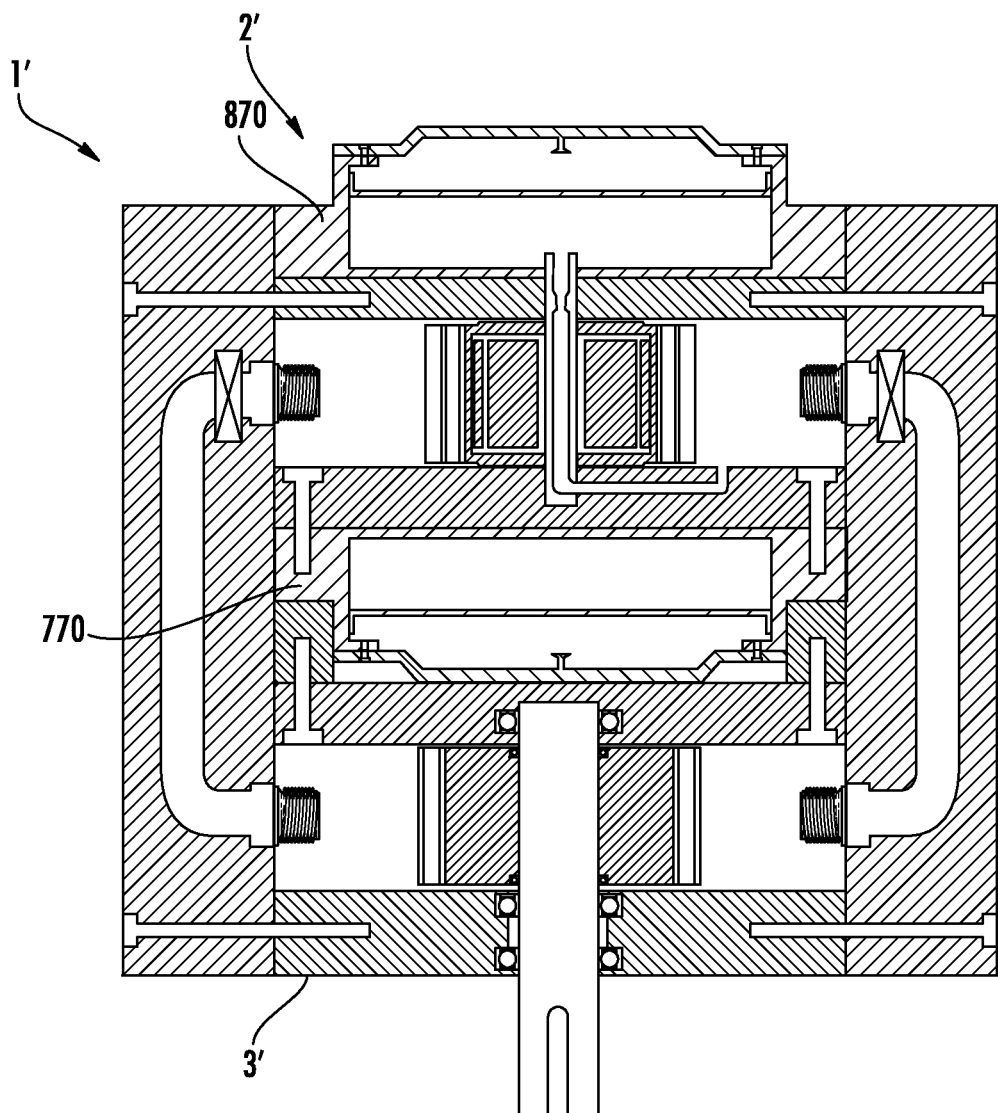
FIG. 7 shows a side cross-sectional view of a preferred embodiment of a hydrostatic transmission.
Figure 7A:
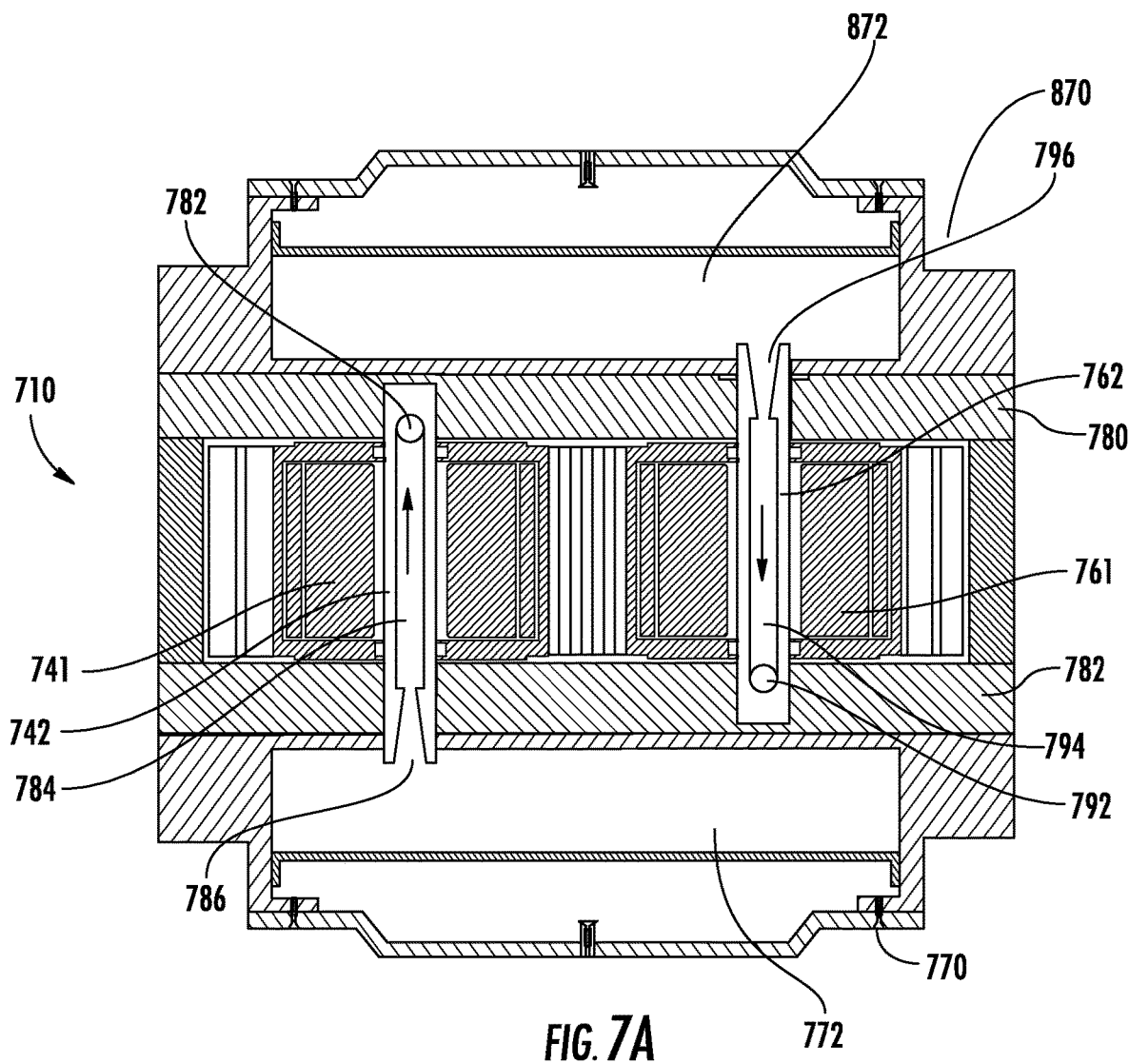
FIG. 7A shows a cross-sectional view of an exemplary embodiment of a pump assembly of the hydrostatic transmission of FIG. 7.

As seen in FIG. 7, motor 741 includes shaft 742. The shaft 742 includes a through-passage 784. The through-passage 784 has a port 786 which is disposed in the fluid chamber 772 such that the through-passage 784 is in fluid communication with the fluid chamber 772. The other end of through-passage 784 is in fluid communication with a port of the pump 710 via a channel 782. Those skilled in the art will understand that through-passage 784 and channel 782 are similar in configuration and function to through-passage 184 and channel 192 discussed above. Accordingly, for brevity, detailed description of through-passage 784 and its characteristics and function within pump 710 are omitted.

The pump 710 also includes a motor 761 that includes shaft 762. The shaft 762 includes a through-passage 794. The through-passage 794 has a port 796 which is disposed in the fluid chamber 872 such that the through-passage 794 is in fluid communication with the fluid chamber 872. The other end of through-passage 794 is in fluid communication with a port of the pump 710 via a channel 792. Those skilled in the art will understand that through-passage 794 and channel 792 are similar to through-passage 184 and channel 192 discussed above. Accordingly, for brevity, detailed description of through-passage 794 and its characteristics and function within pump 710 are omitted.

The channels 782 and 792 can each be connected to the same port of the pump or to different ports. Connection to the same port can be beneficial in certain circumstances. For example, if one large storage device is impractical for any reason, it might be possible to split the storage capacity between two smaller storage devices that are mounted on opposite sides of the pump as illustrated in FIG. 7. Alternatively, connecting each storage device 770 and 870 to different ports of the pump 710 can also be beneficial in certain circumstances. For example, a dedicated storage device for each port can be beneficial in circumstances where the pump is bi-directional and in situations where the inlet of the pump and the outlet of the pump experience pressure spikes that need to be smoothened or some other flow or pressure disturbance that can be mitigated or eliminated with a storage device. Of course, each of the channels 782 and 792 can be connected to both ports of the pump 710 such that each of the storage devices 770 and 870 can be configured to communicate with a desired port using appropriate valves (not shown). In this case, the valves would need to be appropriately operated to prevent adverse pump operation.

In the exemplary embodiment shown in FIG. 7, the storage devices 770, 870 are fixedly mounted to the casing of the pump 710. However, in other embodiments, one or both of the storage devices 770, 870 may be disposed space apart from the pump 710. In this case, the storage device or storage devices can be in fluid communication with the pump 710 via a connecting medium, for example hoses, tubes, pipes, or other similar devices.

In addition, the exemplary embodiments of the pump assembly of the present disclosure are not limited to the above exemplary embodiments of dual fluid driver (drive-drive) configurations. The flow-through shaft having the through-passage configuration can be used in other dual fluid driver pump configurations. For example, other configurations of a drive-drive system are discussed below in the context of exemplary embodiments of a pump assembly that do not have a flow-through shaft. However, based on the above disclosure, those skilled in the art would understand that the drive-drive configurations illustrated in FIGS. 11-11E can also include a flow through shaft if desired. In addition, the inventive flow-through shaft configuration is not limited to drive-drive configurations and can be used in pumps having a driver-driven configuration.

Figure 8:
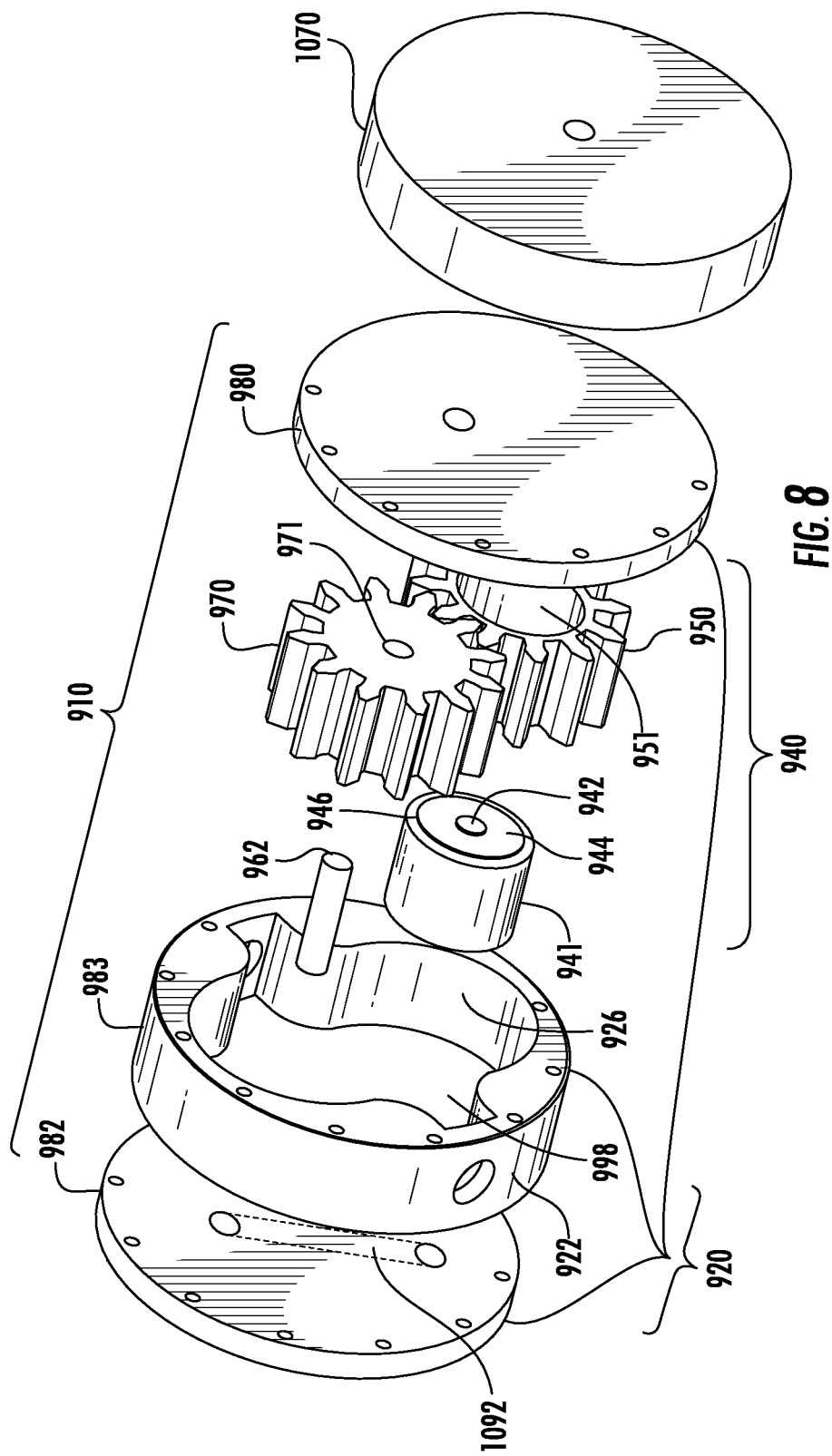
FIG. 8 shows an exploded view of an exemplary embodiment of a pump assembly having an external gear pump and storage device.

For example, FIG. 8 shows an exploded view of an exemplary embodiment of a pump assembly with a pump 910 and a storage device 1070. Unlike the exemplary embodiments discussed above, pump 910 includes one fluid driver, i.e., fluid driver 940. The fluid driver 940 includes motor 941 (prime mover) and a gear displacement assembly that incudes gears 950, 970 (fluid displacement members). In this embodiment, pump motor 941 is disposed inside the pump gear 950. As seen in FIG. 8, the pump 910 represents a positive-displacement (or fixed displacement) gear pump. The pump 910 has a casing 920 that includes end plates 980, 982 and a pump body 983. These two plates 980, 982 and the pump body 983 can be connected by a plurality of through bolts and nuts (not shown) and the inner surface 926 defines an inner volume 998. To prevent leakage, O-rings or other similar devices can be disposed between the end plates 980, 982 and the pump body 983. The casing 920 has a port 922 and a port 924 (see also FIG. 9), which are in fluid communication with the inner volume 998. During operation and based on the direction of flow, one of the ports 922, 924 is the pump inlet port and the other is the pump outlet port. In an exemplary embodiment, the ports 922, 924 of the casing are round through-holes on opposing side walls of the casing. However, the shape is not limiting and the through-holes can have other shapes. In addition, one or both of the ports 922, 924 can be located on either the top or bottom of the casing. Of course, the ports 922, 924 must be located such that one port is on the inlet side of the pump and one port is on the outlet side of the pump.

As seen in FIG. 8, a pair of gears 950, 970 are disposed in the internal volume 998. Each of the gears 950, 970 has a plurality of gear teeth 952, 972 extending radially outward from the respective gear bodies. The gear teeth 952, 972, when rotated by, e.g., motor 941, transfer fluid from the inlet to the outlet, i.e., motor 941 rotates gear 950 which then rotates gear 970 (driver-driven configuration). In some embodiments, the pump 910 is bi-directional. Thus, either port 922, 924 can be the inlet port, depending on the direction of rotation of gears 950, 970, and the other port will be the outlet port. The gear 950 has a cylindrical opening 951 along an axial centerline of the gear body. The cylindrical opening 951 can extend either partially through or the entire length of the gear body. The cylindrical opening 951 is sized to accept the motor 941, which includes a shaft 942, a stator 944, and a rotor 946.

Figure 9:
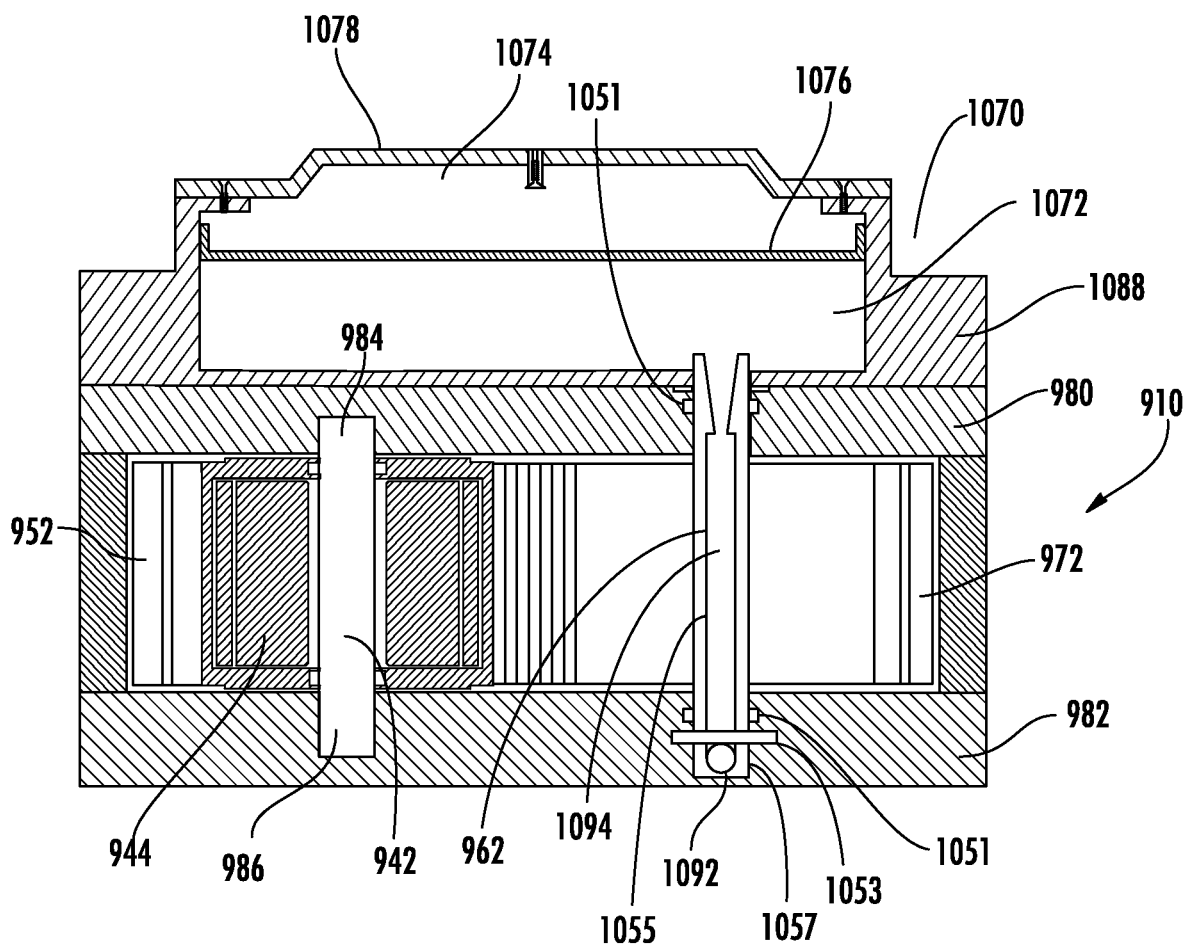
FIG. 9 shows a side cross-sectional view of the exemplary embodiment of FIG. 8.

FIG. 9 shows a side cross-sectional view of the external gear pump 910 and storage device 1070 of FIG. 8. As seen in FIGS. 8 and 9, fluid driver 940 is disposed in the casing 920. The shafts 942, 962 of the fluid driver 940 are disposed between the port 922 and the port 924 of the casing 920 and are supported by the end plate 980 at one end 984 and the end plate 982 at the other end 986. The shaft 942 supports the motor 941 and gear 950 when assembled. The shaft 962 supports gear 790 when assembled. The means to support the shafts 942, 962 and thus the fluid drivers 940, 960 are not limited to the illustrated configuration and other configurations to support the shaft can be used. For example, the either or both of shafts 942, 962 can be supported by blocks that are attached to the casing 920 rather than directly by casing 920. The shaft 942 is disposed in parallel with the shaft 962 and the two shafts are separated by an appropriate distance so that the gear teeth 952, 972 of the respective gears 950, 970 mesh with each other when rotated.

Figure 10:
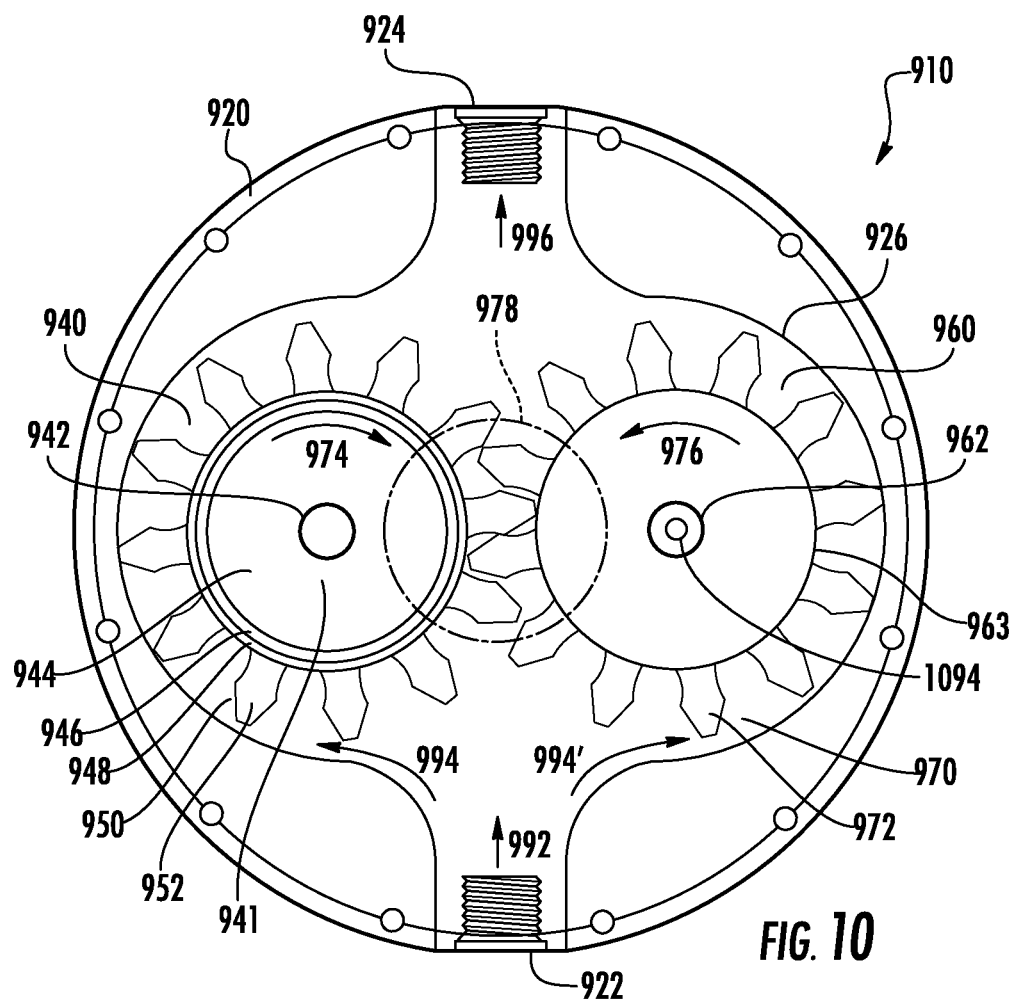
FIG. 10 illustrates an exemplary flow path of the external gear pump of FIG. 8.

As illustrated in FIGS. 8-10, the stator 944 of motor 941 is disposed radially between the shaft 942 and the rotor 946. The stator 944 is fixedly connected to the shaft 942, which is fixedly connected to the casing 920. The rotor 946 is disposed radially outward of the stator 944 and surrounds the stator 944. Thus, the motor 941 in this embodiment is of an outer-rotor motor arrangement (or an external-rotor motor arrangement). In an exemplary embodiment, the electric motor 941 is a multi-directional motor. Further, in an exemplary embodiment, the motor 941 is a variable-speed and/or a variable-torque motor in which the speed/torque of the rotor and thus that of the attached gear can be varied to create various volume flows and pump pressures, as desired.

As discussed above, the gear body 950 can include cylindrical opening 951, which receives motor 941. In an exemplary embodiment, the fluid driver 940 can include outer support member 948 which aids in coupling the motor 941 to the gear 950 and in supporting the gear 950 on motor 941. The support member 948 can be, for example, a sleeve that is initially attached to either an outer casing of the motor 941 or an inner surface of the cylindrical opening 951. The sleeves can be attached by using an interference fit, a press fit, an adhesive, screws, bolts, a welding or soldering method, or other means that can attach the support members to the cylindrical openings. Similarly, the final coupling between the motor 941 and the gear 950 using the support member 948 can be by using an interference fit, a press fit, screws, bolts, adhesive, a welding or soldering method, or other means to attach the motors to the support members. The sleeve can be made to different thicknesses as desired to, e.g., facilitate the attachment of motors with different physical sizes to the gear 950 or vice versa. In addition, if the motor casing and the gear are made of materials that are not compatible, e.g., chemically or otherwise, the sleeve can be made of materials that are compatible with both the gear composition and the motor casing composition. In some embodiments, the support member 948 can be configured as a sacrificial piece. That is, support member 948 is configured to be the first to fail, e.g., due to excessive stresses, temperatures, or other causes of failure, in comparison to the gear 950 and motor 941. This allows for a more economic repair of the pump 910 in the event of failure. In some embodiments, the outer support member 948 is not a separate piece but an integral part of the casing for the motor 941 or part of the inner surface of the cylindrical opening 951 of the gear 950. In other embodiments, the motor 941 can support the gear 950 (and the plurality of gear teeth 952) on its outer surface without the need for the outer support member 948. For example, the motor casing can be directly coupled to the inner surface of the cylindrical opening 951 of the gear 950 by using an interference fit, a press fit, screws, bolts, an adhesive, a welding or soldering method, or other means to attach the motor casing to the cylindrical opening. In some embodiments, the outer casing of the motor 941 can be, e.g., machined, cast, or other means to shape the outer casing to form a shape of the gear teeth 952. In still other embodiments, the plurality of gear teeth 952 can be integrated with the rotor 946 such that the gear/rotor combination forms one rotary body.

As shown in FIGS. 8 and 9, a storage device 1070 can be mounted to the pump 910, e.g., on the end plate 980. The storage device 1070 can store fluid to be pumped by the pump 910 and supply fluid needed to perform a commanded operation. In some embodiments, the storage device 1070 in the pump 910 is a pressurized vessel that stores the fluid for the system. In such embodiments, the storage device 1070 is pressurized to a specified pressure that is appropriate for the system. As shown in FIG. 9, the storage device 1070 includes a vessel housing 1088, a fluid chamber 1072, a gas chamber 1074, a separating element (or piston) 1076, and a cover 1078. The configuration and function of storage device 1070 is similar to that of storage device 170 discussed above. Accordingly, for brevity, a detailed description of the operation of the storage device 1070 is omitted except as necessary to describe the present exemplary embodiment.

In the embodiment of FIGS. 8 and 9, the shaft 962 is a flow-through type shaft having a through-passage that runs axially through the body of the shaft. One end of shaft 962 connects with an opening in the end plate 982 of a channel that connects to one of the port 922, 924. For example, FIG. 8 illustrates a channel 1092 (dotted line) that extends through the end plate 982. One opening of channel 1092 accepts one end of the flow-through shaft 962 while the other end of channel 1092 opens to port 922 of the pump 910. The other end of the flow-through shaft 962 extends into the fluid chamber 1072 of storage device 1070 (see FIG.

8) via an opening in end plate 980. As shown in FIG. 9, the gear 970 is fixedly mounted to shaft 962 such that the gear 970 and shaft 962 rotate when driven by gear 950. The flow-through shaft 962 is similar in configuration to shaft 662' discussed above with respect to a rotating shaft configuration. The shaft 962 can be supported by bearings 1051 on both ends. The shaft 962 can have a rotary portion 1055 that rotates with gear 970 and a stationary portion 1057 that is fixed to the pump casing. A coupling 1053 can be provided between the rotary and stationary portions 1055, 1057 to allow fluid to travel between the rotary and stationary portions 1055, 1057 through the coupling 1053 while the pump 910 operates. In some embodiments, the coupling 1053 can include one or more seals to prevent leakage. Of course, the stationary portion 1057 can be part of the pump casing rather than a part of the flow-through shaft.

The shaft 962 includes a through-passage 1094. The through-passage 1094 permits fluid communication between fluid chamber 1072 and a port of the pump 910 via a channel 1092. Those skilled in the art will recognize that through-passage 1094 and channel 1092 perform similar functions as through-passage 194 and channel 192 discussed above with respect to pump 10. Accordingly, for brevity, a detailed description of through-passage 1094 and channel 1092 and their function within pump 910 are omitted.

In the above discussed exemplary embodiments, fluid driver 940, including electric motor 941 and gears 950, 970, are integrated into a single pump casing 920. Thus, similar to the dual fluid-driver exemplary embodiments, the configuration of the external gear pump 910 and storage device 970 of the present disclosure enables a compact arrangement that provides various advantages. First, the enclosed configuration means that there is less likelihood of contamination from outside the pump, e.g., through clearances in the shaft seals as in conventional pumps or from remotely disposed storage devices. Also, the space or footprint occupied by the gear pump and storage device is significantly reduced by integrating necessary components into an integrated pump assembly, when compared to conventional gear pump and storage device configurations. In addition, the total weight of the exemplary embodiments of the pump assembly is reduced by removing unnecessary parts such as a shaft that connects a motor to a pump, separate mountings for a motor/gear driver, and external hoses and pipes to connect the storage device. Further, since the pump assembly of the present disclosure has a compact and modular arrangement, it can be easily installed, even at locations where conventional gear pumps could not be installed, and can be easily replaced. Detailed description of the driver-driven pump operation is provided next.

FIG. 10 shows a top cross-sectional view of the external gear pump 910 of FIG. 8. FIG. 10 illustrates an exemplary fluid flow path of an exemplary embodiment of the external gear pump 910. The ports 922, 924, and a meshing area 978 between the plurality of first gear teeth 952 and the plurality of second gear teeth 972 are substantially aligned along a single straight path. However, the alignment of the ports are not limited to this exemplary embodiment and other alignments are permissible. For explanatory purpose, the gear 950 is rotatably driven clockwise 974 by motor 941 and the gear 970 is rotatably driven counter-clockwise 976 by the motor 961. With this rotational configuration, port 922 is the inlet side of the gear pump 910 and port 924 is the outlet side of the gear pump 910. The gear 950 and the gear 970 are disposed in the casing 920 such that the gear 950 engages (or meshes) with the gear 970 when the rotor 946 is rotatably driven. More specifically, the plurality of gear teeth 952 mesh with the plurality of gear teeth 972 in a meshing area 978 such that the torque (or power) generated by the motor 941 is transmitted to the gear 950, which then drives gear 970 via gear meshing to carry the fluid from the port 922 to the port 924 of the pump 910.

As seen in FIG. 10, the fluid to be pumped is drawn into the casing 920 at port 922 as shown by an arrow 992 and exits the pump 910 via port 924 as shown by arrow 996. The pumping of the fluid is accomplished by the gear teeth 952, 972. As the gear teeth 952, 972 rotate, the gear teeth rotating out of the meshing area 978 form expanding inter-tooth volumes between adjacent teeth on each gear. As these inter-tooth volumes expand, the spaces between adjacent teeth on each gear are filled with fluid from the inlet port, which is port 922 in this exemplary embodiment. The fluid is then forced to move with each gear along the interior wall 990 of the casing 920 as shown by arrows 994 and 994'. That is, the teeth 952 of gear 950 force the fluid to flow along the path 994 and the teeth 972 of gear 970 force the fluid to flow along the path 994'. Very small clearances between the tips of the gear teeth 952, 972 on each gear and the corresponding interior wall 990 of the casing 920 keep the fluid in the inter-tooth volumes trapped, which prevents the fluid from leaking back towards the inlet port. As the gear teeth 952, 972 rotate around and back into the meshing area 978, shrinking inter-tooth volumes form between adjacent teeth on each gear because a corresponding tooth of the other gear enters the space between adjacent teeth. The shrinking inter-tooth volumes force the fluid to exit the space between the adjacent teeth and flow out of the pump 910 through port 924 as shown by arrow 996. In some embodiments, the motor 941 is bi-directional and the rotation of motor 941 can be reversed to reverse the direction fluid flow through the pump 910, i.e., the fluid flows from the port 924 to the port 922.

To prevent backflow, i.e., fluid leakage from the outlet side to the inlet side through the meshing area 978, the meshing between a tooth of the gear 950 and a tooth of the gear 970 in the meshing area 978 provides sealing against the backflow. Thus, along with driving gear 970, the meshing force from gear 950 will seal (or substantially seal) the backflow path, i.e., as understood by those skilled in the art, the fluid leakage from the outlet port side to the inlet port side through the meshing area 978 is substantially eliminated.

Figure 10A:
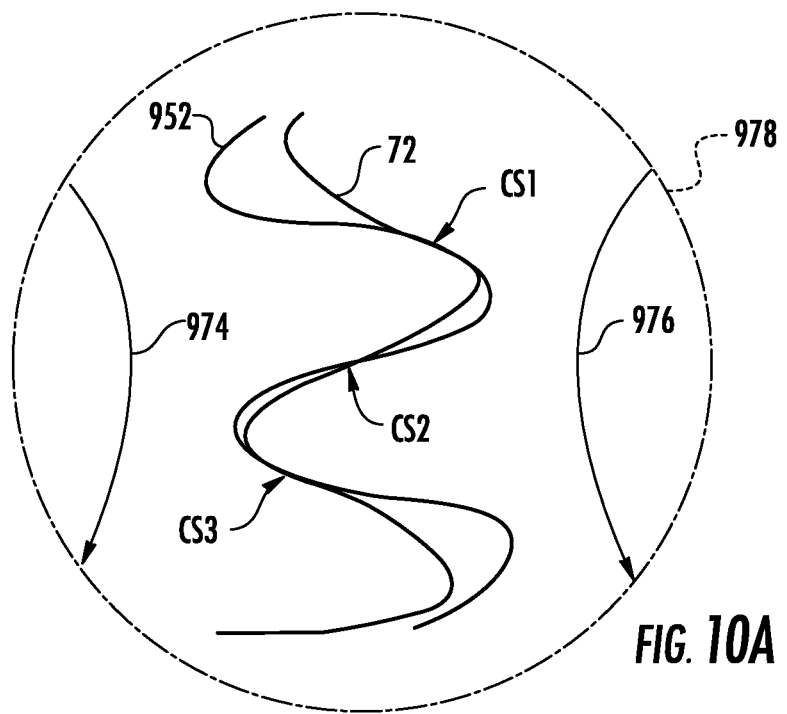
FIG. 10A shows a cross-sectional view illustrating gear meshing between two gears in an overlapping area of FIG. 10.

FIG. 10A schematically shows gear meshing between two gears 950, 970 in the gear meshing area 978 in an exemplary embodiment. As discussed above in reference to FIG. 9, it is assumed that the rotor 946 is rotatably driven clockwise 974 by the rotor 946. The plurality of first gear teeth 952 are rotatably driven clockwise 974 along with the rotor 946 and the plurality of second gear teeth 972 are rotatably driven counter-clockwise 976 via gear meshing. In particular, FIG. 10A exemplifies that the gear tooth profile of the first and second gears 950, 970 is configured such that the plurality of first gear teeth 952 are in surface contact with the plurality of second gear teeth 972 at three different contact surfaces CS1, CS2, CS3 at a point in time. However, the gear tooth profile in the present disclosure is not limited to the profile shown in FIG. 10A. For example, the gear tooth profile can be configured such that the surface contact occurs at two different contact surfaces instead of three contact surfaces, or the gear tooth profile can be configured such that a point, line or an area of contact is provided. In some exemplary embodiments, the gear teeth profile is such that a small clearance (or gap) is provided between the gear teeth 952, 972 to release pressurized fluid, i.e., only one face of a given gear tooth makes contact with the other tooth at any given time. Such a configuration retains the sealing effect while ensuring that excessive pressure is not built up. Thus, the gear tooth profile of the first and second gears 950, 970 can vary without departing from the scope of the present disclosure.

In addition, depending on the type of fluid displacement member, the meshing can be between any surface of at least one projection (e.g., bump, extension, bulge, protrusion, other similar structure or combinations thereof) on the first fluid displacement member and any surface of at least one projection (e.g., bump, extension, bulge, protrusion, other similar structure or combinations thereof) or an indent (e.g., cavity, depression, void or similar structure) on the second fluid displacement member. In some embodiments, at least one of the fluid displacement members can be made of or include a resilient material, e.g., rubber, an elastomeric material, or another resilient material, so that the meshing force provides a more positive sealing area.

In the embodiment of FIG. 8, the shaft 942 of the pump 910 does not include a through-passage. However, instead of or in addition to through-passage 1094 of shaft 962, the shaft 942 of pump 910 can have a through-passage therein. In this case, the through-passage configuration of the shaft 942 can be similar to that of through-passage 184 of shaft 42 of pump 10 discussed above. In addition, in the above exemplary driver-driven configurations, a single storage device is illustrated in FIGS. 8 and 9. However, those skilled in the art will understand that, similar to the drive-drive configurations discussed above, the driver-driven configurations can also include dual storage devices. Because the configuration and function of the shafts on the dual storage driver-driven embodiments will be similar to the configuration and function of the shafts of the drive-drive embodiments discussed above, for brevity, a detailed discussion of the dual storage driver-driven embodiment is omitted.

Further, in the embodiments discussed above, the prime mover is disposed inside the fluid displacement member, i.e., motor 941 is disposed inside the cylinder opening 951 of gear 950. However, like the dual fluid driver (drive-drive) configurations discussed above, advantageous features of the inventive pump configuration are not limited to a configuration in which the prime mover is disposed within the body of the fluid displacement member. Other configurations also fall within the scope of the present disclosure. For example, in the context of an exemplary embodiment that does not have a flow-through shaft, FIG. 12A discloses a driver-driven pump configuration in which the motor is disposed adjacent to the gear but still inside the pump casing. However, those skilled in the art would understand that, like pump 610' discussed above, the shaft of the motor 941 and gear 950 can be configured as a flow-through shaft. Of course, the prime mover can also be located outside the pump casing and one or both gears can include a flow-through shaft such as the through-passage embodiments discussed above.

In the embodiments discussed above, the storage devices were described as pressurized vessels with a separating element (or piston) inside. However, in other embodiments, a different type of pressurized vessel may be used. For example, an accumulator, e.g. a hydraulic accumulator, may be used as a pressurized vessel. Accumulators are common components in fluid systems such as hydraulic operating and control systems. The accumulators store potential energy in the form of a compressed gas or spring, or by a raised weight to be used to exert a force against a relatively incompressible fluid. It is often used to store fluid under high pressure or to absorb excessive pressure increase. Thus, when a fluid system, e.g., a hydraulic system, demands a supply of fluid exceeding the supply capacity of a pump system, typically within a relatively short responsive time, pressurized fluid can be promptly provided according to a command of the system. In this way, operating pressure and/or flow of the fluid in the system do not drop below a required minimum value. However, storage devices other than an accumulator may be used as long as needed fluid can be provided from the storage device or storage devices to the pump and/or returned from the pump to the storage device or storage devices.

The accumulator may be a pressure accumulator. This type of accumulator may include a piston, diaphragm, bladder, or member. Typically, a contained volume of a suitable gas, a spring, or a weight is provided such that the pressure of hydraulic fluid in the accumulator increases as the quantity of hydraulic fluid stored in the accumulator increases. However, the type of accumulator in the present disclosure is not limited to the pressure accumulator. The type of accumulator can vary without departing from the scope of the present disclosure.

Figure 11:
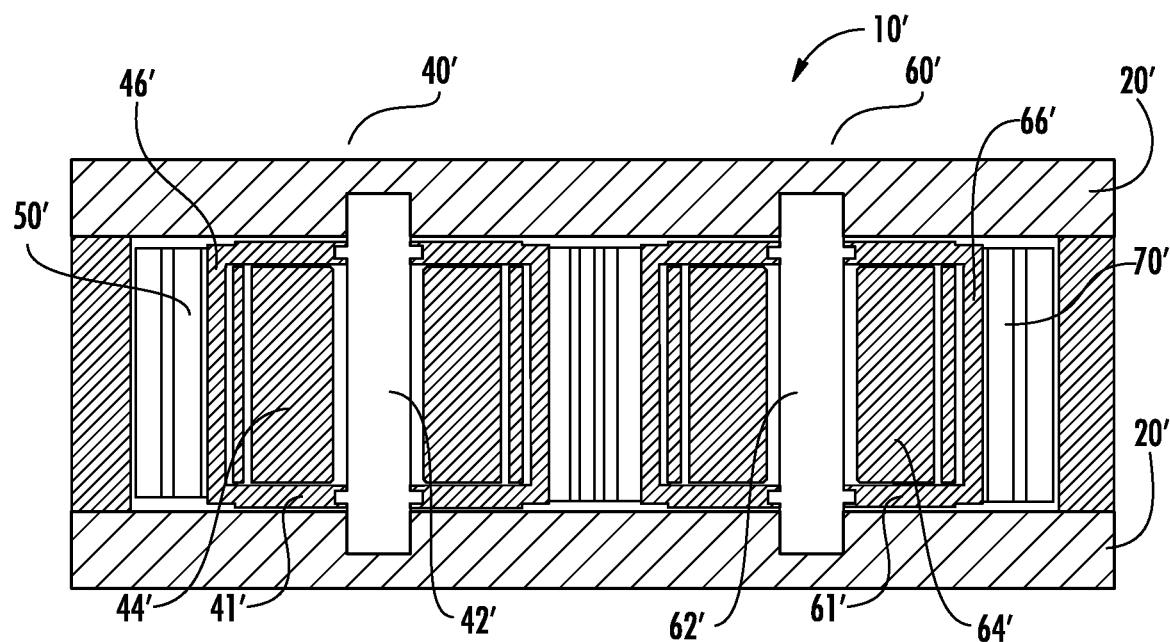
FIGS. 11 to 11E show cross-sectional views of exemplary embodiments of a pump with a drive-drive configuration.

In addition, exemplary embodiments of the present disclosure are not limited to pump assemblies having pumps with integrated storage devices and flow-through shafts. For example, the storage device can be separate from the pump assembly if desired (e.g., if a large amount of storage is required) or may even be eliminated depending on the configuration of the system. In such cases the pump will not have an attached storage device and/or a flow-through shaft. For example, FIG. 11 shows a side cross-sectional view of an exemplary embodiment of an external gear pump 10'. The pump 10' includes a casing 20', a fluid driver 40' with gear 50' and motor 41', and a fluid driver 60' with gear 70' and motor 61'. The motor 41' includes rotor 46', stator 44' and shaft 42' and the motor 61' includes rotor 66', stator 64' and shaft 62'. The embodiment of the pump 10' differs from pump 10 (FIGS. 2-3) in that because the storage device 170 is not integral to the pump assembly, neither shaft 42' of fluid drivers 40' nor shaft 62' of fluid driver 60' has a flow-through shaft configuration. In all other respects, the pump 10' is the same as pump 10. Thus, for brevity, the configuration and functions of pump 10' will not be further discussed.

As seen in FIGS. 2 and 11, the prime movers are disposed inside the respective fluid displacement members, i.e., motors 41, 41', 61, 61' are disposed inside the cylinder openings of the respective gears 50, 50', 70, 70'. However, advantageous features of the present disclosure are not limited to a configuration in which both prime movers are disposed within the bodies of the fluid displacement members. Both types of pumps (i.e., with and without flow-through shafts and integrated storage devices) can include other drive-drive configurations. For example 11A-11E show different drive-drive configurations. The pumps in these embodiments do not have flow-through shafts or integrated storage devices. However, the arrangement of the motors and gears will be similar for drive-drive configurations with flow-through shafts and thus, for brevity, will not be duplicated.

Figure 11A:
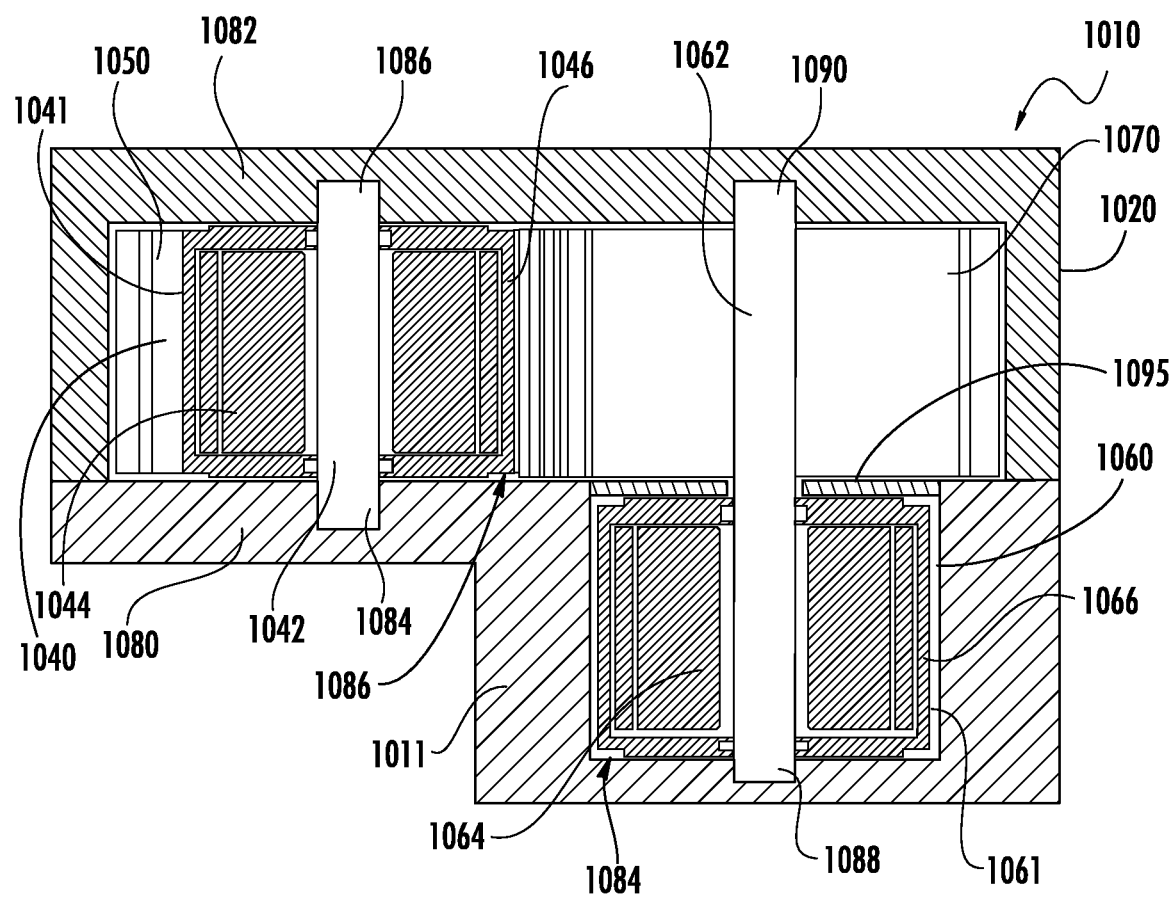

FIG. 11A shows a side cross-sectional view of another exemplary embodiment of an external gear pump 1010. The embodiment of the pump 1010 shown in FIG. 11A differs from pump 10 (FIG. 2) in that one of the two motors in this embodiment is external to the corresponding gear body but is still in the pump casing. In addition, like pump 10', the storage device 170 is not integral to the pump assembly and neither shaft 1042 of fluid drivers 1040 nor shaft 1062 of fluid driver 1060 has a flow-through shaft configuration. The pump 1010 includes a casing 1020, a fluid driver 1040, and a fluid driver 1060. The inner surface of the casing 1020 defines an internal volume that includes a motor cavity 1084 and a gear cavity 1086. The casing 1020 can include end plates 1080, 1082. These two plates 1080, 1082 can be connected by a plurality of bolts (not shown).

The fluid driver 1040 includes motor 1041 and a gear 1050. The motor 1041 is an outer-rotor motor design and is disposed in the body of gear 1050, which is disposed in the gear cavity 1086. The motor 1041 includes a rotor 1044 and a stator 1046. The gear 1050 includes a plurality of gear teeth 1052 extending radially outward from its gear body. It should be understood that those skilled in the art will recognize that fluid driver 1040 is similar to fluid driver 40 and that the configurations and functions of fluid driver 40, as discussed above, can be incorporated into fluid driver 1040. Accordingly, for brevity, fluid driver 1040 will not be discussed in detail except as necessary to describe this embodiment.

The fluid driver 1060 includes a motor 1061 and a gear 1070. The fluid driver 1060 is disposed next to fluid driver 1040 such that the respective gear teeth 1072, 1052 contact each other in a manner similar to the contact of gear teeth 52, 72 in contact area 78 discussed above with respect to pump 10. In this embodiment, motor 1061 is an inner-rotor motor design and is disposed in the motor cavity 1084. In this embodiment, the motor 1061 and the gear 1070 have a common shaft 1062. The rotor 1064 of motor 1061 is disposed radially between the shaft 1062 and the stator 1066. The stator 1066 is disposed radially outward of the rotor 1064 and surrounds the rotor 1064. The inner-rotor design means that the shaft 1062, which is connected to rotor 1064, rotates while the stator 1066 is fixedly connected to the casing 1020. In addition, gear 1070 is also connected to the shaft 1062. The shaft 1062 is supported by, for example, a bearing in the plate 1080 at one end 1088 and by a bearing in the plate 1082 at the other end 1090. In other embodiments, the shaft 1062 can be supported by bearing blocks that are fixedly connected to the casing 1020 rather than directly by bearings in the casing 1020. In addition, rather than a common shaft 1062, the motor 1061 and the gear 1070 can include their own shafts that are coupled together by known means.

As shown in FIG. 11A, the gear 1070 is disposed adjacent to the motor 1061 in the casing 1020. That is, unlike motor 1041, the motor 1061 is not disposed in the gear body of gear 1070. The gear 1070 is spaced apart from the motor 1061 in an axial direction on the shaft 1062. The rotor 1064 is fixedly connected to the shaft 1062 on one side 1088 of the shaft 1062, and the gear 1070 is fixedly connected to the shaft 1062 on the other side 1090 of the shaft 1062 such that torque generated by the motor 1061 is transmitted to the gear 1070 via the shaft 1062.

The motor 1061 is designed to fit into its cavity with sufficient tolerance between the motor casing and the pump casing 1020 so that fluid is prevented (or substantially prevented) from entering the cavity during operation. In addition, there is sufficient clearance between the motor casing and the gear 1070 for the gear 1070 to rotate freely but the clearance is such that the fluid can still be pumped efficiently. Thus, with respect to the fluid, in this embodiment, the motor casing is designed to perform the function of the appropriate portion of the pump casing walls of the embodiment of FIG. 2. In some embodiments, the outer diameter of the motor 1061 is less that the root diameter for the gear teeth 1072. Thus, in these embodiments, even the motor side of the gear teeth 1072 will be adjacent to a wall of the pump casing 1020 as they rotate. In some embodiments, a bearing 1095 can be inserted between the gear 1070 and the motor 1061. The bearing 1095, which can be, e.g., a washer-type bearing, decreases friction between the gear 1070 and the motor 1061 as the gear 1070 rotates. Depending on the fluid being pumped and the type of application, the bearing can be metallic, a non-metallic or a composite. Metallic material can include, but is not limited to, steel, stainless steel, anodized aluminum, aluminum, titanium, magnesium, brass, and their respective alloys. Non-metallic material can include, but is not limited to, ceramic, plastic, composite, carbon fiber, and nano-composite material. In addition, the bearing 1095 can be sized to fit the motor cavity 1084 opening to help seal the motor cavity 1084 from the gear cavity 1086, and the gears 1052, 1072 will be able to pump the fluid more efficiently. It should be understood that those skilled in the art will recognize that, in operation, the fluid driver 1040 and the fluid driver 1060 will operate in a manner similar to that disclosed above with respect to pump 10. Accordingly, for brevity, pump 1010 operating details will not be further discussed.

In the above exemplary embodiment, the gear 1070 is shown as being spaced apart from the motor 1061 along the axial direction of the shaft 1062. However, other configurations fall within the scope of the present disclosure. For example, the gear 1070 and motor 1061 can be completely separated from each other (e.g., without a common shaft), partially overlapping with each other, positioned side-by-side, on top of each other, or offset from each other. Thus, the present disclosure covers all of the above-discussed positional relationships and any other variations of a relatively proximate positional relationship between a gear and a motor inside the casing 1020. In addition, in some exemplary embodiments, motor 1061 can be an outer-rotor motor design that is appropriately configured to rotate the gear 1070.

Further, in the exemplary embodiment described above, the torque of the motor 1061 is transmitted to the gear 1070 via the shaft 1062. However, the means for transmitting torque (or power) from a motor to a gear is not limited to a shaft, e.g., the shaft 1062 in the above-described exemplary embodiment. Instead, any combination of power transmission devices, e.g., shafts, sub-shafts, belts, chains, couplings, gears, connection rods, cams, or other power transmission devices, can be used without departing from the spirit of the present disclosure.

Figure 11B:
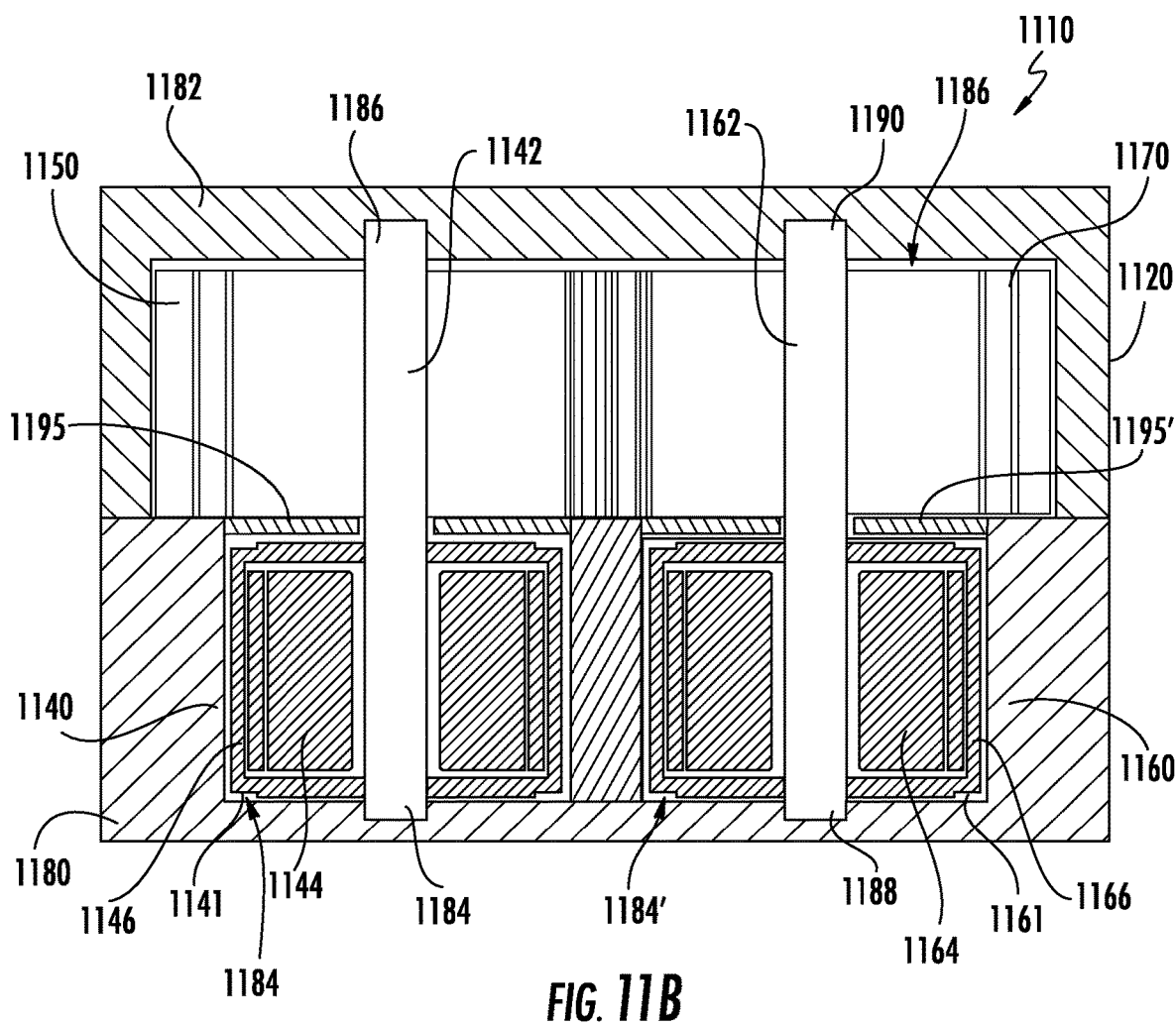

FIG. 11B shows a side cross-sectional view of another exemplary embodiment of an external gear pump 1110. The embodiment of the pump 1110 shown in FIG. 11B differs from pump 10 in that each of the two motors in this embodiment is external to the gear body but still disposed in the pump casing. In addition, like pump 10', the storage device 170 is not integral to the pump assembly and neither shaft 1142 of fluid drivers 1140 nor shaft 1162 of fluid driver 1160 has a flow-through shaft configuration. The pump 1110 includes a casing 1120, a fluid driver 1140, and a fluid driver 1160. The inner surface of the casing 1120 defines an internal volume that includes motor cavities 1184 and 1184' and gear cavity 1186. The casing 1120 can include end plates 1180, 1182. These two plates 1180, 1182 can be connected by a plurality of bolts (not shown).

The fluid drivers 1140, 1160 respectively include motors 1141, 1161 and gears 1150, 1170. The motors 1141, 1161 are of an inner-rotor design and are respectively disposed in motor cavities 1184, 1184'. The motor 1141 and gear 1150 of the fluid driver 1140 have a common shaft 1142 and the motor 1161 and gear 1170 of the fluid driver 1160 have a common shaft 1162. The motors 1141, 1161 respectively include rotors 1144, 1164 and stators 1146, 1166, and the gears 1150, 1170 respectively include a plurality of gear teeth 1152, 1172 extending radially outward from the respective gear bodies. The fluid driver 1140 is disposed next to fluid driver 1160 such that the respective gear teeth 1152, 1172 contact each other in a manner similar to the contact of gear teeth 52, 72 in contact area 78 discussed above with respect to pump 10. Bearings 1195 and 1195' can be respectively disposed between motors 1141, 1161 and gears 1150, 1170. The bearings 1195 and 1195' are similar in design and function to bearing 1095 discussed above. It should be understood that those skilled in the art will recognize that the fluid drivers 1140, 1160 are similar to fluid driver 1060 and that the configurations and functions of the fluid driver 1060, discussed above, can be incorporated into the fluid drivers 1140, 1160 within pump 1110. Thus, for brevity, fluid drivers 1140, 1160 will not be discussed in detail. Similarly, the operation of pump 1110 is similar to that of pump 10 and thus, for brevity, will not be further discussed. In addition, like fluid driver 1060, the means for transmitting torque (or power) from the motor to the gear is not limited to a shaft. Instead, any combination of power transmission devices, for example, shafts, sub-shafts, belts, chains, couplings, gears, connection rods, cams, or other power transmission devices can be used without departing from the spirit of the present disclosure. In addition, in some exemplary embodiments, motors 1141, 1161 can be outer-rotor motor designs that are appropriately configured to respectively rotate the gears 1150, 1170.

Figure 11C:
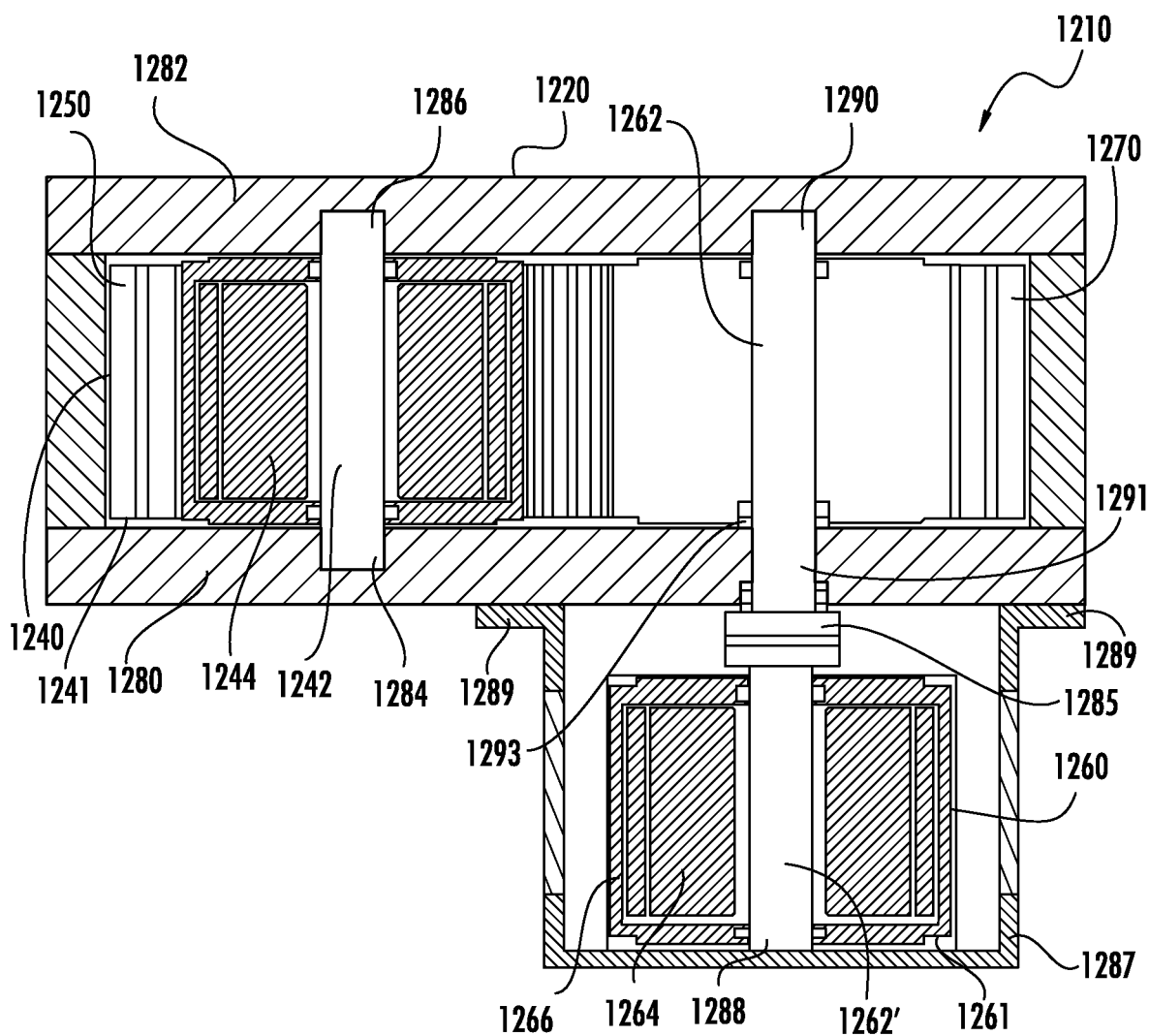

FIG. 11C shows a side cross-sectional view of another exemplary embodiment of an external gear pump 1210. The embodiment of the pump 1210 shown in FIG. 11C differs from pump 10 in that one of the two motors is disposed outside the pump casing. In addition, like pump 10', the storage device 170 is not integral to the pump assembly and neither shaft 1242 of fluid drivers 1240 nor shaft 1262 of fluid driver 1260 has a flow-through shaft configuration. The pump 1210 includes a casing 1220, a fluid driver 1240, and a fluid driver 1260. The inner surface of the casing 1220 defines an internal volume. The casing 1220 can include end plates 1280, 1282. These two plates 1280, 1282 can be connected by a plurality of bolts.

The fluid driver 1240 includes motor 1241 and a gear 1250. The motor 1241 is an outer-rotor motor design and is disposed in the body of gear 1250, which is disposed in the internal volume. The motor 1241 includes a rotor 1244 and a stator 1246. The gear 1250 includes a plurality of gear teeth 1252 extending radially outward from its gear body. It should be understood that those skilled in the art will recognize that fluid driver 1240 is similar to fluid driver 40 and that the configurations and functions of fluid driver 40, as discussed above, can be incorporated into fluid driver 1240. Accordingly, for brevity, fluid driver 1240 will not be discussed in detail except as necessary to describe this embodiment.

The fluid driver 1260 includes a motor 1261 and a gear 1270. The fluid driver 1260 is disposed next to fluid driver 1240 such that the respective gear teeth 1272, 1252 contact each other in a manner similar to the contact of gear teeth 52, 72 in contact area 78 discussed above with respect to pump 10. In this embodiment, motor 1261 is an inner-rotor motor design and, as seen in FIG. 6, the motor 1261 is disposed outside the casing 1220. The rotor 1264 of motor 1261 is disposed radially between the motor shaft 1262' and the stator 1266. The stator 1266 is disposed radially outward of the rotor 1264 and surrounds the rotor 1264. The inner-rotor design means that the shaft 1262', which is coupled to rotor 1264, rotates while the stator 1266 is fixedly connected to the pump casing 1220 either directly or indirectly via, e.g., motor housing 1287. The gear 1270 includes a shaft 1262 that can be supported by the plate 1282 at one end 1290 and the plate 1280 at the other end 1291. The gear shaft 1262, which extends outside casing 1220, can be coupled to motor shaft 1262' via, e.g., a coupling 1285 such as a shaft hub to form a shaft extending from point 1290 to point 1288. One or more seals 1293 can be disposed to provide necessary sealing of the fluid. Design of the shafts 1262, 1262' and the means to couple the motor 1261 to gear 1270 can be varied without departing from the spirit of the present invention.

As shown in FIG. 11C, the gear 1270 is disposed proximate the motor 1261. That is, unlike motor 1241, the motor 1261 is not disposed in the gear body of gear 1270. Instead, the gear 1270 is disposed in the casing 1220 while the motor 1261 is disposed proximate to the gear 1270 but outside the casing 1220. In the exemplary embodiment of FIG. 6, the gear 1270 is spaced apart from the motor 1261 in an axial direction along the shafts 1262 and 1262'. The rotor 1266 is fixedly connected to the shaft 1262', which is couple to shaft 1262 such that the torque generated by the motor 1261 is transmitted to the gear 1270 via the shaft 1262. The shafts 1262 and 1262' can be supported by bearings at one or more locations. It should be understood that those skilled in the art will recognize that the operation of pump 1210, including fluid drivers 1240, 1260, will be similar to that of pump 10 and thus, for brevity, will not be further discussed.

In the above embodiment gear 1270 is shown spaced apart from the motor 1261 along the axial direction of the shafts 1262 and 1262' (i.e., spaced apart but axially aligned). However, other configurations can fall within the scope of the present disclosure. For example, the gear 1270 and motor 1261 can be positioned side-by-side, on top of each other, or offset from each other. Thus, the present disclosure covers all of the above-discussed positional relationships and any other variations of a relatively proximate positional relationship between a gear and a motor outside the casing 1220. In addition, in some exemplary embodiments, motor 1261 can be an outer-rotor motor design that is appropriately configured to rotate the gear 1270.

Further, in the exemplary embodiment described above, the torque of the motor 1261 is transmitted to the gear 1270 via the shafts 1262, 1262'. However, the means for transmitting torque (or power) from a motor to a gear is not limited to shafts. Instead, any combination of power transmission devices, e.g., shafts, sub-shafts, belts, chains, couplings, gears, connection rods, cams, or other power transmission devices, can be used without departing from the spirit of the present disclosure. In addition, the motor housing 1287 can include a vibration isolator (not shown) between the casing 1220 and the motor housing 1287. Further, the motor housing 1287 mounting is not limited to that illustrated in FIG. 11C and the motor housing can be mounted at any appropriate location on the casing 1220 or can even be separate from the casing 1220.

Figure 11D:
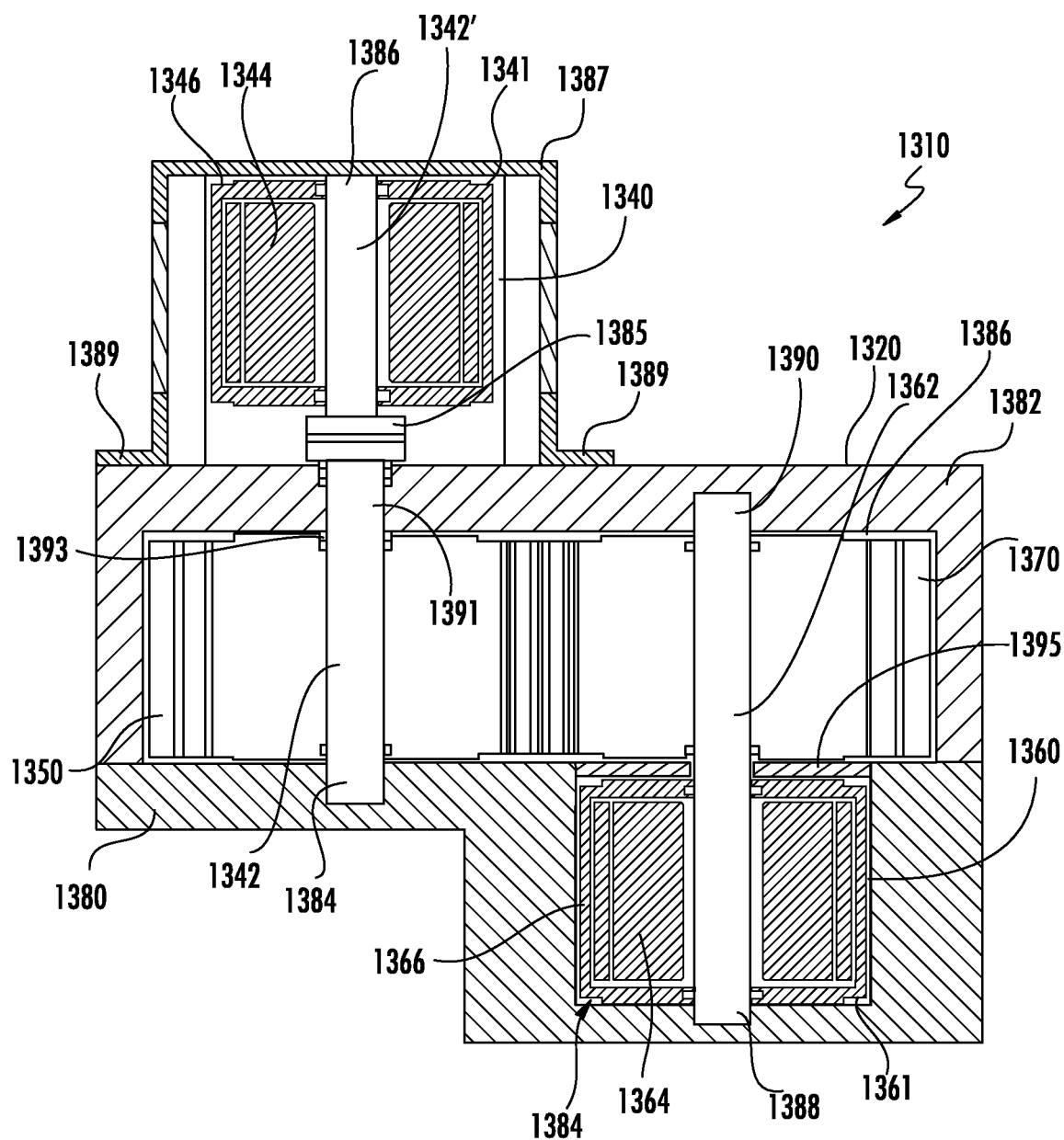

FIG. 11D shows a side cross-sectional view of another exemplary embodiment of an external gear pump 1310. The embodiment of the pump 1310 shown in FIG. 11D differs from pump 10 in that the two motors are disposed external to the gear body with one motor still being disposed inside the pump casing while the other motor is disposed outside the pump casing. In addition, like pump 10', the storage device 170 is not integral to the pump assembly and neither shaft 1342 of fluid drivers 1340 nor shaft 1362 of fluid driver 1360 has a flow-through shaft configuration. The pump 1310 includes a casing 1320, a fluid driver 1340, and a fluid driver 1360. The inner surface of the casing 1320 defines an internal volume that includes a motor cavity 1384 and a gear cavity 1386. The casing 1320 can include end plates 1380, 1382. These two plates 1380, 1382 can be connected to a body of the casing 1320 by a plurality of bolts.

The fluid driver 1340 includes a motor 1341 and a gear 1350. In this embodiment, motor 1341 is an inner-rotor motor design and, as seen in FIG. 11D, the motor 1341 is disposed outside the casing 1320. The rotor 1344 of motor 1341 is disposed radially between the motor shaft 1342' and the stator 1346. The stator 1346 is disposed radially outward of the rotor 1344 and surrounds the rotor 1344. The inner rotor design means that the shaft 1342', which is connected to rotor 1344, rotates while the stator 1346 is fixedly connected to the pump casing 1320 either directly or indirectly via, e.g., motor housing 1387. The gear 1350 includes a shaft 1342 that can be supported by the lower plate 1382 at one end 1390 and the upper plate 1380 at the other end 1391. The gear shaft 1342, which extends outside casing 1320, can be coupled to motor shaft 1342' via, e.g., a coupling 1385 such as a shaft hub to form a shaft extending from point 1384 to point 1386. One or more seals 1393 can be disposed to provide necessary sealing of the fluid. Design of the shafts 1342, 1342' and the means to couple the motor 1341 to gear 1350 can be varied without departing from the spirit of the present invention. It should be understood that those skilled in the art will recognize that fluid driver 1340 is similar to fluid driver 1260 and that the configurations and functions of fluid driver 1260, as discussed above, can be incorporated into fluid driver 1340. Accordingly, for brevity, fluid driver 1340 will not be discussed in detail except as necessary to describe this embodiment.

In addition, the gear 1350 and motor 1341 can be positioned side-by-side, on top of each other, or offset from each other. Thus, the present disclosure covers all of the above-discussed positional relationships and any other variations of a relatively proximate positional relationship between a gear and a motor outside the casing 1320. Also, in some exemplary embodiments, motor 1341 can be an outer-rotor motor design that are appropriately configured to rotate the gear 1350. Further, the means for transmitting torque (or power) from a motor to a gear is not limited to shafts. Instead, any combination of power transmission devices, e.g., shafts, sub-shafts, belts, chains, couplings, gears, connection rods, cams, or other power transmission devices, can be used without departing from the spirit of the present disclosure. In addition, the motor housing 1387 can include a vibration isolator (not shown) between the casing 1320 and the motor housing 1387. Further, the motor housing 1387 mounting is not limited to that illustrated in FIG. 11D and the motor housing can be mounted at any appropriate location on the casing 1320 or can even be separate from the casing 1320.

The fluid driver 1360 includes a motor 1361 and a gear 1370. The fluid driver 1360 is disposed next to fluid driver 1340 such that the respective gear teeth 1372, 1352 contact each other in a manner similar to the contact of gear teeth 52, 72 in contact area 128 discussed above with respect to pump 10. In this embodiment, motor 1361 is an inner-rotor motor design and is disposed in the motor cavity 1384. In this embodiment, the motor 1361 and the gear 1370 have a common shaft 1362. The rotor 1364 of motor 1361 is disposed radially between the shaft 1362 and the stator 1366. The stator 1366 is disposed radially outward of the rotor 1364 and surrounds the rotor 1364. Bearing 1395 can be disposed between motor 1361 and gear 1370. The bearing 1395 is similar in design and function to bearing 1095 discussed above. The inner-rotor design means that the shaft 1362, which is connected to rotor 1364, rotates while the stator 1366 is fixedly connected to the casing 1320. In addition, gear 1370 is also connected to the shaft 1362. It should be understood that those skilled in the art will recognize that the fluid driver 1360 is similar to fluid driver 1060 and that the configurations and functions of fluid driver 1060, as discussed above, can be incorporated into fluid driver 1360. Accordingly, for brevity, fluid driver 1360 will not be discussed in detail except as necessary to describe this embodiment. Also, in some exemplary embodiments, motor 1361 can be an outer-rotor motor design that is appropriately configured to rotate the gear 1370. In addition, it should be understood that those skilled in the art will recognize that the operation of pump 1310, including fluid drivers 1340, 1360, will be similar to that of pump 10 and thus, for brevity, will not be further discussed. In addition, the means for transmitting torque (or power) from the motor to the gear is not limited to a shaft. Instead, any combination of power transmission devices, for example, shafts, sub-shafts, belts, chains, couplings, gears, connection rods, cams, or other power transmission devices can be used without departing from the spirit of the present disclosure.

Figure 11E:
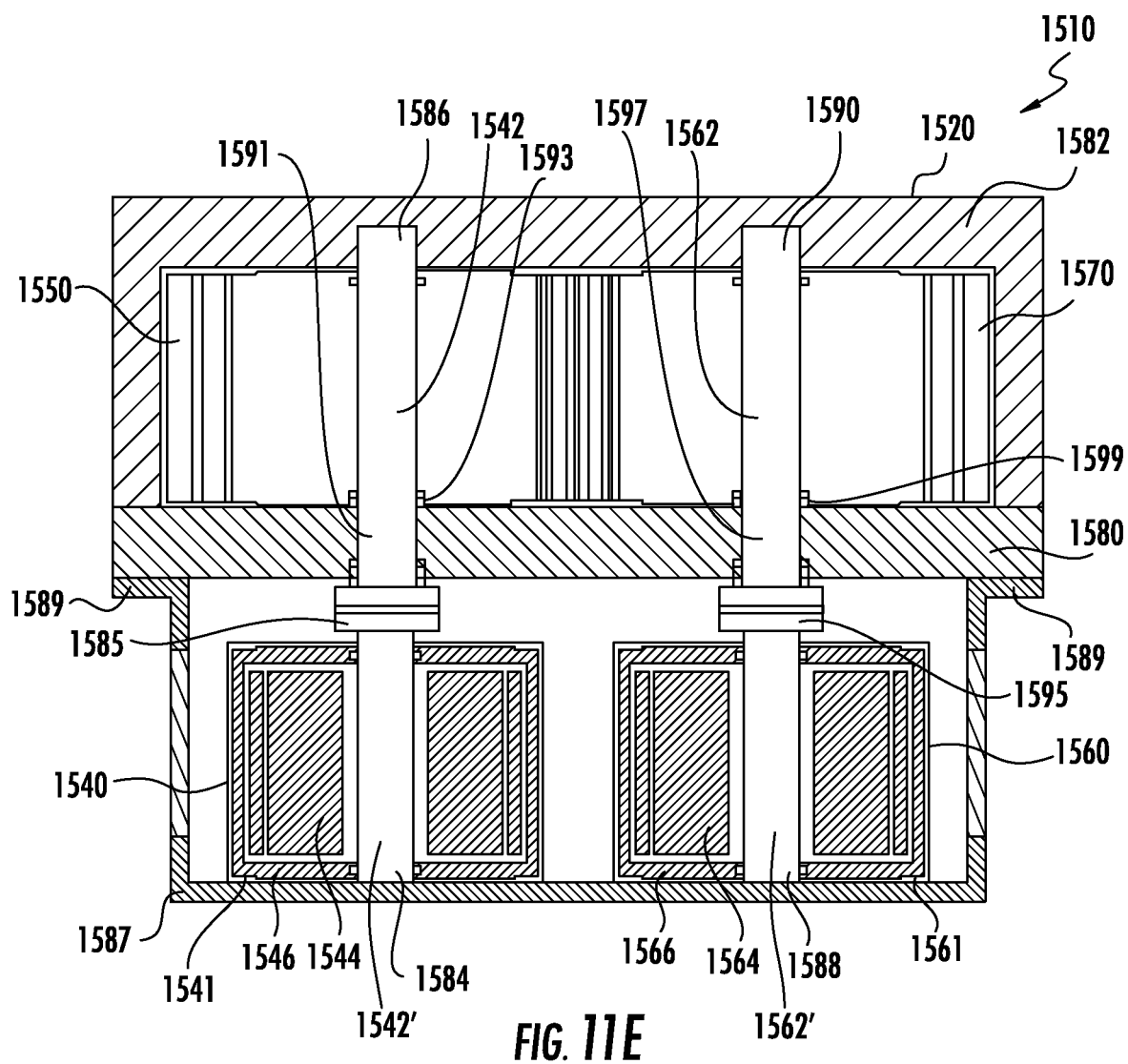

FIG. 11E shows a side cross-sectional view of another exemplary embodiment of an external gear pump 1510. The embodiment of the pump 1510 shown in FIG. 11E differs from pump 10 in that both motors are disposed outside a pump casing. In addition, like pump 10', the storage device 170 is not integral to the pump assembly and neither shaft 1542 of fluid drivers 1540 nor shaft 1562 of fluid driver 1560 has a flow-through shaft configuration. The pump 1510 includes a casing 1520, a fluid driver 1540, and a fluid driver 1560. The inner surface of the casing 1520 defines an internal volume. The casing 1520 can include end plates 1580, 1582. These two plates 1580, 1582 can be connected to a body of the casing 1520 by a plurality of bolts.

The fluid drivers 1540, 1560 respectively include motors 1541, 1561 and gears 1550, 1570. The fluid driver 1540 is disposed next to fluid driver 1560 such that the respective gear teeth 1552, 1572 contact each other in a manner similar to the contact of gear teeth 52, 72 in contact area 78 discussed above with respect to pump 10. In this embodiment, motors 1541, 1561 are of an inner-rotor motor design and, as seen in FIG. 11E, the motors 1541, 1561 are disposed outside the casing 1520. Each of the rotors 1544, 1564 of motors 1541, 1561 are disposed radially between the respective motor shafts 1542', 1562' and the stators 1546, 1566. The stators 1546, 1566 are disposed radially outward of the respective rotors 1544, 1564 and surround the rotors 1544, 1564. The inner-rotor designs mean that the shafts 1542', 1562', which are respectively coupled to rotors 1544, 1564, rotate while the stators 1546, 1566 are fixedly connected to the pump casing 1220 either directly or indirectly via, e.g., motor housing 1587. The gears 1550, 1570 respectively include shafts 1542, 1562 that can be supported by the plate 1582 at ends 1586, 1590 and the plate 1580 at ends 1591, 1597. The gear shafts 1542, 1562, which extend outside casing 1520, can be respectively coupled to motor shafts 1542', 1562' via, e.g., couplings 1585, 1595 such as shaft hubs to respectively form shafts extending from points 1591, 1590 to points 1584, 1588. One or more seals 1593 can be disposed to provide necessary sealing of the fluid. Design of the shafts 1542, 1542', 1562, 1562' and the means to couple the motors 1541, 1561 to respective gears 1550, 1570 can be varied without departing from the spirit of the present disclosure. It should be understood that those skilled in the art will recognize that the fluid drivers 1540, 1560 are similar to fluid driver 1260 and that the configurations and functions of fluid driver 1260, as discussed above, can be incorporated into fluid drivers 1540, 1560. Accordingly, for brevity, fluid drivers 1540, 1560 will not be discussed in detail except as necessary to describe this embodiment. In addition, it should be understood that those skilled in the art will also recognize that the operation of pump 1510, including fluid drivers 1540, 1560, will be similar to that of pump 10 and thus, for brevity, will not be further discussed. In addition, the means for transmitting torque (or power) from the motor to the gear is not limited to a shaft. Instead, any combination of power transmission devices, for example, shafts, sub-shafts, belts, chains, couplings, gears, connection rods, cams, or other power transmission devices can be used without departing from the spirit of the present disclosure. Also, in some exemplary embodiments, motors 1541, 1561 can be of an outer rotor motor design that are appropriately configured to respectively rotate the gears 1550, 1570.

In an exemplary embodiment, the motor housing 1587 can include a vibration isolator (not shown) between the plate 1580 and the motor housing 1587. In the exemplary embodiment above, the motor 1541 and the motor 1561 are disposed in the same motor housing 1587. However, in other embodiments, the motor 1541 and the motor 1561 can be disposed in separate housings. Further, the motor housing 1587 mounting and motor locations are not limited to that illustrated in FIG. 11E, and the motors and motor housing or housings can be mounted at any appropriate location on the casing 1520 or can even be separate from the casing 1520. A detailed description of the various dual fluid driver pump configurations of FIGS. 11-11E can be found in U.S. patent application Ser. No. 14/637,064, which is incorporated herein by reference in its entirety.

Figure 12:
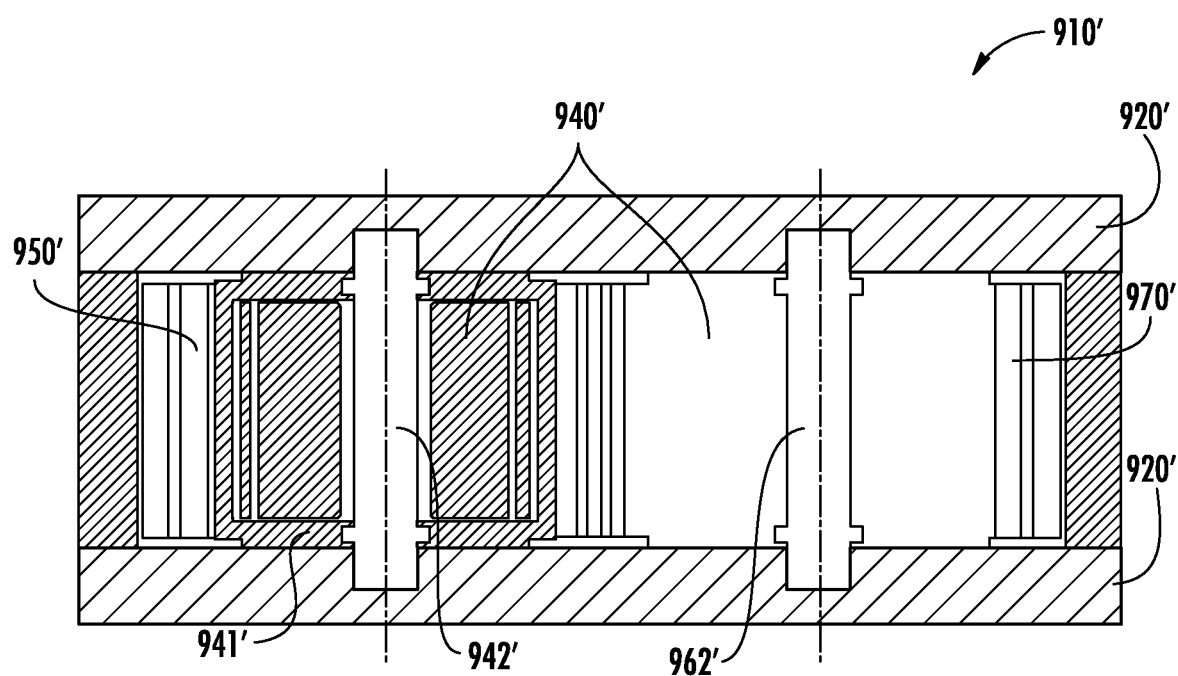
FIGS. 12 and 12A show cross-sectional views of exemplary embodiments of a pump with a driver-driven configuration.

In addition to the non-flow through shaft drive-drive configurations of FIGS. 11-11E, exemplary embodiments of the present disclosure can also include non-flow shaft driver-driven configurations. FIG. 12 shows a side cross-sectional view of an exemplary embodiment of an external gear pump 910'. The pump 910' includes a casing 920' and a fluid driver 940' with gears 950' and 970' and motor 941'. The embodiment of the pump 910' differs from pump 910 of FIG. 8 in that because the storage device 1070 is not integral to the pump assembly, neither shaft 942' of nor shaft 962' of fluid driver 940' has a flow-through shaft configuration. In all other respects, the pump 910' is the same as pump 910. Thus, for brevity, the pump 910' will not be further discussed.

Figure 12A:
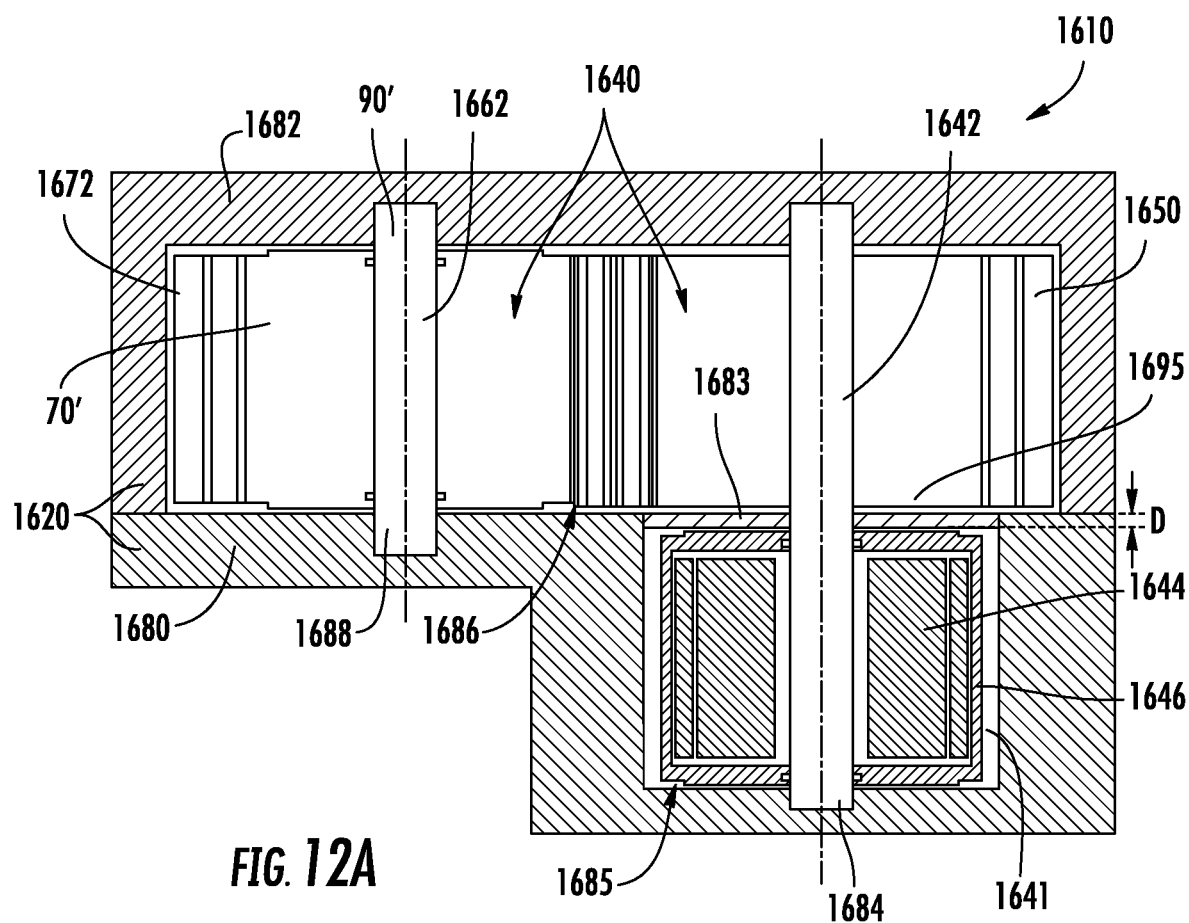

FIG. 12A shows a side cross-sectional view of an exemplary embodiment of an external gear pump 1610. The pump 1610 includes a casing 1620 with a fluid driver 1640. The embodiment of the pump 1610 differs from pump assembly of FIG. 8 in that the gear 1650 is disposed adjacent to the motor 1641 in the casing 1620. That is, unlike motor 941, the motor 1641 is not disposed in the gear body of the gear. In additional, the storage device 1070 is not integral to the pump assembly and neither shaft 1642 of nor shaft 1662 of fluid driver 1640 has a flow-through shaft configuration. The gear 1650 is spaced apart from the motor 1641 in an axial direction on the shaft 1642. For example, in the embodiment shown in FIG. 12A, the gear 1650 is spaced apart from the motor 1641 by a distance D in the axial direction of the support shaft 1642. The rotor 1644 is fixedly connected to the shaft 1642 on one side 1684 of the shaft 1642, and the gear 1650 is fixedly connected to the shaft 1642 on the other side 1686 of the shaft 1642 such that torque generated by the motor 1641 is transmitted to the gear 1650 via the shaft 1642.

The motor 1641 is designed to fit into its cavity 1685 with sufficient tolerance between the motor casing and the pump casing 1620 so that fluid is prevented (or substantially prevented) from entering the cavity 1685 during operation. In addition, there is sufficient clearance between the motor casing and the gear 1650 for the gear 1650 to rotate freely but the clearance is such that the fluid can still be pumped efficiently. Thus, with respect to the fluid, in this embodiment, the motor casing is designed to perform the function of the appropriate portion of the pump casing walls of the embodiment of FIG. 8. In some embodiments, the diameter of the cavity 1685 opening and thus the outer diameter of the motor 1641 is equal to or less than the root diameter for the gear teeth 1652. Thus, in these embodiments, even the motor side of the gear teeth 1652 will be adjacent to a wall of the pump casing 1620 as they rotate. In some embodiments, a bearing 1695 can be inserted between the gear 1650 and the motor 1641. The bearing 1695, which can be, e.g., a washer-type bearing, decreases friction between the gear 1650 and the casing of motor 1641 as the gear 1650 rotates. Depending on the fluid being pumped and the type of application, the bearing can be metallic, a non-metallic or a composite. Metallic material can include, but is not limited to, steel, stainless steel, anodized aluminum, aluminum, titanium, magnesium, brass, and their respective alloys. Non-metallic material can include, but is not limited to, ceramic, plastic, composite, carbon fiber, and nano-composite material. In addition, the bearing 1695 can be sized to fit the motor cavity 1685 opening to help seal the motor cavity 1685 from the gear cavity 1686, and the gears 1650, 1670 will be able to pump the fluid more efficiently. It should be understood that those skilled in the art will recognize that, in operation, the fluid driver 1640 will operate in a manner similar to that disclosed above with respect to pump 910. Accordingly, for brevity, pump 1610 operating details will not be further discussed.

In the above exemplary embodiment, the gear 1650 is shown as being spaced apart from the motor 1641 along the axial direction of the shaft 1642. However, other configurations fall within the scope of the present disclosure. For example, the gear 1650 and motor 1641 can be completely separated from each other (e.g., without a common shaft), partially overlapping with each other, positioned side-by-side, on top of each other, or offset from each other. Thus, the present disclosure covers all of the above-discussed positional relationships and any other variations of a relatively proximate positional relationship between a gear and a motor inside the casing 1620. In addition, in some exemplary embodiments, motor 1641 can be an outer-rotor motor design that is appropriately configured to rotate the gear 1650.

Further, in the exemplary embodiment described above, the torque of the motor 1641 is transmitted to the gear 1650 via the shaft 1642. However, the means for transmitting torque (or power) from a motor to a gear is not limited to a shaft, e.g., the shaft 1642 in the above-described exemplary embodiment. Instead, any combination of power transmission devices, e.g., shafts, sub-shafts, belts, chains, couplings, gears, connection rods, cams, or other power transmission devices, can be used without departing from the spirit of the present disclosure. As discussed above, although the exemplary embodiments of FIGS. 11-12A are shown with a non-flow-through shaft configuration, the exemplary embodiments of FIGS. 11-12A can include a flow-through shaft and/or an integrated storage device if desired.

Figure 13:
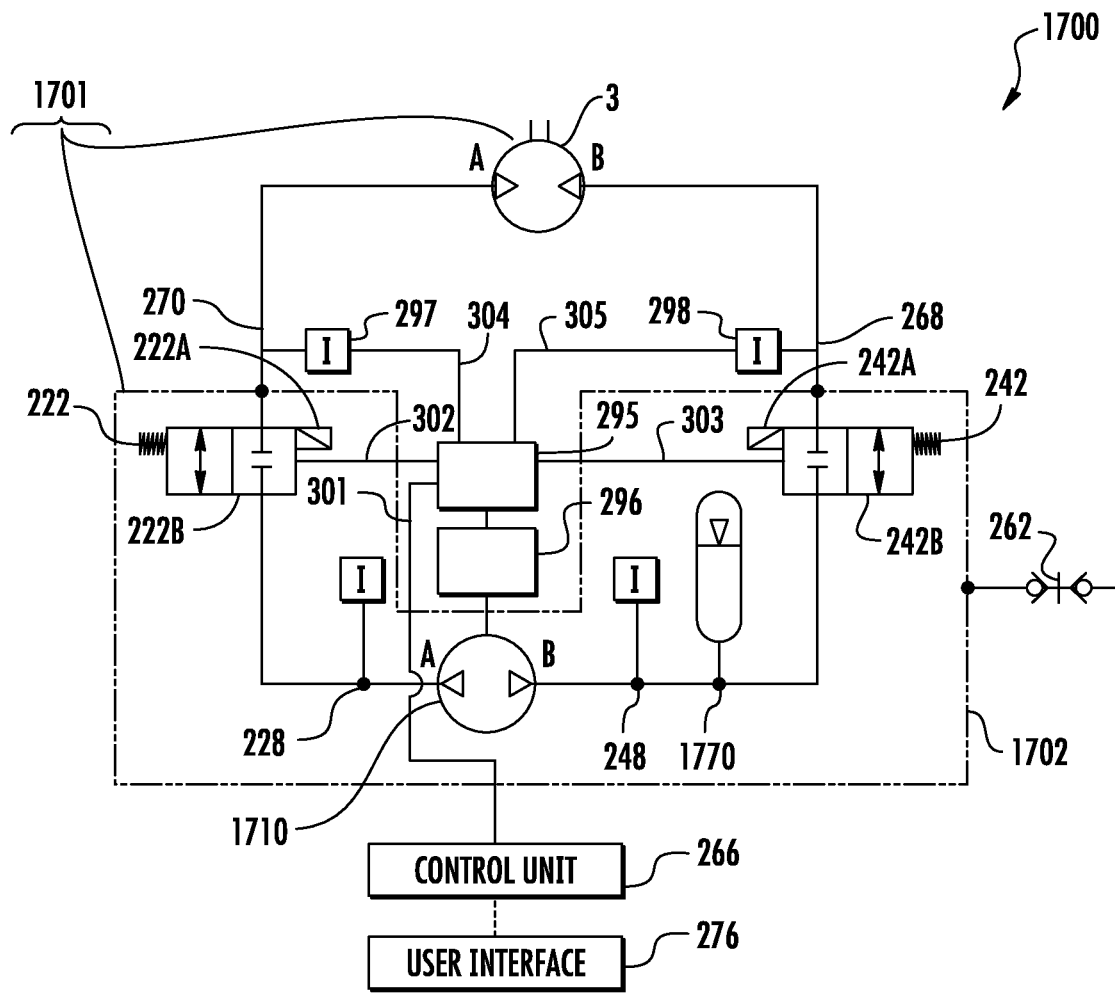
FIG. 13 is a schematic diagram illustrating an exemplary embodiment of a fluid system in a hydrostatic transmission application.

FIG. 13 illustrates an exemplary schematic of a hydrostatic transmission system 1700 that includes hydrostatic transmission assembly 1701 having a pump assembly 1702 and hydraulic motor 3. The pump assembly 1702 includes pump 1710, valve assemblies 222 and 242 and storage device 1770. The system 1700 can also include sensor assemblies 297, 298. Further, in addition to sensor assemblies 297, 298 or in the alternative, the pump assembly 1702 can include sensor assemblies 228 and 248, if desired. In the exemplary embodiment of FIG. 13, the hydraulic motor 3 and the pump assembly 1702 can be integrated into a hydrostatic transmission assembly 1701 as discussed above. However, the components that make up hydrostatic transmission assembly 1701, including the components that make up pump assembly 1702, can be disposed separately if desired, using hoses and pipes to provide the interconnections.

In the system 1700 of FIG. 13, the configuration of pump 1710 and storage device 1770 is not limited to any particular drive-drive or driver-driven configuration and can be any one of the exemplary embodiments discussed above. The valve assemblies 222, 242 each include a solenoid 222A, 242A and a valve 222B, 242B and are configured to fluidly isolate the pump 1710 and storage device 1770 from the hydraulic motor 3. In some embodiments, the valves 222B, 242B can be lock valves (or shutoff valves) that are either fully open or fully closed (i.e. switchable between a fully open state and a fully closed state) and actuated by the respective solenoids 222A and 242A. In other embodiments, the valves 222B, 242B can be set to intermediate positions between 0% and 100%. It should be understood however that, while the valves 222B, 242B can be set to a desired position at the start and end of a given hydraulic system operation, the valves are not used to control the flow or pressure during the operation. That is, during normal operation, the valves 222B, 242B will remain at the set position during a given operation, e.g., at full open or another desired positon at the start of the operation. During the hydraulic system operation, in some embodiments, the control unit 266 will control the speed and/or torque of the motor or motors in pump 1710 to exclusively adjust the flow and/or pressure in the hydraulic system. In this way, the complexity of conventional systems that use, e.g., directional flow valves and variable-flow piston pumps can be eliminated, which will also provide a more reliable system in terms of maintenance and control.

In the system of FIG. 13, the valve assembly 242 is disposed between port B of the hydraulic pump 1710 and port B of the hydraulic motor 3 and the valve assembly 222 is disposed between port A of the hydraulic pump 1710 and port A of the hydraulic motor 3. The valve assemblies 222, 242 and hydraulic pump 1710 are powered by a common power supply 296. In some embodiments, the pump 1710 and the valves assemblies 222, 242 can be powered separately or each valve assembly 222, 242 and pump 1710 can have its own power supply.

The system 1700 can include one or more process sensors therein. For example sensor assemblies 297 and 298 can include one or more sensors to monitor the system operational parameters. The sensor assemblies 297, 298 can communicate with the control unit 266 and/or drive unit 295. Each sensor assembly 297, 298 can include at least one of a pressure transducer, a temperature transducer, and a flow transducer (i.e., any combination of the transducers therein). Signals from the sensor assemblies 297, 298 can be used by the control unit 266 and/or drive unit 295 for monitoring and for control purposes. The status of each valve assembly 222, 242 (e.g., the appropriate operational status—open or closed, percent opening, or some other valve status indication) and the process data measured by the sensors in sensor assemblies 297, 298 (e.g., measured pressure, temperature, flow rate or other system parameters) may be communicated to the drive unit 295 via the respective communication connections 302-305. Alternatively or in addition to sensor assemblies 297 and 298, the pump assembly 1702 can include integrated sensor assemblies to monitor system parameters (e.g., measured pressure, temperature, flow rate or other system parameters). For example, as shown in FIG. 13, sensor assemblies 228 and 248 can be disposed adjacent to the ports of pump 1710 to monitor, e.g., the pump's mechanical performance. The sensors can communicate directly with the pump 1710 as shown in FIG. 13 and/or with drive unit 295 and/or control unit 266 (not shown).

As discussed above, the hydraulic pump 1710 includes one or more motors depending on the configuration of the pump 1710. The motor or motors are controlled by the control unit 266 via the drive unit 295 using communication connection 301. In some embodiments, the functions of drive unit 295 can be incorporated into one or both motors (if the pump has two motors) and/or the control unit 266 such that the control unit 266 communicates directly with one or both motors. In addition, the valve assemblies 222, 242 can also be controlled (e.g., open/close) by the control unit 266 via the drive unit 295 using communication connections 301, 302, and 303. In some embodiments, the functions of drive unit 295 can be incorporated into the valve assemblies 222, 242 and/or control unit 266 such that the control unit 266 communicates directly with valve assemblies 222, 242. The drive unit 295 can also process the communications between the control unit 266 and the sensor assemblies 297, 298 using communication connections 304 and 305 (and/or sensor assemblies 228, 248). In some embodiment, the control unit 266 can be set up to communicate directly with the sensor assemblies 228, 248, 297 and/or 298. The data from the sensors can be used by the control unit 266 and/or drive unit 295 to control the motor(s) of the pump 1710 and/or the valve assemblies 222, 242. For example, based on the process data measured by the sensors in sensor assemblies 228, 248, 297, 298, the control unit 266 can provide command signals to the valve assemblies to, e.g., open/close lock valves in the valve assemblies 222, 242 (or move the valves to an intermediate opening) in addition to controlling a speed and/or torque of the motor(s).

The drive unit 295 includes hardware and/or software that interprets the command signals from the control unit 266 and sends the appropriate demand signals to the motor(s) and/or valve assemblies 222, 242. For example, the drive unit 295 can include pump and/or motor curves that are specific to the hydraulic pump 1710 such that command signals from the control unit 266 will be converted to appropriate speed/torque demand signals to the hydraulic pump 1710 based on the design of the hydraulic pump 1710. Similarly, the drive unit 295 can include valve curves that are specific to the valve assemblies 222, 242 and the command signals from the control unit 266 will be converted to the appropriate demand signals based on the type of valve. The pump/motor and/or the valve curves can be implemented in hardware and/or software, e.g., in the form of hardwire circuits, software algorithms and formulas, or some other hardware and/or software system that appropriately converts the demand signals to control the pump/motor and/or the valve. In some embodiments, the drive unit 295 can include application specific hardware circuits and/or software (e.g., algorithms) to control the motor(s) and/or valve assemblies 222, 242. The drive unit 295 and/or control unit 266 can include circuits, algorithms, protocols (e.g., safety, operational), look-up tables, or some other type of hardware and/or software systems that are specific to the equipment being operated, e.g., specific to excavator operation. Thus, a command signal from the control unit 266 can be interpreted by the drive unit 295 to appropriately control the motor(s) of pump 1710 and/or valve assemblies 222, 242 to run the hydraulic motor 3 at, e.g., a desired rpm. or some other response of the hydraulic motor 3 that is specific to the application.

The control unit 266 can receive feedback data from one or both motors (if the pump 1710 has two motors). For example, the control unit 266 can receive speed or frequency values, torque values, current and voltage values, or other values related to the operation of the motor(s) of pump 1710. In addition, the control unit 266 can receive feedback data from the valve assemblies 222, 242. For example, the control unit 266 can receive the open and close status of the lock valves 222B, 242B. In some embodiments, the lock valves 222B, 242B can have a percent opening indication instead of or in addition to an open/close indication to e.g., provide status of a partially open valve. In addition, the control unit 266 can receive feedbacks such as speed and/or position of the gear assembly in the hydraulic motor 3 to control the hydraulic motor 3. Further, the control unit 266 can receive feedback of process parameters such as pressure, temperature, flow, or some other process parameter. As discussed above, each sensor assembly 228, 248, 297, 298 can have one or more sensors to measure process parameters such as pressure, temperature, and flow rate of the hydraulic fluid. The illustrated sensor assemblies 228, 248, 297, 298 are shown disposed next to the hydraulic motor 3 and the pump 1710. However, the sensor assemblies 228, 248, 297 and 298 are not limited to these locations. Alternatively, or in addition to sensor assemblies 228, 248, 297, 298, the system 1700 can have other sensors throughout the system to measure process parameters such as, e.g., pressure, temperature, flow, or some other process parameter. While the range and accuracy of the sensors will be determined by the specific application, it is contemplated that hydraulic system application with have pressure transducers that range from 0 to 5000 psi with the accuracy of +/−0.5%. These transducers can convert the measured pressure to an electrical output, e.g., a voltage ranging from 1 to 5 DC voltages. Similarly, temperature transducers can range from −4 deg. F. to 300 deg. F., and flow transducers can range from 0 gallons per minute (gpm) to 160 gpm with an accuracy of +/−1% of reading. However, the type, range and accuracy of the transducers in the present disclosure are not limited to the transducers discussed above, and the type, range and/or the accuracy of the transducers can vary without departing from the scope of the present disclosure.

Although the drive unit 295 and control unit 266 are shown as separate controllers in FIG. 13, the functions of these units can be incorporated into a single controller or further separated into multiple controllers (e.g., the motor(s) in pump 1710 and valve assemblies 222, 242 can have a common controller or each component can have its own controller). The controllers (e.g., control unit 266, drive unit 295 and/or other controllers) can communicate with each other to coordinate the operation of the valve assemblies 222, 242 and the hydraulic pump 1710. For example, as illustrated in FIG. 13, the control unit 266 communicates with the drive unit 295 via a communication connection 301. The communications can be digital based or analog based (or a combination thereof) and can be wired or wireless (or a combination thereof). In some embodiments, the control system can be a "fly-by-wire" operation in that the control and sensor signals between the control unit 266, the drive unit 295, the valve assemblies 222, 242, hydraulic pump 1710, sensor assemblies 297, 298 are entirely electronic or nearly all electronic. That is, the control system does not use hydraulic signal lines or hydraulic feedback lines for control, e.g., the actuators in valve assemblies 222, 242 do not have hydraulic connections for pilot valves. In some exemplary embodiments, a combination of electronic and hydraulic controls can be used.

The control unit 266 may receive inputs from an operator using user interface 276. Using the user interface 276, the operator can manually control the system or select preprogrammed routines. For example, the operator can select a mode of operation for the system such as flow (or speed) mode, pressure (or torque) mode, or a balanced mode. Flow or speed mode may be utilized for an operation where relatively fast operation of the hydraulic motor 3' is requested with relatively low torque requirement. Conversely, a pressure or torque mode may be utilized for an operation where relatively slow operation of the hydraulic motor 3' is requested with a relatively high torque requirement. Based on the mode of operation selected, the control scheme for controlling the motor(s) in pump 1710 and the valve assemblies 222, 242 can be different.

As discussed above, in some embodiments, the valve assemblies 222, 242 can include lock valves that are designed to be either fully open or fully closed. In such systems, the control unit 266/drive unit 295 will fully open the valves and, in some embodiments, check for the open feedback prior to starting the motor(s) in pump 1710. During normal operation, the valves 222B, 242B can be at 100% open or some other desired positon by, e.g., energizing the respective solenoids 222A and 242A, and the control unit 266/drive unit 295 controls the operation of the motor(s) to maintain the flow and/or pressure at the operational set point. The operational set point can be determined or calculated based on a desired and/or an appropriate set point for a given mode of operation. Upon shutdown or abnormal operation, the motor(s) in pump 1710 are shut down and the valves 222B, 242B are closed or moved to some other desired positon, e.g., by de-energizing the respective solenoids 222A and 242A. During a normal shut down, the hydraulic pressure in the system may be allowed to drop before the valves are closed. However, in some abnormal operating conditions, based on safety protocol routines, the valves may be closed immediately after or substantially simultaneously with the motor(s) in being turned off in order to trap the pressure in the system. For example, in some abnormal conditions, it might be safer to lock the hydraulic motor 3 in place by trapping the pressure in the hydraulic motor 3. In other applications, only one of the lock valves may be closed. The safety protocol routines may be hardwired circuits or software algorithms in control unit 266 and/or drive unit 295.

As discussed above, hydraulic pump 1710 includes motor(s) that is a variable speed/variable torque, bi-directional motor. Depending on the mode of operation, e.g. as set by the operator or as determined by the system based on the application, the flow and/or pressure of the system can be controlled to a an operational set-point value by controlling either the speed and/or torque of the motor. For example, in flow (or speed) mode operation, the control unit 266/drive unit 295 controls the flow in the system by controlling the speed of the motor(s) in pump 1710. When the system is in pressure (or torque) mode operation, the control unit 266/drive unit 295 controls the pressure at a desired point in the system, e.g., at port A and/or port B of the hydraulic motor 3, by adjusting the torque of the motor(s) in pump 1710. When the system is in a balanced mode of operation, the control unit 266/drive unit 295 takes both the system's pressure and hydraulic flow rate into account when controlling the motor(s) in pump 1710. In some embodiments, in each of these modes, the speed and/or torque of the pump 1710 can be controlled to exclusively adjust the flow and/or pressure in the system to the operational set point. Because the hydraulic pump 1710 is not run continuously at a high rpm as in conventional systems, the temperature of the fluid remains relatively low thereby eliminating the need for a large fluid reservoir. However, storage device 1770 can store and release hydraulic fluid as needed due to changes in the volume of the hydraulic fluid caused by, e.g., temperature changes of the hydraulic fluid or for some other reason. In addition, the storage device 1770 can act to absorb pressure shocks in the system 1700 due to, e.g., sudden changes in the flow or for some other reason.

For clarity, the following description is provided with pump 1710 operated such that fluid is transferred from port B to port A of the pump 1710. Of course, in some embodiments the pump 1710 and hydraulic motor 3 are bi-directional. The pressure/torque mode operation can be used to ensure that inlet of the hydraulic motor 3 (e.g., port A of the hydraulic motor 3) is maintained at a desired pressure (or any other point in the hydraulic system). In pressure/torque mode operation, the power to the motor(s) of pump 1710 is determined based on the system application requirements using criteria such as, e.g., maximizing the torque of the motor(s) of the pump 1710. If the hydraulic pressure is less than a predetermined set-point at the outlet side of the hydraulic pump 1710 (e.g., port A side of the pump 1710 at the location of sensor assembly 228 and/or 297), the control unit 266/drive unit 295 will increase the current of motor(s) in pump 1710 (and thus the torque) to increase the hydraulic pressure. If the pressure at the outlet of pump 1710 is higher than the required pressure based on the operational set point, the control unit 266/drive unit 295 will decrease the current of motor(s) in pump 1710 (and thus the torque) to reduce the hydraulic pressure. While the pressure at the location of sensor assembly 228 and/or 297 is used in the above-discussed exemplary embodiment, pressure mode operation is not limited to measuring the pressure at a single location or the illustrated locations. Instead, the control unit 266/drive unit 295 can receive pressure feedback signals from other locations in the system for control.

In flow/speed mode operation, the power to the motor(s) in 1710 is determined based on the system application requirements using criteria such as how fast the motor(s) ramps to the desired speed and how precisely the motor speed of the pump 1710 can be controlled. Because the fluid flow rate is proportional to the motor speed of the pump 1710 and the fluid flow rate determines the rotational speed of the hydraulic motor 3, the control unit 266 can be configured to control the speed (i.e., rpm) of the hydraulic motor 3 based on a control scheme that uses the pump motor speed, the flow rate, or some combination of the two. That is, when a specific rpm of the hydraulic motor 3 is required, the control unit 266/drive unit 295 can control the motor(s) of pump 1710 to achieve a predetermined speed and/or a predetermined hydraulic flow rate that corresponds to the desired rpm for the hydraulic motor 3. For example, the control unit 266/drive unit 295 can be set up with algorithms, look-up tables, or other software functions to correlate the rpm of the hydraulic motor 3 to the speed of the hydraulic pump 1710 and/or the flow of the hydraulic fluid. Thus, if the system requires that the hydraulic motor 3 run at a desired rpm, the control unit 266/drive unit 295 can be set up to control either the speed of the fluid driver 40 or the hydraulic flow rate in the system to achieve the desired rpm of the hydraulic motor 3.

If the control scheme uses the flow rate, the control unit 266/drive unit 295 can receive a feedback signal from a flow sensor, e.g., flow sensor in any one of or all of sensors assemblies 228, 248, 297, 298, to determine the actual flow in the system. The flow in the system may be determined by measuring, e.g., the differential pressure across two points in the system, the signals from an ultrasonic flow meter, the frequency signal from a turbine flow meter, or by using some other type of flow sensor or instrument. Thus, in systems where the control scheme uses the flow rate, the control unit 266/drive unit 295 can control the flow output of the hydraulic pump 1710 to a predetermined flow set-point value that corresponds to the desired rpm of the hydraulic motor 3.

Similarly, if the control scheme uses the motor speed of the pump 1710, the control unit 266/drive unit 295 can receive speed feedback signals from the fluid drivers. For example, the actual speed of the motor(s) can be measured by sensing the rotation of the pump 1710 gears. For example, the hydraulic pump 1710 can include a magnetic sensor (not shown) that senses the gear teeth as they rotate. Alternatively, or in addition to the magnetic sensor (not shown), one or more teeth can include magnets that are sensed by a pickup located either internal or external to the hydraulic pump casing. Thus, in systems where the control scheme uses the flow rate, the control unit 266/drive unit 295 can control the actual speed of the hydraulic pump 1710 to a predetermined speed set-point that corresponds to the desired rpm of the hydraulic motor 3. Alternatively, or in addition to the controls described above, the speed of the hydraulic motor 3 can be measured directly and compared to a desired rpm set-point of the hydraulic motor 3 to control the speed of the fluid driver 40. In addition, in some embodiments, it may be desirable to receive feedback of the output shaft position of the hydraulic motor 3.

Alternatively, or in addition to the controls described above, the speed of the hydraulic motor 3 can be measured directly and compared to a desired speed set-point to control the speed of motor(s) in pump 1710.

As discussed above, the control unit 266/drive unit 295 can include motor and/or valve curves. In addition, the hydraulic motor 3 can also have characteristic curves that describe the operational characteristics of the motor, e.g., curves that correlate pressure/flow with rotational speed. The characteristic curves of the motor(s) of pump 1710, valve assemblies 222, 242, and the hydraulic motor 3 can be stored in memory, e.g. RAM, ROM, EPROM, or some other type of storage device in the form of look-up tables, formulas, algorithms, or some other type of software implementation in the control unit 266, drive unit 295, or some other storage that is accessible to the control unit 266/drive unit 295 (e.g., in the fluid driver(s) of pump 1710, valve assemblies 222, 242, and/or the hydraulic motor 3). The control unit 266/drive unit 295 can then use the characteristic curves to precisely control the motor(s) in pump 1710 and/or the valves in valve assemblies 222, 242.

Although the above drive-drive and driver-driven embodiments were described with respect to an external gear pump arrangement with spur gears having gear teeth, it should be understood that those skilled in the art will readily recognize that the concepts, functions, and features described below can be readily adapted to external gear pumps with other gear configurations (helical gears, herringbone gears, or other gear teeth configurations that can be adapted to drive fluid), internal gear pumps with various gear configurations, to pumps having more than two prime movers, to prime movers other than electric motors, e.g., hydraulic motors or other fluid-driven motors, inter-combustion, gas or other type of engines or other similar devices that can drive a fluid displacement member, and to fluid displacement members other than an external gear with gear teeth, e.g., internal gear with gear teeth, a hub (e.g. a disk, cylinder, other similar component) with projections (e.g. bumps, extensions, bulges, protrusions, other similar structures or combinations thereof), a hub (e.g. a disk, cylinder, or other similar component) with indents (e.g., cavities, depressions, voids or other similar structures), a gear body with lobes, or other similar structures that can displace fluid when driven. Accordingly, for brevity, detailed description of the various pump configurations are omitted. In addition, those skilled in the art will recognize that, depending on the type of pump, the synchronizing contact (drive-drive) or meshing (driver-driven) can aid in the pumping of the fluid instead of or in addition to sealing a reverse flow path. For example, in certain internal-gear georotor configurations, the synchronized contact or meshing between the two fluid displacement members also aids in pumping the fluid, which is trapped between teeth of opposing gears. Further, while the above embodiments have fluid displacement members with an external gear configuration, those skilled in the art will recognize that, depending on the type of fluid displacement member, the synchronized contact or meshing is not limited to a side-face to side-face contact and can be between any surface of at least one projection (e.g. bump, extension, bulge, protrusion, other similar structure, or combinations thereof) on one fluid displacement member and any surface of at least one projection (e.g. bump, extension, bulge, protrusion, other similar structure, or combinations thereof) or indent (e.g., cavity, depression, void or other similar structure) on another fluid displacement member. Further, with respect to the drive-drive configurations, while two prime movers are used to independently and respectively drive two fluid displacement members in the above embodiments, it should be understood that those skilled in the art will recognize that some advantages (e.g., reduced contamination as compared to the driver-driven configuration) of the above-described embodiments can be achieved by using a single prime mover to independently drive two fluid displacement members. For example, in some embodiments, a single prime mover can independently drive the two fluid displacement members by the use of, e.g., timing gears, timing chains, or any device or combination of devices that independently drives two fluid displacement members while maintaining synchronization with respect to each other during operation.

The fluid displacement members, e.g., gears in the above embodiments, can be made entirely of any one of a metallic material or a non-metallic material. Metallic material can include, but is not limited to, steel, stainless steel, anodized aluminum, aluminum, titanium, magnesium, brass, and their respective alloys. Non-metallic material can include, but is not limited to, ceramic, plastic, composite, carbon fiber, and nano-composite material. Metallic material can be used for a pump that requires robustness to endure high pressure, for example. However, for a pump to be used in a low pressure application, non-metallic material can be used. In some embodiments, the fluid displacement members can be made of a resilient material, e.g., rubber, elastomeric material, to, for example, further enhance the sealing area.

Alternatively, the fluid displacement member, e.g., gears in the above embodiments, can be made of a combination of different materials. For example, the body can be made of aluminum and the portion that makes contact with another fluid displacement member, e.g., gear teeth in the above exemplary embodiments, can be made of steel for a pump that requires robustness to endure high pressure, a plastic for a pump for a low pressure application, a elastomeric material, or another appropriate material based on the type of application.

Exemplary embodiments of the pump assembly can displace a variety of fluids. For example, the pumps can be configured to pump hydraulic fluid, engine oil, crude oil, blood, liquid medicine (syrup), paints, inks, resins, adhesives, molten thermoplastics, bitumen, pitch, molasses, molten chocolate, water, acetone, benzene, methanol, or another fluid. As seen by the type of fluid that can be pumped, exemplary embodiments of the pump can be used in a variety of applications such as heavy and industrial machines, chemical industry, food industry, medical industry, commercial applications, residential applications, or another industry that uses pumps. Factors such as viscosity of the fluid, desired pressures and flow for the application, the configuration of the fluid displacement member, the size and power of the motors, physical space considerations, weight of the pump, or other factors that affect pump configuration will play a role in the pump arrangement. It is contemplated that, depending on the type of application, the exemplary embodiments of the pump assembly discussed above can have operating ranges that fall with a general range of, e.g., 1 to 5000 rpm. Of course, this range is not limiting and other ranges are possible.

The pump operating speed can be determined by taking into account factors such as viscosity of the fluid, the prime mover capacity (e.g., capacity of electric motor, hydraulic motor or other fluid-driven motor, internal-combustion, gas or other type of engine or other similar device that can drive a fluid displacement member), fluid displacement member dimensions (e.g., dimensions of the gear, hub with projections, hub with indents, or other similar structures that can displace fluid when driven), desired flow rate, desired operating pressure, and pump bearing load. In exemplary embodiments, for example, applications directed to typical industrial hydraulic system applications, the operating speed of the pump can be, e.g., in a range of 300 rpm to 900 rpm. In addition, the operating range can also be selected depending on the intended purpose of the pump. For example, in the above hydraulic pump example, a pump configured to operate within a range of 1-300 rpm can be selected as a stand-by pump that provides supplemental flow as needed in the hydraulic system. A pump configured to operate in a range of 300-600 rpm can be selected for continuous operation in the hydraulic system, while a pump configured to operate in a range of 600-900 rpm can be selected for peak flow operation. Of course, a single, general pump can be configured to provide all three types of operation.

In addition, the dimensions of the fluid displacement members can vary depending on the application of the pump. For example, when gears are used as the fluid displacement members, the circular pitch of the gears can range from less than 1 mm (e.g., a nano-composite material of nylon) to a few meters wide in industrial applications. The thickness of the gears will depend on the desired pressures and flows for the application.

In some embodiments, the speed of the prime mover, e.g., a motor, that rotates the fluid displacement members, e.g., a pair of gears, can be varied to control the flow from the pump. In addition, in some embodiments the torque of the prime mover, e.g., motor, can be varied to control the output pressure of the pump.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A hydraulic system comprising:
    a hydraulic motor;
    a hydraulic pump connected to the hydraulic motor, the hydraulic pump to provide hydraulic fluid to operate the hydraulic motor, the hydraulic pump including,
        a first fluid driver with a first variable torque motor and a first gear having a plurality of first gear teeth, and
        a second fluid driver with a second variable torque motor and a second gear having a plurality of second gear teeth; and
    a controller that establishes a torque of the hydraulic pump to exclusively adjust at least one of a flow or a pressure in the hydraulic system,
    wherein the controller includes a plurality of operational modes including at least one of a flow mode, a pressure mode, or a balanced mode.

2. The hydraulic system of claim 1, wherein the controller synchronizes rotation rates between the first and second gears to generate a contact force between the first and second gears of the hydraulic pump.

3. The hydraulic system of claim 2, wherein the synchronization rate is in a range of 99.0% to 100%.

4. The hydraulic system of claim 2, wherein the synchronization rate is in a range of 99.5% to 100%.

5. The hydraulic system of claim 1, wherein the hydraulic system is a closed-loop system.

6. The hydraulic system of claim 1, wherein the first motor and the second motor are controlled so as to synchronize contact between a face of at least one tooth of the plurality of second gear teeth and a face of at least one tooth of the plurality of first gear teeth, and
    wherein a demand signal to one of the first and second motors is set higher than a demand signal to the other of the first and second motors to attain the synchronized contact.

7. The hydraulic system of claim 6, wherein the synchronized contact is such that a slip coefficient is 5% or less.

8. The hydraulic system of claim 7, wherein the slip coefficient is 5% or less for a pump pressure in a range of 3000 psi to 5000 psi, 3% or less for a pump pressure in a range of 2000 psi to 3000 psi, 2% or less for a pump pressure in a range of 1000 psi to 2000 psi and 1% or less for a pump pressure in a range up to 1000 psi.

9. The hydraulic system of claim 1, wherein the hydraulic pump is conjoined to the hydraulic motor along a longitudinal axis of the hydraulic motor.

10. The hydraulic system of claim 1, wherein the hydraulic pump is conjoined to the hydraulic motor along an axis that is offset from a longitudinal axis of the hydraulic motor.

11. The hydraulic system of claim 1, further comprising at least one storage device, which is in fluid communications with the hydraulic pump, to store hydraulic fluid.

12. The hydraulic system of claim 11, wherein at least one of the first motor or the second motor includes a flow-through shaft that provides fluid communication between the at least one storage device and at least one of an inlet port or an outlet port of the hydraulic pump.

13. A hydraulic system comprising:
    a hydraulic motor;
    a hydraulic pump connected to the hydraulic motor, the hydraulic pump to provide hydraulic fluid to operate the hydraulic motor, the hydraulic pump including,
        a first fluid driver with a first variable torque motor and a first gear having a plurality of first gear teeth, and
        a second fluid driver with a second variable torque motor and a second gear having a plurality of second gear teeth; and
    a controller that establishes a torque of the hydraulic pump to exclusively adjust at least one of a flow or a pressure in the hydraulic system,
    wherein the controller includes one or more curves for the hydraulic pump that convert command signals to appropriate torque demand signals to the hydraulic pump based on a design of the hydraulic pump.

14. The hydraulic system of claim 13, wherein the controller synchronizes rotation rates between the first and second gears to generate a contact force between the first and second gears of the hydraulic pump.

15. The hydraulic system of claim 13, wherein the first motor and the second motor are controlled so as to synchronize contact between a face of at least one tooth of the plurality of second gear teeth and a face of at least one tooth of the plurality of first gear teeth,
    wherein a demand signal to one of the first and second motors is set higher than a demand signal to the other of the first and second motors to attain the synchronized contact and
    wherein the synchronized contact is such that a slip coefficient is 5% or less.

16. A hydraulic system comprising:
    a hydraulic motor;
    a hydraulic pump connected to the hydraulic motor, the hydraulic pump to provide hydraulic fluid to operate the hydraulic motor, the hydraulic pump including,
        a first fluid driver with a first variable torque motor and a first gear having a plurality of first gear teeth, and
        a second fluid driver with a second variable torque motor and a second gear having a plurality of second gear teeth; and
    a controller that establishes a torque of the hydraulic pump to exclusively adjust at least one of a flow or a pressure in the hydraulic system,
    wherein the first motor is disposed inside the first gear and the second motor is disposed inside the second gear, and
    wherein the first motor and the second motor are outer-rotor motors.

17. The hydraulic system of claim 16, wherein the controller synchronizes rotation rates between the first and second gears to generate a contact force between the first and second gears of the hydraulic pump.

18. The hydraulic system of claim 16, wherein the first motor and the second motor are controlled so as to synchronize contact between a face of at least one tooth of the plurality of second gear teeth and a face of at least one tooth of the plurality of first gear teeth,
    wherein a demand signal to one of the first and second motors is set higher than a demand signal to the other of the first and second motors to attain the synchronized contact and wherein the synchronized contact is such that a slip coefficient is 5% or less.

* * * * *